United States Patent
Watanabe et al.

(10) Patent No.: US 7,162,598 B2
(45) Date of Patent: *Jan. 9, 2007

(54) STORAGE SYSTEM

(75) Inventors: Haruaki Watanabe, Sagamihara (JP); Kouji Arai, Odawara (JP); Katsunori Nakamura, Odawara (JP); Takashi Oeda, Sagamihara (JP); Akira Yamamoto, Sagamihara (JP); Kenji Yamagami, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 412 days.

This patent is subject to a terminal disclaimer.

(21) Appl. No.: 10/721,088

(22) Filed: Nov. 26, 2003

(65) Prior Publication Data
US 2004/0107315 A1 Jun. 3, 2004

Related U.S. Application Data

(63) Continuation of application No. 09/376,991, filed on Aug. 19, 1999, now Pat. No. 6,681,303.

(30) Foreign Application Priority Data
Aug. 20, 1998 (JP) ................... 10-233860

(51) Int. Cl.
*G06F 13/20* (2006.01)
(52) U.S. Cl. .................................... 711/162
(58) Field of Classification Search ............ 711/112, 711/161, 162
See application file for complete search history.

(56) References Cited

U.S. PATENT DOCUMENTS

| | | |
|---|---|---|
| 4,480,277 A | 10/1984 | Hara et al. |
| 5,155,845 A | 10/1992 | Beal et al. |
| 5,511,177 A | 4/1996 | Kagimasa et al. |
| 5,555,371 A | 9/1996 | Duyanovich et al. |
| 5,680,640 A | 10/1997 | Ofek et al. |
| 5,742,792 A | 4/1998 | Yanai et al. |
| 5,905,995 A | 5/1999 | Tabuchi et al. |
| 6,101,497 A | 8/2000 | Ofek |
| 6,351,792 B1 | 2/2002 | Milillo |

FOREIGN PATENT DOCUMENTS
EP      0566966 A2    10/1993

(Continued)

OTHER PUBLICATIONS

Proceedings ACM SIGMOD, Jun. 1988, "A Case for Redundant Arrays of Inexpensive Disks (RAID)", D. Patterson et al, pp. 109-116.

*Primary Examiner*—Kevin L. Ellis
(74) *Attorney, Agent, or Firm*—Mattingly, Stanger, Malur & Brundidge, P.C.

(57) ABSTRACT

In a storage system, a logical volume is divided into a plurality of small areas called logical storage devices and only such an area designated by a user is made an object of remote copying or migratory copying. Also, there is provided a unit for forming a logical volume from any logical storage device of any RAID group. Thereby, the reduction of the deterioration in performance at the time of remote copying, the reduction of a storage area to be assigned to a secondary site as a copy destination, the shortening of a time required for migratory copying and the assignment of any area of a logical volume on any RAID group are enabled.

8 Claims, 35 Drawing Sheets

FOREIGN PATENT DOCUMENTS

| | | |
|---|---|---|
| EP | 0672985 A1 | 9/1995 |
| JP | 64-33770 | 2/1989 |
| JP | 2-059934 | 2/1990 |
| JP | 03-093942 | 9/1991 |
| JP | 06-067809 | 11/1994 |
| JP | 07-234811 | 5/1995 |
| JP | 2-201132 | 8/1995 |
| JP | 7-271521 | 10/1995 |
| JP | 09-069031 | 11/1997 |
| JP | 9-325863 | 12/1997 |
| WO | WO9425919 | 11/1994 |
| WO | WO97/09676 | 3/1997 |

FIG. 3
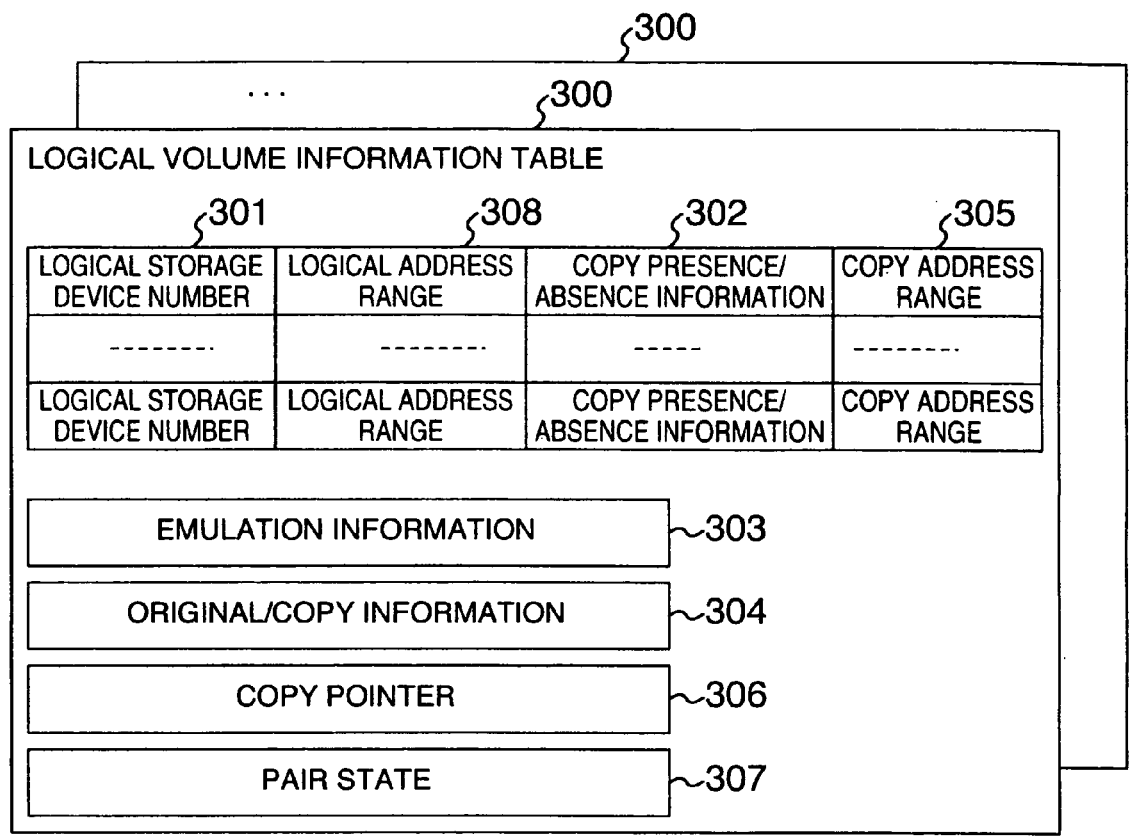
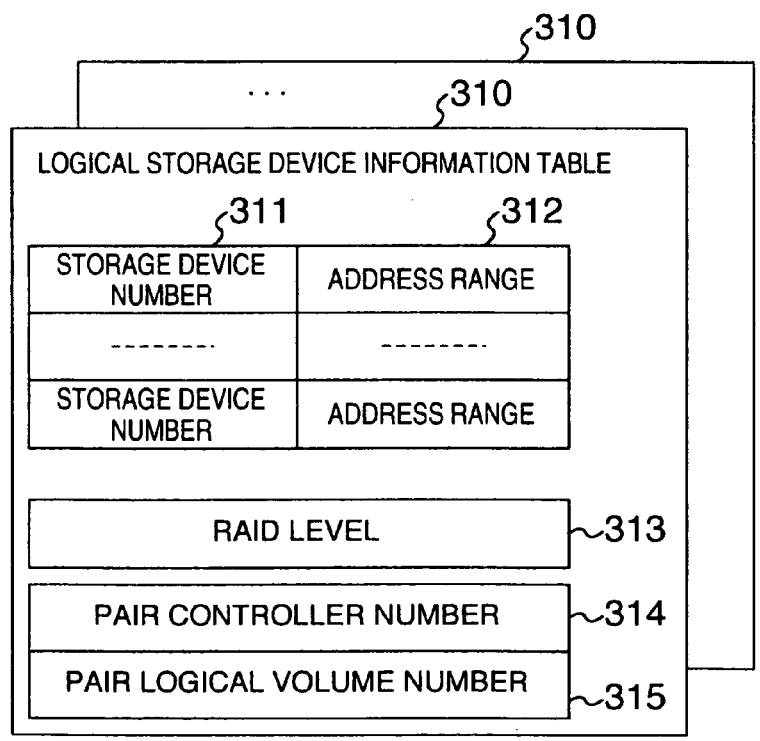

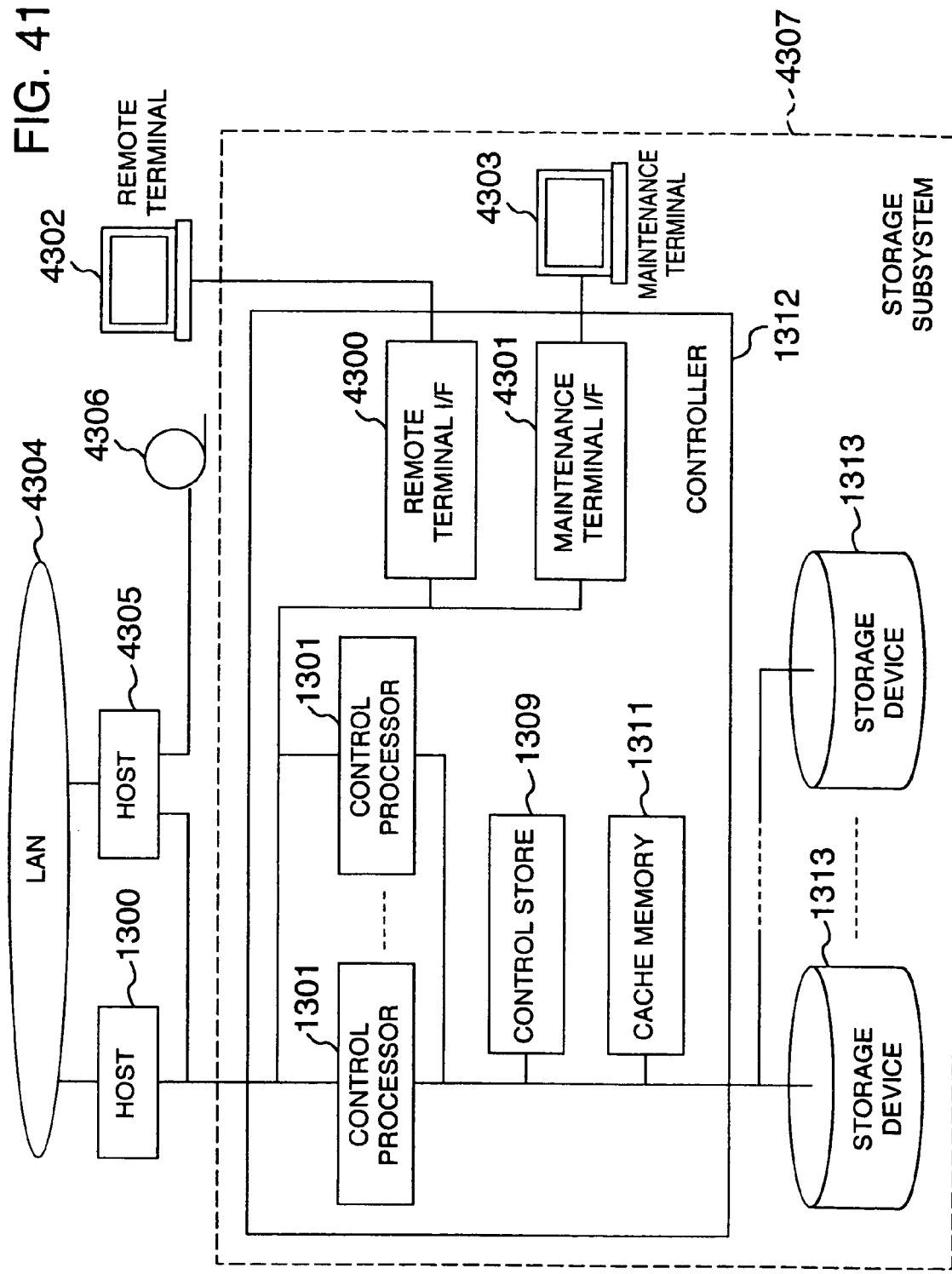

STORAGE SYSTEM

This is a continuation application of U.S. Ser. No. 09/376,991, filed Aug. 19, 1999 now U.S. Pat. No. 6,681,303.

BACKGROUND OF THE INVENTION

The present invention relates to a technique of copying of date between storage systems without the intervention of a CPU and a technique of arrangement/rearrangement of a logical volume on RAID groups in a storage system. Further, the present invention relates to a storage system in an information processing system or the like and relates to a computer system having a function of generating a copy of data stored in a volume.

A technique of remote copying exists as one of techniques in which the copying of data is performed between storage systems.

In the remote coping, the writing of data in a duplicated manner is made without the intervention of a CPU between a plurality of storage systems located at physically remote places. Therein, storage systems respectively arranged at primary and secondary sites are connected by a dedicated line or public line. Also, a logical volume having the same capacity as that of a logical volume existing on the storage system of the primary site and made an object subjected to copying (hereinafter referred to as a copy source logical volume) is formed on the storage system of the secondary site as a logical volume which is paired with the copy source logical volume (and will hereinafter be referred to as a copy destination logical volume). Then, data of the copy source logical volume of the primary site is copied into the copy destination logical volume. Also, in the case where the updating of data of the copy source logical volume of the primary site is made from a CPU, the updated data is transferred to the storage system of the secondary site and is then written into the copy destination logical volume. Thus, in the technique of remote copying, the duplicated state of a logical volume is always held at the primary and secondary sites.

Therefore, even if the primary site becomes impossible of use due to natural disasters such as earthquake and flood or artificial disasters such as fire and terrorism, it is possible to rapidly restart the service by use of the logical volume on the storage system of the secondary site.

A known prior art relevant to the remote copying includes a technique disclosed by U.S. Pat. No. 5,155,845. The known technique of performing the copying of data between storage systems also includes a technique of migratory copying (or data migrating copy) disclosed by U.S. Pat. No. 5,680,640.

According to the known migratory copying technique, in the case where a new storage system is introduced in lieu of a storage system hitherto used by a customer, a processing for copying data of a logical volume on the old storage system into the new storage system is realized in the following manner.

Namely, the destination of connection of a CPU is changed from the old storage system to the new storage system. Further, the new storage system and the old storage system are connected. While receiving an input/output request from the CPU, the new storage system reads data from a logical volume on the old storage system and copies the read data into a logical volume on the new storage system (that is, performs a migratory copying).

With this technique, since the copying of data between the logical volumes of the new and old storage systems can be performed without the intervention of the CPU, a load imposed on the CPU at the time of data migration is eliminated, thereby enabling the data migration even when the service is being performed.

In "A Case for Redundant Arrays of Inexpensive Disks (RAID)", Proc. ACM SIGMOD, June 1988, G. A. Patterson, G. Gibson and R. H. Katz of the University of California, Berkeley, U.S.A. have given a taxonomy of five organizations of disk arrays as RAID levels to evaluate the storage cost, performance and reliability of each RAID level. The RAID levels result from the classification of a redundant array forming method in the case where a storage system is structured using inexpensive disk devices. Therein, the redundant array forming method is classified in accordance with a data allocating method and a redundant data generating method. RAID's 1, 3 and 5 in the taxonomy of five organizations are presently applied to many products. These RAID levels have the following characteristics.

RAID 1 (Mirrored Disks): The same data is held by different disk devices. Since data is duplicated, the reliability is high but the storage cost is doubled.

RAID 3: Data is divided into units of several bytes so that they are allocated to a plurality of data disk devices. Redundant or check data is generated by an exclusive OR of divisional data and is stored in another or one redundant disk. Since all the disk devices synchronously operate for the input/output of data, an excellent performance is exhibited in the case where the input/output of long or large data is performed. On the other side, the RAID 3 is unsuitable for an on-line transaction processing or the like in which short data is randomly accessed.

RAID 5: Data is divided into units of blocks and the data blocks are distributively allocated to a plurality of disk devices. Redundant data is generated by an exclusive OR of divisional data and is stored at predetermined positions on storage devices. In the RAID 5, respective redundant blocks are distributively allocated to the disk devices so that all the disk devices include the redundant blocks. Thereby, a load imposed on the disk device at the time of access to redundant block is distributed. When the data block is updated, a disk access is generated in order to recalculate the corresponding redundant block, thereby deteriorating the performance. This is called write penalty.

The RAID 5 is characterized in that if the size of data to be accessed does not exceed the size of the block, the access to only one disk device suffices and hence the plurality of disk devices can operate independently, unlike the RAID 3. Therefore, the RAID 5 is suitable for an on-line transaction processing in which relatively small data is randomly accessed.

As mentioned above, the characteristics in the aspects of reliability, cost and performance are provided in accordance with each RAID level. In actual services, it is preferable that the optimum RAID level is selected taking those characteristics into consideration and in accordance with the property of the service.

An assembly of storage devices realizing a certain RAID level or an assembly of partial areas of storage devices is called a RAID group, and one RAID level is realized by this RAID group. A logical volume which a CPU makes an object of input/output is generally mapped on one RAID group by virtue of storage devices.

Also, there exists a technique of acquiring the backup of consistent data without stopping the updating for a volume.

It is generally known that the backup is acquired as means for preventing important data from being fully lost when a fault is generated in a storage device. It is general that in order to assure the consistency of data subjected to the acquisition of backup, a write/read processing for the corresponding volume is stopped during a time when the backup is being acquired. Accordingly, there is a problem that during the time when the backup is being acquired, a processing must be stopped which uses a volume made an object of backup. According to a known method of solving this problem, a copy of a volume is generated in a storage device so that (1) normally, data of the original volume and data of the copy volume are made coincident with each other, (2) during a time when the backup is acquired, the data of the original volume and the data of the copy volume are not made coincident (and hence the copy volume represents the original volume at a certain point of time when the consistency is assumed), and (3) the copy volume is used for the backup. Thereby, it is possible to acquire consistent data as backup data without stopping the processing during the time when the backup is acquired.

SUMMARY OF THE INVENTION

In the conventional technique of remote copying, since the unit of an object of copying is a logical volume, as mentioned above, the following problems are involved from the aspect of efficiency.

Namely, there may be the case where a logical volume made an object subjected to copying includes data the copy of which is not necessarily required. For example, in the case where a partial area of a logical volume is defined as a work area so that it is temporarily used for sorting, data of the work area is not required to be copied. However, according to the conventional remote copying technique in which the copying is performed in units of a logical volume, unnecessary data is also copied, thereby causing overhead which is not necessary essentially. Since a storage system of a primary site and a storage system of a secondary site are arranged with a long distance of several-ten kilometers to several-hundred kilometers from each other, the overhead caused by the copying of unnecessary data is large, thereby greatly deteriorating the response time for CPU and the throughput of the storage system. Also, in the case where only a part of a logical volume of the primary site made an object subjected to copying is used, unused portions yielded in a logical volume formed at the secondary site in a manner paired with the logical volume made the object subjected to copying and with the same capacity as the logical volume made the object subjected to copying may be an essentially unnecessary burden of cost to the CPU and the storage system.

Also, such problems of the conventional remote copying technique are similarly encountered by the conventional migratory copying technique mentioned above.

Therefore, an object of the present invention is to further improve the efficiency of copying such as remote copying or migratory copying between storage systems without the intervention of a CPU.

On the other hand, in the prior art, since one logical volume is mapped on one RAID group, as mentioned above, it is impossible to arrange one logical volume on a plurality of RAID groups distributively.

Accordingly, in the case where each dataset or file in one logical volume has a different access characteristic, there is a possibility that the RAID level of a RAID group having that logical volume arranged thereon and/or storage devices forming the RAID group are suitable for certain dataset and file but are unsuitable for another.

Therefore, another object of the present invention is to arrange/rearrange a logical volume on a plurality of RAID groups distributively so that datasets or files in one logical volume are arranged on RAID groups which are suitable for their access characteristics.

In the existing technique of acquiring the backup of consistent data without stopping the updating for a volume, a copy of the volume is generated in a storage device so that (1) normally, data of the original volume and data of the copy volume are made coincident with each other, (2) during a time when the backup is acquired, the data of the original volume and the data of the copy volume are not made coincident (and hence the copy volume represents the original volume at a certain point of time when the consistency is assumed), and (3) the copy volume is used for the backup. In this method, however, the unit of an object of copying is a volume. Therefore, even in the case where data in units of a specified area (for example, a dataset or file) in a volume is needed, it is necessary to generate a copy of the whole of the volume. Accordingly, there is a problem that an unnecessary copy is generated, thereby (1) imposing an extra load to storage devices and (2) taking an extra time.

To attain the above-mentioned object, the present invention provides, for example, a remote copying method of performing a remote copying between two storage systems used as external memories of a CPU which issues a request for access to a logical volume, characterized in that in one of the two storage systems serving as a copy source, the designation of a partial area of a logical volume on the copy source storage system is accepted and data of the designation accepted partial area of the logical volume is transferred to a logical volume on the other of the two storage systems as a copy destination without the intervention of the CPU, whereas in the copy destination storage system, the data of the partial area transferred from the copy source storage system is written into the logical volume on the copy destination storage system.

According to such a method, since only any partial area of the logical volume can be subjected to remote copying, it is possible to eliminate unnecessary overhead hitherto caused due to the copying of data the copy of which is not required.

To attain the above-mentioned object, the present invention also provides a migratory copying method of performing a migratory copying with which data migrates between two storage systems used as external memories of a CPU which issues a request for access to a logical volume, characterized in that in one of the two storage systems serving as a copy destination, the designation of a partial area of a logical volume on the other of the two storage systems serving as a copy source is accepted, data of the designation accepted partial area of the logical volume on the copy source storage system is read from the logical volume on the copy source storage system without the intervention of the CPU, and the read data is written into a logical volume on the copy destination storage system.

According to such a method, since only any partial area of the logical volume can be subjected to migratory copying, it is possible to eliminate unnecessary overhead hitherto caused due to the copying of data the copy of which is not required.

To attain the above-mentioned object, the present invention further provides, for example, a method for arrangement of a logical volume on RAID groups in a storage system which is used as an external memory of a CPU issuing a request for access to a logical volume and is provided with a plurality of RAID groups, characterized in that in the storage system, the designation of the correspondence of partial areas of the logical volume to the RAID groups is accepted and each partial area of the logical volume is arranged on the corresponding RAID group in accordance with the accepted designation, or characterized in that in the storage system, an access characteristic is detected for each partial area of the logical volume and each partial area is rearranged on a RAID group defined in accordance with the access characteristic detected for that partial area.

With this method, the arrangement/rearrangement not in units of one logical volume but for every partial area of a logical volume is enabled, that is, each partial area of a logical volume can be arranged/rearranged on a desired RAID group or a RAID group suitable for the access characteristic of that partial area.

In order to solve the above-mentioned problem associated with the generation of an unnecessary copy originating in that the unit of an object of copying is a volume, that is, the problem that (1) an extra load is imposed to storage devices and (2) an extra time is taken since it is necessary to generate a copy of the whole of a volume even in the case where data in units of a specified area (for example, a dataset or file) in the volume is needed, the present invention uses the following method.

In general, a storage device does not know the structure of a file system managed by a host and is therefore not capable of knowing which area does data forming a dataset or file exist in. In the present invention, there is provided means with which the host informs the storage device of the area. The storage device uses this means to generate a copy of only an area such as a dataset or file which is essentially required. Thereby, extra load and time are reduced.

BRIEF DESCRIPTION OF THE DRAWINGS

FIG. 3 is a diagram showing tables held by storage systems in the first embodiment of the present invention;

FIG. 41 is a block diagram showing the construction of systems according to tenth and eleventh embodiments of the present invention.

DETAILED DESCRIPTION OF THE EMBODIMENTS

Embodiments of the present invention will now be described.

I. First Embodiment

First, the description will be made of a first embodiment of the present invention.

Figure 1:
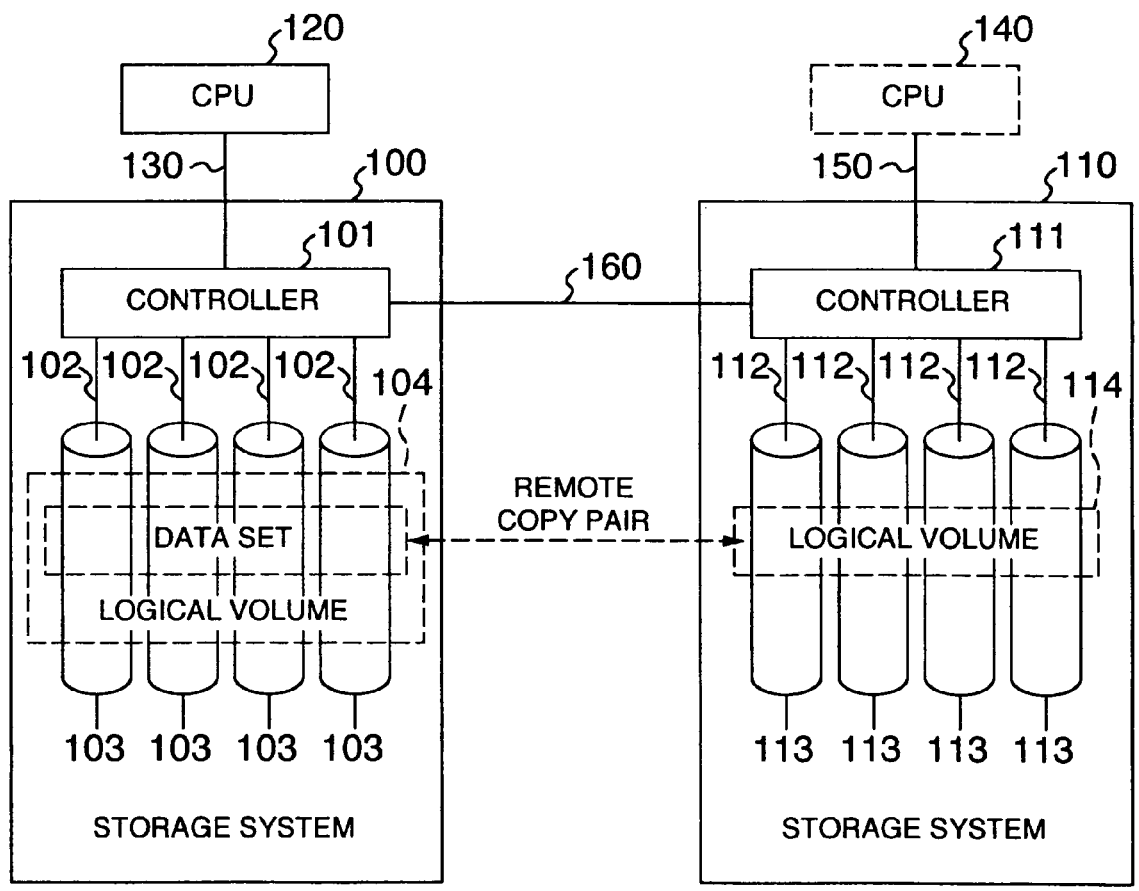
FIG. 1 is a block diagram showing the construction of an information system according to a first embodiment of the present invention.

The first embodiment concerns remote copying. FIG. 1 shows an example of the construction of an information system in which the remote copying is performed.

One or more CPU's 120 and one or more storage systems 100 are arranged at a primary site where a main service is performed.

The CPU 120 executes an application program to issue a request for input/output of data of a logical volume 104 to the storage system 100 of the primary site. The logical volume 104 is logical storage devices which are recognized by the CPU 120.

The storage system 100 is connected to a storage system 110 of a secondary site through one or more inter-controller paths 160. The storage system 100 is composed of one or more controllers 101 and one or more storage devices 103. The controller 101 performs the transfer of data between the CPU 120 and the storage device 103. In the controller 101, there are provided one or more processors for performing microprograms, a cache memory for temporarily storing data of the storage device 103, a memory for storing various tables (which will be mentioned later on), and so forth. The CPU 120, the controller 101 and the storage device 103 communicate with each other through one or more host transfer paths 130 for connection between the CPU 120 and the controller 101 and one or more storage device transfer paths 102 for connection between the controller 101 and the storage device 103 to perform input/output.

The secondary site for holding backup data or a duplicate copy of data stored in the storage system 100 of the primary site has a construction similar to that of the primary site. A CPU 140 and the storage system 110 are arranged at the secondary site. The storage system 110 is composed of one or more controllers 111 and one or more storage devices 113. The controller 111 performs the transfer of data between the CPU 140 and the storage device 113. In the controller 111, there are provided one or more processors for performing microprograms, a cache memory for temporarily storing data inputted/outputted for the storage device 113, a memory for storing various tables (which will be mentioned later on), and so forth.

The processor in the controller 101 or 111 performs each processing of the controller 101 or 111 in accordance with a program which is stored beforehand in the memory provided in that controller. The processing will be mentioned later on.

In order to facilitate the understanding of description in the following, those ones of the constituent elements of the primary and secondary sites which exist at the primary site serving as a data copy source will be denoted with (S) and the constituent elements of the secondary site serving as a data copy destination will be denoted with (T). For example, the CPU 120 of the primary site will be denoted by the CPU (S) 120 and the CPU 140 of the secondary site will be denoted by the CPU (T) 140.

Now, in such a construction, the storage system (T) 110 holds a copy of data of the storage system (S) 100. Namely, data in that area of a logical volume (S) 104 designated by the CPU (S) 120 as an object subjected to remote copying which is designated by the CPU (S) 120 as an object of remote copying, is transferred from the controller (S) 101 to the controller (T) 111 through the inter-controller path 160. The controller (T) 111 stores the data received from the controller (S) 101 into the cache memory provided in the controller (T) 111 and thereafter informs the controller (S) 101 of the completion. Then, the controller (T) 111 writes the data from the cache memory into the storage device (T) 113.

When there occurs the writing from the CPU (S) 120 for that area of the logical volume (S) 104 of the storage system (S) 100 made the object subjected to remote copying which is the object of remote copying, the controller (S) 101 stores write data into the storage device (S) 103 while transferring the write data to the controller (T) 111 through the inter-controller path 160. The controller (T) 111 stores the data received from the controller (S) 101 into the cache memory provided in the controller (T) 111 and thereafter informs the controller (S) 101 of the completion. Then, the controller (T) 111 writes the data from the cache memory into a predetermined area of the storage device (T) 113.

With the foregoing operation, the write data from the CPU (S) 120 is written into the storage system (T) 110, thereby maintaining a state duplicated with the storage system (S) 100. The above processing is performed between the controller (S) 100 and the controller (T) 111 without the intervention of the CPU (S) 120.

As described above, in the first embodiment, only data in that area of the logical volume (S) 104 made the object subjected to remote copying which is made the object of remote copying is transferred to the secondary site where the data is stored into the storage device (T) 113 of the storage system (T) 110. The area made the object of remote copying represents an area the copy of which is truly required. Such an area includes, for example, a dataset including database data, database log, check point file and so forth, and a file.

In the first embodiment, a unit called a logical storage device will now be introduced in order to facilitate a processing on an area made an object of remote copying. The logical storage device will now be described.

Figure 2:
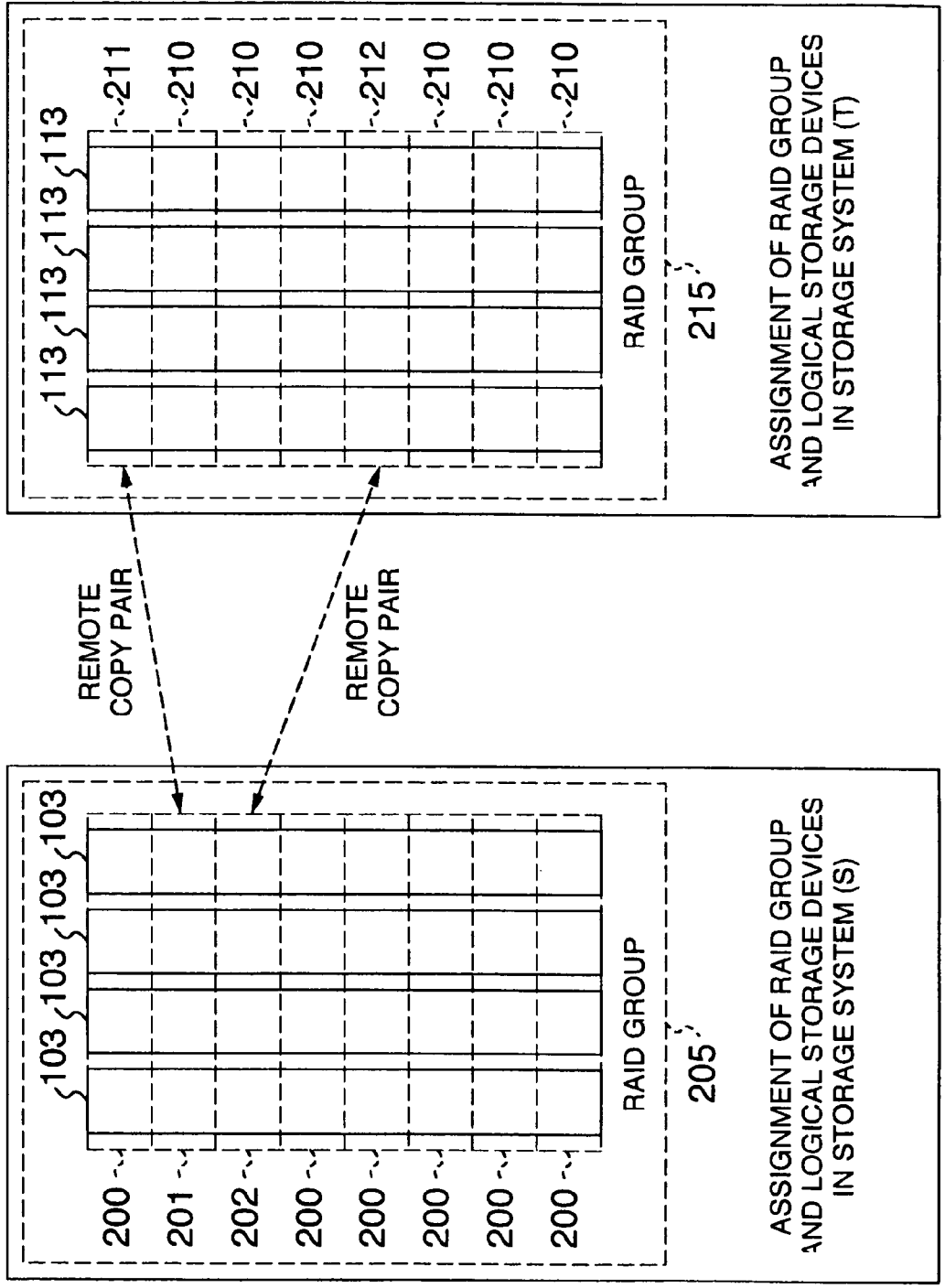
FIGS. 2A and 2B are diagrams for explaining logical storage devices in the first embodiment of the present invention.

FIG. 2A shows that address space of a RAID group (S) 205 formed by a plurality of (or four) storage devices (S) 103 which is managed by the controller (S) 101, and FIG. 2B shows that address space of a RAID group (T) 215 formed by a plurality of (or four) storage devices (T) 113 which is managed by the controller (T) 111.

Logical storage devices (S) 200 are obtained by dividing the address space of the RAID group (S) 205 by every fixed length, and logical storage devices (T) 210 are obtained by dividing the address space of the RAID group (T) 215 by every fixed length. It is not necessarily required that the size or capacity of the logical storage device (S) 200 should be identical to that of the logical storage devices (T) 210–212. Each logical storage device (S) 200 is managed by use of its consecutive number in the storage system (S) 100, and each logical storage devices (T) 210–212 is managed by use of its consecutive number in the storage system (T) 110. Similarly, each logical volume and each storage device are managed by use of their consecutive numbers in each logical storage system. Also, the controllers are applied with their controller numbers and communicate with each other by use of these numbers.

A logical volume is mapped on logical storage devices the number of which corresponds to the capacity of the logical volume.

Though the capacity of the logical storage device 200 may be set by a user, it is required to be equal to or smaller than the capacity of the minimum logical volume 104 which the storage system 100 supports. Also, it is preferable that the capacity of the logical storage device 200 is made as small as possible in order to reduce a useless area.

In the following, the detailed description will be made of the remote copying performed in the information system thus constructed.

First, the description will be made of data which the controllers (S) 101 and (T) 111 hold in order to perform the remote copying.

Each of the controllers (S) 101 and (T) 111 holds logical volume information tables 300 and logical storage device information tables 310 as shown in FIG. 3.

The logical volume information table 300 is a table for associating a logical volume 104 formed on the self-side or corresponding storage system with logical storage devices 200. The table 300 exists for each logical volume 104.

Each logical volume information table 300 is composed of a number 301 of each logical storage device 200 on which the corresponding logical volume 104 is mapped, a logical address range 308 indicating an address range on the logical volume mapped on the logical storage device 200, copy presence/absence information 302 indicating whether or not the logical storage device 200 includes a part of an area made an object of remote copying, a copy address range 305 indicating that portion of the area made the object of remote copying which the logical storage device 200 includes, emulation information 303 indicating the emulation type and capacity of the corresponding logical volume 104, original/copy information 304 indicating whether the corresponding logical volume is a copy source (original) or a copy destination (copy), a copy pointer 306, and a pair state 307.

The table 300 is formed as a table having a plurality of entries with the logical storage device number 301, the logical address range 308, the copy presence/absence information 302 and the copy address range 305 taken as one indexed entry. Then, a method of determining the address of the logical storage device 200 from the address of the logical volume 104 designated by the CPU 120 will be described using an example.

Now assume that a logical volume 104 has a capacity of 4n with addresses of 0 to 4n−1 applied and is mapped on logical storage devices 200 applied with numbers of 0 to 3 each having a capacity of n. Then, the logical storage device number 301 and the logical address range 308 in an entry having an index of 0 are stored with 0 and 0 to n−1, respectively, those in an entry having an index of 1 are stored with 1 and n to 2n−1, respectively, —and so forth.

Accordingly, which logical storage device 200 is a logical address designated from the CPU 120 included in can be determined by dividing the designated logical address by the capacity of the logical storage device 200. Namely, the quotient of the division indicates an entry in which an intended logical storage device number 301 is stored, and the remainder thereof indicates an address on the logical storage device 200.

Also, whether or not the logical address designated from the CPU 120 is included in the area made the object of remote copying can be determined by merely making the comparison with a copy address range 305 in the entry in which the intended logical storage device number 301 thus obtained is stored. Consequently, the introduction of the units of logical storage devices makes it possible to easily perform a processing on a remote copy area and makes it possible to reduce overhead as compared with the case where the units of logical storage devices are not introduced.

The original/copy information 304 in the logical volume information table 300 indicates whether the corresponding logical volume is the logical volume (S) 104, that is, a copy source volume (original volume) or the logical volume (T) 114, that is, a copy destination volume (copy volume) in the case where the corresponding logical volume is a logical volume which forms a pair (hereinafter referred to as "remote copy pair") provided by a logical volume made an object subjected to remote copying and a logical volume of the destination of remote copying.

The pair state 307 indicates which state is the remote copy pair placed in. The state of the pair includes a simplex state indicating that the corresponding logical volume is not a logical volume forming a remote copy pair, an under-copying state in which the copying from the logical volume (S) 104 to the logical volume (T) 114 is being performed, a duplex state in which an operation in a duplicated state is made, a suspended state in which the contents of the logical volume (S) 104 and those of the logical volume (T) 114 do not coincide with each other, and so forth. The copy pointer 306 indicates where is the copying for the remote pair forming logical volumes (S) 104 and (T) 114 or the copying from the former to the latter completed up to. As the emulation information 303 is stored information of the logical volume (S) 104 in order to emulate a logical volume of a main frame. There are several emulation types for the logical volume 104 of the main frame, and a capacity and a format (including a track length, the number of cylinders, the magnitude of a gap between records, and so forth) differ for each emulation type. Therefore, in the case where the logical volume 104 of the main frame is made an object subjected to remote copying, such information is stored in order to make the format matching between the logical volume (S) 104 and the logical volume (T) 114. In the case of an open system, such emulation type does not exist and hence only the capacity of the logical volume (S) 104 is stored. As will be mentioned later on, only the logical storage devices 210 corresponding to the capacity of the area subjected to remote copying are mapped on the logical volume (T) 114. Therefore, for all the logical storage device numbers 301 in the logical volume information table 300 of the logical volume (T) 114 held by the controller (T) 111, the copy presence/absence information 302 is stored with "REMOTE COPY PRESENT", the original/copy information 304 is stored with "COPY DESTINATION", and the copy address range 305 is stored with a remote copy address range designated from the controller (S) 101.

The emulation information 303 (the emulation type and the capacity) of the logical volume information table 300 of the logical volume (T) 114 held by the controller (T) 111 is stored with the emulation information 303 (the emulation type and the capacity) in the logical volume information table 300 of the logical volume (S) 104 held by the controller (S) 101. Herein, it should be noted that in the logical volume information table 300 of the logical volume (T) 114, the capacity of the logical volume (S) 104 is stored as the emulation information 303.

The logical storage device information table 310 is a table for associating the logical storage device 200 with the storage devices 103. In the case where the corresponding logical storage device 200 is made an object subjected to remote copying, the table 300 associates the logical storage device 200 with the opposite-side logical volume 114. The table 310 exists for each logical storage device 200.

Each logical storage device information table 310 held by the controller (S) 101 is composed of a storage device number 311 of each storage device (S) 103 on which the corresponding logical storage device (S) 200 is mapped, an address range 312 indicating an address range of the corresponding logical storage device (S) 200 mapped on the storage device (S) 103, RAID level information 313 indicating a RAID level assigned to a RAID group 205 formed by the storage devices (S) 103, and a pair controller number 314 and a pair logical volume number 315 for specifying, in the case where the corresponding logical storage device 200 includes a part of an area made an object of remote copying, the controller (T) 111 and the logical volume (T) 114 of the storage system (T) 110 which is a destination of remote copying. In each logical storage device information table 310 held by the controller (T) 111, the storage device number 311 and the address range 312 are stored with a storage device number and an address range of each storage device (T) 113 on which the corresponding logical storage device (T) 210 is mapped. Also, the RAID level information 313 is stored with a RAID level assigned to the RAID group 215 formed by the storage devices (T) 113. Further, the pair controller number 314 in each logical storage device information table 310 held by the controller (T) 111 is stored with a controller number of the controller (S) 101 and the pair logical volume number 315 is stored with a null value.

A logical address designated from the CPU 120 is converted into a number of a logical storage device 200 and an address on that logical storage device 200, as mentioned above. Which storage device 103 does this logical address actually correspond to is determined by a logical storage device information table 310 corresponding to the logical storage device number obtained by the conversion. If the access from the CPU 120 in this case is a write access, the reference to the RAID level information 313 of the logical storage device information table 310 is made to generate redundant data in accordance with the RAID level and the generated redundant data is also written into the storage device 103. For this method can be applied a method disclosed by, for example, D. A. Patterson, G. Gibson and R. H. Katz, "A Case for Redundant Arrays of Inexpensive Disks (RAID)", Proc. ACM SIGMOD, June 1988. Also, as will be mentioned later on, in the case where the remote copying is being performed at the time of write access from the CPU 120, the examination based on the logical volume information table 300 of the logical volume (S) 104 is made as to whether or not the logical storage device (S) 200 made an object of access includes a part of an area made an object of remote copying. In the case where the part of the area made the object of remote copying is included, the controller number 314 and the logical volume number 315 of a destination of remote copying are examined from the logical storage device information table 310 corresponding to the corresponding logical storage device (S) 200 to make access to an intended logical volume (T) 114 through the inter-controller path 160.

Next, the details of an operation of performing the remote copying will be described. This operation includes three processings, that is, a processing for generation of a remote copy pair, a processing at the time of writing from the CPU 120 to the storage system (S) 100, and a processing for operation switching from the storage system (S) 100 to the storage system (T) 110. In the following, each of these processings will be described.

(i) Remote Copy Pair Generation Processing

Figure 4:
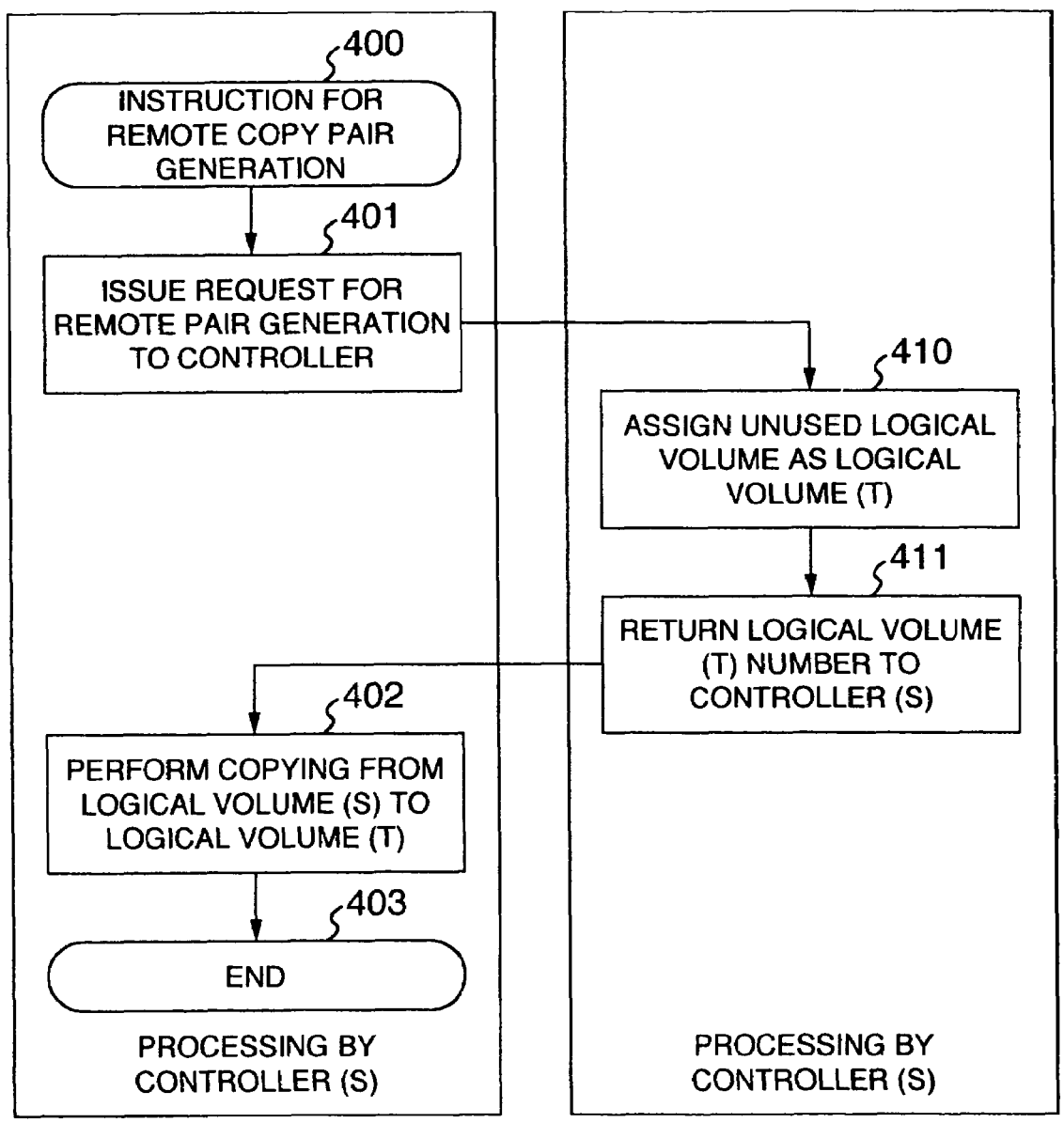
FIG. 4 is a chart showing the flow of a remote copy pair generation processing in the first embodiment of the present invention.

FIG. 4 shows the flow of the remote copy pair generation processing.

First or in step 400, a logical volume 104 made an object subjected to remote copying and an area made an object of remote copying are designated at the primary site, as shown. The designation is made by a user to the controller (S) 101 from the exterior of the storage system (S) 100, for example, the CPU (S) 120, an external terminal (hereinafter referred to as "SVP: service processor") connected to the controller (S) 101, or the like. Herein, it is assumed that a dataset to be subjected to remote copying and an address thereof on a logical volume 104 are known by the user beforehand. When the designation of a number of the logical volume 104 made the object subjected to remote copying and the area made the object of remote copying is made to the controller (S) 101, the controller (S) 101 operates in the above-mentioned method so that the definition as "COPY SOURCE" is made into the original/copy information 304 of a logical volume information table 300 corresponding to the designated number of the logical volume 104 and addresses defined by the remote copy area are stored into the copy address range 305. Thereafter or in step 401, a request for remote copy pair generation accompanied with parameters including at least an emulation type, the capacity of the corresponding logical volume 104 and the area made the object of remote copying is issued from the controller (S) 101 to the controller (T) 111. Regarding the value of each parameter, the emulation type and the capacity of the corresponding logical volume 104 are determined from the emulation information 303 and a remote copy address area is determined by referring to the copy address range 305.

When receiving the request for remote copy pair generation, the controller (T) 111 assigns a logical volume (T) (step 410). More especially, an unused logical volume (T) 114 is first ensured. This logical volume may be ensured in such a manner that an unused logical volume is designated from the exterior or the controller (T) 111 assigns any unused logical volume. Next, unused logical storage devices (T) 210 are assigned to the logical volume (T) 114 so that the area designated by the controller. (S) 101 as the object of remote copying is involved in terms of the capacity. Further, the definition as "COPY DESTINATION" is made into the original/copy information 304 of a logical volume information table 300 corresponding to the logical volume (T) 114. Also, a number of each logical storage device (T) 120 assigned to the logical volume (T) 114 is stored into the logical storage device numbers 301 of the logical volume information table 300 corresponding to the earlier assigned logical volume (T) 114. And, "COPY PRESENT" is stored into the copy presence/absence information 302 of the logical volume information table 300.

Further, the logical address range received from the controller (S) 101 as including the area made the object of remote copying is mapped on each assigned logical storage device (T) 210. The mapped logical addresses are stored into the logical address range 308 of the logical volume information table 300 in an entry corresponding to that logical storage device (T) 210. Also, the copy address range 305 of the logical volume information table 300 in an entry corresponding to each assigned logical storage device (T) 210 is stored with that address range of the area made the object of remote copying which is included in the logical address range mapped on that logical storage device (T) 210. For example, assume the case where addresses n to 4n−1 of the logical volume (S) 104 are the area made the object of remote copying and two logical storage devices numbered by i and j each having a capacity of 2n are assigned to the logical volume (T) so that addresses n to 3n−1 are mapped on the i-numbered logical storage device (T) 210 and addresses 3n to 5n−1 are mapped on the j-numbered logical storage device (T) 210. In this case, the range of n to 3n−1 is stored into both the logical address range 308 and the copy address range 305 in an entry of the logical volume information table 300 indexed with 0 and having the logical storage device number 301 of i, and the range of 3n to 5n−1 and the range of 3n to 4n−1 are respectively stored into the logical address range 308 and the copy address range 305 in an entry indexed with 1 and having the logical storage device number 301 of j.

With the above processing, the assignment is made, for example, as shown in FIGS. 2A and 2B. Therein, two meshed logical storage devices (T) 211 and 212 are assigned to a logical volume (T) 114 formed for that area made an object of remote copying on which two logical storage devices (S) 201 and 202 are mapped. As in the shown example, the logical storage devices (T) 210 may be placed at physically distanced positions on the storage devices (T) 113. Though not illustrated in FIGS. 2A and 2B, the logical storage devices (T) 210 may be positioned on separate RAID groups (T) 215. Now, the controller (T) 111 stores the emulation type and the capacity received from the controller (S) 101 into the emulation information 303 of the logical volume information table 300 of the logical volume (T) 114.

Thereafter or in step 411, the controller (T) 111 informs the controller (S) 101 of the completion of the processing. The controller (S) 101 informed by the controller (T) 111 of the processing completion operates so that a number of the logical volume (T) 114 assigned by the controller (T) 111 is stored into the pair logical volume number 315 of a logical storage device information table 310 corresponding to a logical storage device 200 including a part of the area made the object of remote copying. The number of the logical volume (T) 114 may be given by the user to the controller (S) 101 from the exterior. Otherwise, when the controller (T) 111 gives the information of processing completion, the controller (T) 111 may inform the controller (S) 101 of the number of the logical volume (T) 114 at the same time.

When the remote copy pair generation is completed in step 411, the controller (S) 101 operates so that the area on the logical volume (S) 104 made the object of remote copying is copied into the logical volume (T) 114 with the pair state 307 of the logical volume information table 300 of the logical volume (S) 104 turned into an under-copying state (step 402). Namely, in accordance with the value of the copy pointer 306, an uncopied region in the area made the object of remote copying is transferred to the controller (T) 111 of the storage system (T) 110 with a logical address of that region taken as a destination of transfer. The controller (T) 111 stores each data into a storage device (T) 113 on which a logical storage device (T) 210 mapped with the logical address of the destination of transfer is mapped. As the copying proceeds, the copy pointer 306 is updated. At a point of time when the copying of the area made of remote copying is completed, the pair state 307 of the logical volume information table 300 of the logical volume (S) 104 is turned into a duplex state.

With the foregoing, the remote copy pair generation processing is completed.

In the case where when a partial area of the logical volume (S) 104 has already been made of an object of remote copying, the other area of the same logical volume (S) 104 is to be newly made an object of remote copying, a processing similar to that mentioned above is performed so that a new logical volume (T) 114 is assigned for the new area made the object of remote copying.

In the above processing, there may be the case where logical storage devices (T) 210 cannot be assigned on storage devices (T) 113 notwithstanding that a request for remote copy pair generation is made from the controller (S) 101. For example, there can be considered the case where a capacity corresponding to an area made an object of remote copying does not exist or the case where a designated emulation type has not yet been defined. In such a case, the controller (T) 111 informs the controller (S) 101 that it is impossible to generate a copy.

In the foregoing, there has been described that the designation of an area made an object of remote copying is given to only the controller (S) 101 and the controller (T) 111 is then informed by the controller (S) 101. However, the user can designate the area made the object of remote copying not only to the controller (S) 101 but also to the controller (T) 111. In this case too, the controller (T) 111 makes the assignment of a logical volume 114 by means of the above-mentioned method. As a logical volume (T) 114 of a copy destination, the user may designate a number of an unused logical volume (T) 114 in the storage system (T) 110 to both the controller (S) 101 and the controller (T) 111.

In the above processing, only the minimum logical storage devices (T) 200 required for storing the area made the object of remote copying have been assigned to the logical volume (T) 114 of the designation of remote copying. According to circumstances, however, there may be the case where it is suitable to assign a capacity equivalent to the logical volume (S) 104. This case corresponds to, for example, the case where an area designated as an object of remote copying covers the greater part of the area of the logical volume (S) 104, the case where a sufficient capacity can be ensured in the storage system (T) 110, or the like. When the capacity equivalent to the logical volume (S) 104 is thus assigned to the logical volume (T) 114, it is possible to reduce a labor/time for a work at the time of switching from the primary site to the secondary site which will be described later on. Accordingly, the user is enabled to make the designation as to whether only a capacity corresponding to the minimum logical storage devices (T) 210 required for the area designated from the controller (S) 101 as the object of remote copying should be ensured as the capacity of the logical volume (T) 114 or a capacity equivalent to the logical volume (S) 104 should be ensured as the capacity of the logical volume (T) 114, and the controller (T) 111 ensures the capacity of the logical volume (T) 114 in accordance with the user's designation. This user's designation may be made to the controller (S) 101 so that the controller (T) 111 is then informed by the controller (S). Otherwise, the designation may be made to the controller (T) 111 directly.

(ii) Write Processing

Figure 5:
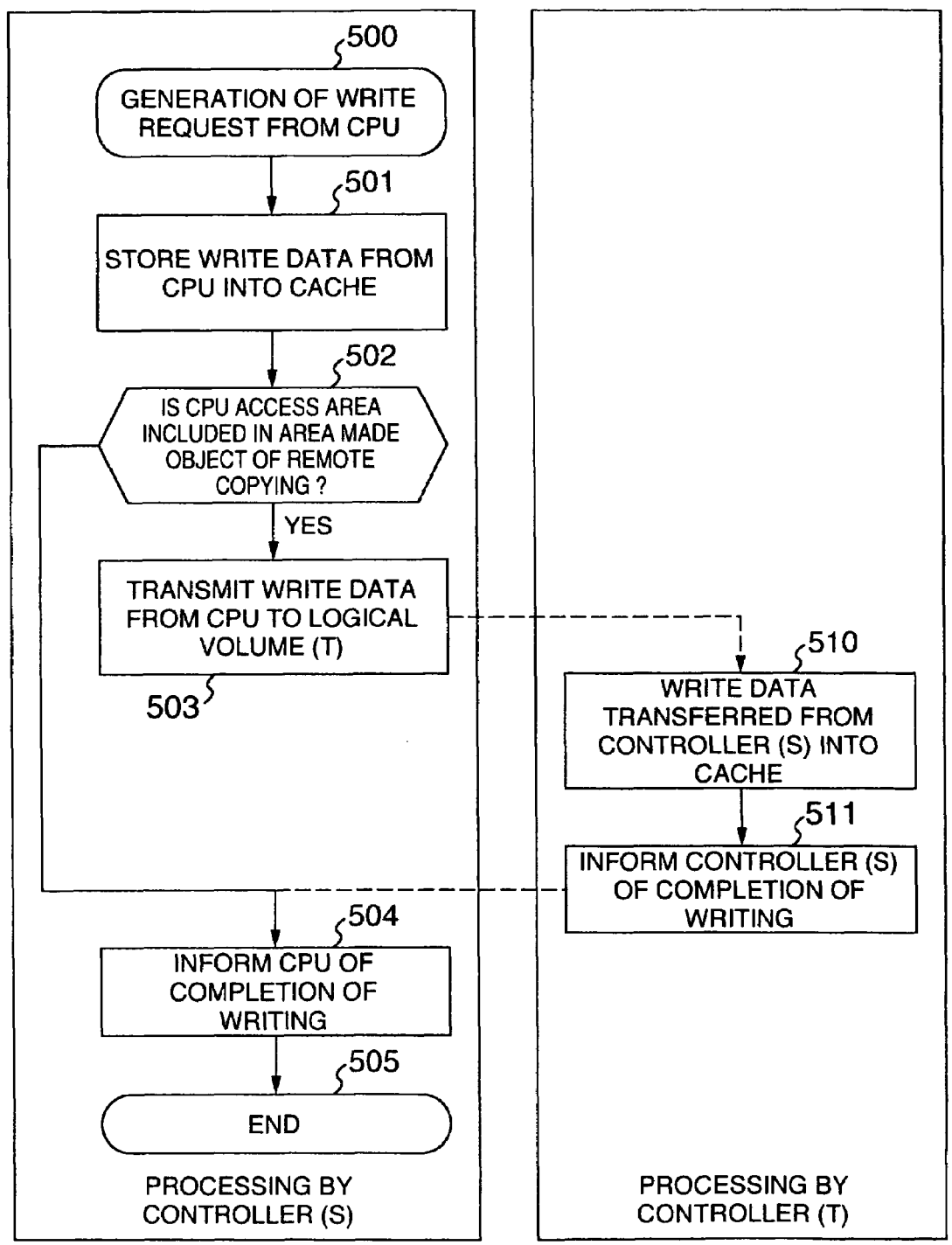
FIG. 5 is a chart showing the flow of a write processing in the first embodiment of the present invention.

Next, a write processing will be described. This processing is performed at the time of writing from the CPU 120 into the storage system (S) 100. FIG. 5 shows the flow of the write processing.

When receiving a request for writing from the CPU 120 to the storage system (S) 100 (step 500), the controller (S) 101 writes the write data transferred from the CPU (S) 120 into the cache memory of the controller (S) 101 (step 501). Thereafter, the reference to the logical volume information table 300 and the logical storage device information table 310 is made so that the write data is written into a storage device (S) 103 corresponding to a logical address.

Next or in step 502, if the write request received from the CPU (S) 102 is one for a logical volume for which the definition as "COPY SOURCE" is made as the original/copy information 304 of the logical volume information table 300, the judgement is made of whether or not this write request is the writing to an area made an object of remote copying. More particularly, a number of a logical storage device including an area to be accessed is further determined from the logical volume information table 300 so that the examination based on the copy presence/absence information 302 of the logical volume information table 300 is made as to whether or not the corresponding logical storage device (S) 200 includes a part of the area made the object of remote copying.

If the corresponding logical storage device (S) 200 includes a part of the area made the object of remote copying, the examination based on the copy address range 305 is made as to whether or not the area accessed by the CPU (S) 120 is included in the area made the object of remote copying. If the area accessed by the CPU (S) 120 is included in the area made the object of remote copying, the write data is transferred to the controller (T) 111 through the inter-controller path 160 on the basis of a predetermined protocol (step 503). Namely, the writing from the controller (S) 101 is made for a logical volume (T) 114 defined by the controller (T) 111. A controller device number and a logical volume number of the destination of writing are recorded in the logical storage device information table 310 of the controller (S) 101. Since an actual example of the predetermined protocol includes, for example, a CKD protocol in the case of a main frame and a fiber channel protocol in the case of an open system, these protocols are used. An address for writing from the controller (S) 101 to the controller (T) 111 is the same as an address for writing from the CPU 120 to the logical volume (S) 104.

On the other hand, the controller (T) 111 informs the controller (S) 101 of the completion of writing (step 511) at a point of time when the write data received from the controller (S) 101 is stored into the cache (step 510). Thereafter, the reference is made to the logical volume information table 300 and the logical storage device information table 310 to perform the writing to a storage device (T) 113 which corresponds to a logical address. The controller (S) 101 informed by the controller (T) 111 of the writing completion informs the CPU 120 of the completion of writing (step 504), thereby completing the write processing. Such a writing processing is also performed when a copy pair is being generated. Namely, whether or not an area made the object of access has already been subjected to copying is judged from the copy presence/absence information 302 and the copy pointer 306 and write data is transferred to the controller (T) 111 when the area has already been subjected to copying. Also, in the case where the write request from the CPU 120 is the writing to an area other than the area made the object of remote copying (step 502), the flow goes to step 504 in which the CPU 120 is informed of the completion of writing, thereby completing the write processing.

(iii) Processing for Operation Switching from Storage System (S) 100 to Storage System (T) 110

This processing is performed in the case where the storage system (S) 100 becomes impossible of use due to a disaster or the like.

When the storage system (S) 100 becomes impossible of use, it is necessary for the secondary site to take over the service. For this purpose, a CPU 140 is first connected to the storage system (T) 110. If possible, the CPU (S) 120 having been connected in the storage system (S) 100 is used as the CPU 140 to be connected. If the connection of the CPU (S) 120 is impossible and a CPU (T) 140 has already existed, this CPU (T) 140 can be used. Also, if necessary, a new CPU (T) 140 may be installed and connected.

Figure 6:
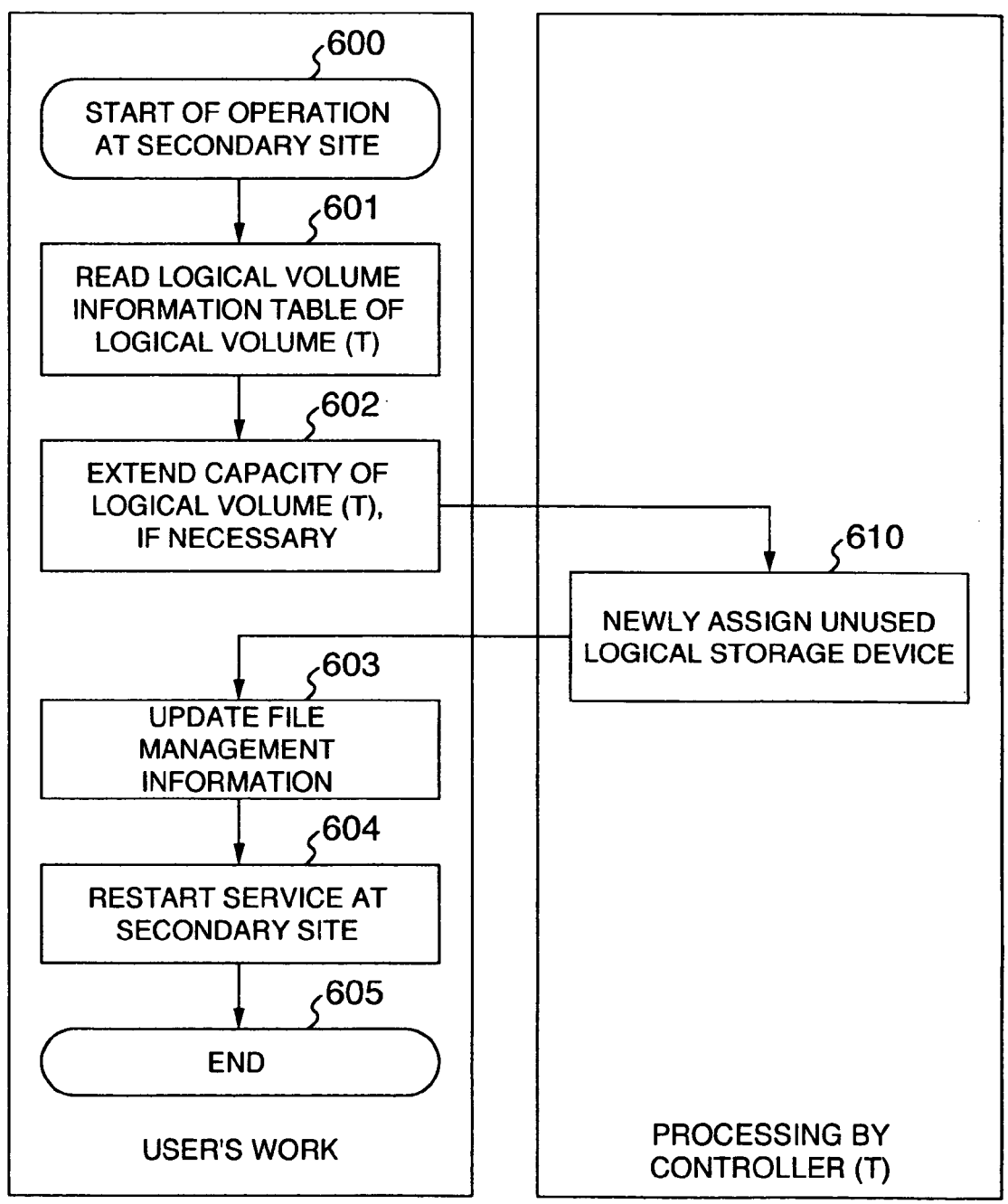
FIG. 6 is a chart showing the flow of a processing for operation switching in the first embodiment of the present invention.

In the present processing, the contents of the logical volume information table 300 of the logical volume (S) 114 stored in the controller (T) 111 are first obtained in step 601, as shown in FIG. 6. More particularly, the contents of the logical volume information table 300 are read from the CPU (T) 140 or read from an SVP or the like connected to the controller (T) 111. The contents of the logical volume information table 300 include the capacity of the logical volume (T) 114, the capacity of the logical volume (S) 104, the remote copy address range, the emulation type, and so forth.

As mentioned in the foregoing, the logical volume (T) 114 has only a copy of a partial area of the logical volume (S) 104. Therefore, it is required that the logical volume (T) should be turned into a physically and logically noncontradictory condition and into a usable condition on the basis of the read logical volume information table 300 of the logical volume (T) 114. For the physically noncontradictory condition, the capacity of the logical volume (T) 114 is made equal to the capacity of the logical volume (S) 104. For the logically noncontradictory condition, dataset and file management information such as VTOC or i-node information is operated to erase dataset and file management information which does not exist in the logical volume (T) 114. These processings will be described in the following.

First, the description will be made of a method of making the capacity of the logical volume (S) 104 and the capacity of the logical volume (T) 114 equal to each other.

This processing is required only when there is a difference between the capacity of the logical volume (S) 104 and the capacity of the logical volume (T) 114. Also, this processing is performed in response to a user's request.

Now, the user instructs the controller (T) 111 to extend the capacity of the logical volume (T) 114, as necessary (step 602). The controller (T) 111 first obtains a difference between the capacity of the logical volume (S) and the capacity of the logical volume (T). More particularly, the emulation type and the capacity of the logical volume (S) 104 are acquired from the logical volume information table 300 of the logical volume (T) 114. Further, on the basis of the logical volume information table 300 of the logical volume (T) 114, the capacity of the logical volume (T) 114 is obtained from the number and the capacity of logical storage devices 210 which are assigned to the logical volume (T) 114.

The CPU (T) 140 or the SVP instructs the controller (T) 111 to assign logical storage devices 210 having a capacity corresponding to the difference in capacity.

The instructed controller (T) 111 searches for logical storage devices 210 in unused states to assign logical storage devices 210 which correspond to the designated capacity. At this time, it should be noted that a track format of the assigned logical storage device 210 must be conformable to the emulation type. For this requirement, it is necessary that the unused logical storage device 210 should be formatted beforehand. Also, in the case where no unused logical storage device 210 exists, it is necessary to cope with this, for example, by additionally installing storage devices 113.

Next, logical addresses having existed on the logical volume (S) 104 are assigned to those newly assigned logical storage devices 210. More particularly, an address range excepting an address range having already been assigned (that is, an address range in an area made an object of remote copying) is mapped in order. For example, in the case where the range of 2n to 3n−1 in the logical addresses 0 to 4n−1 on the logical volume (S) 104 is the area made the object of remote copying, two logical storage devices 210 are newly assigned (with their logical storage device numbers set to i and j) so that logical addresses 0 to 2n−1 are assigned to the i-numbered logical storage device 210 and logical addresses 3n to 4n−1 are assigned to the j-numbered logical storage device 210.

The number and the logical address range of the newly assigned logical storage 210 are stored into the logical storage device number 301 and the copy address range 305 of the logical volume information table 300.

There may be the case where a plurality of logical volumes (T) 114 exist for one logical volume (S) 104. As described earlier, this case corresponds to the case where another area made an object of remote copying is newly added to a logical volume (S) 114 in which an area made an object of remote copying has already existed. In such a case, logical storage devices (T) 210 corresponding to a value obtained by subtracting the total of the capacities of all logical volumes (T) 114 from the capacity of the logical volume (S) 104 are newly assigned to one logical volume (T) 114 and there are applied logical addresses which are not mapped on all the logical volumes (T) 114 but have already existed on the logical volume (S) 104.

And, one logical volume (T) 114 is formed by an assembly of the logical storage devices (T) 210 assigned to all the logical volumes (T) 114 and is assigned with a logical volume number. The logical volume number to be assigned may be one of logical volume numbers hitherto used for the logical volumes (T) 114 or may be given by the user from the exterior.

When the extension of the logical volume (T) 114 is thus completed, the user changes file management information (step 603). This is performed for making dataset and file management information logically noncontradictory. In general, the file management information includes logical volume numbers, the names of datasets and files stored, addresses on logical volumes, and so forth. The change of the file management information is made by erasing that one of information of datasets and files stored in the file management information which is not included in the area made the object of copying (or which is included in an area other than the area made the object of copying), thereby making a change in definition so that the other area is rendered into an unused area.

More particularly, addresses outside of the area made the object of remote copying are first determined on the basis of the copy address range 305 of the logical volume information table 300 held in the controller (T) 111. Next, the file management information is searched for datasets and files included in an area other than the area made the object of remote copying. If such datasets and files exist, management information thereof is erased so that the other area is rendered into an unused area, thereby updating the file management information.

To be concrete, the CPU 140 is caused to execute a utility program having the above-mentioned function. When the above processing is completed, the service at the secondary site is restarted in step 604.

In the foregoing, the first embodiment of the present invention has been described.

The foregoing description has been made assuming that the capacities of logical storage devices in each storage system are equal to each other. In each storage system, however, the capacities of logical storage devices may be made different from each other. In this case, it is required that the above processing should be performed taking the capacities of the individual logical storage devices into consideration.

Next, a second embodiment of the present invention will be described.

II. Second Embodiment

In the second embodiment, there is performed migratory copying in which data migrates between new and old storage systems.

Figure 7:
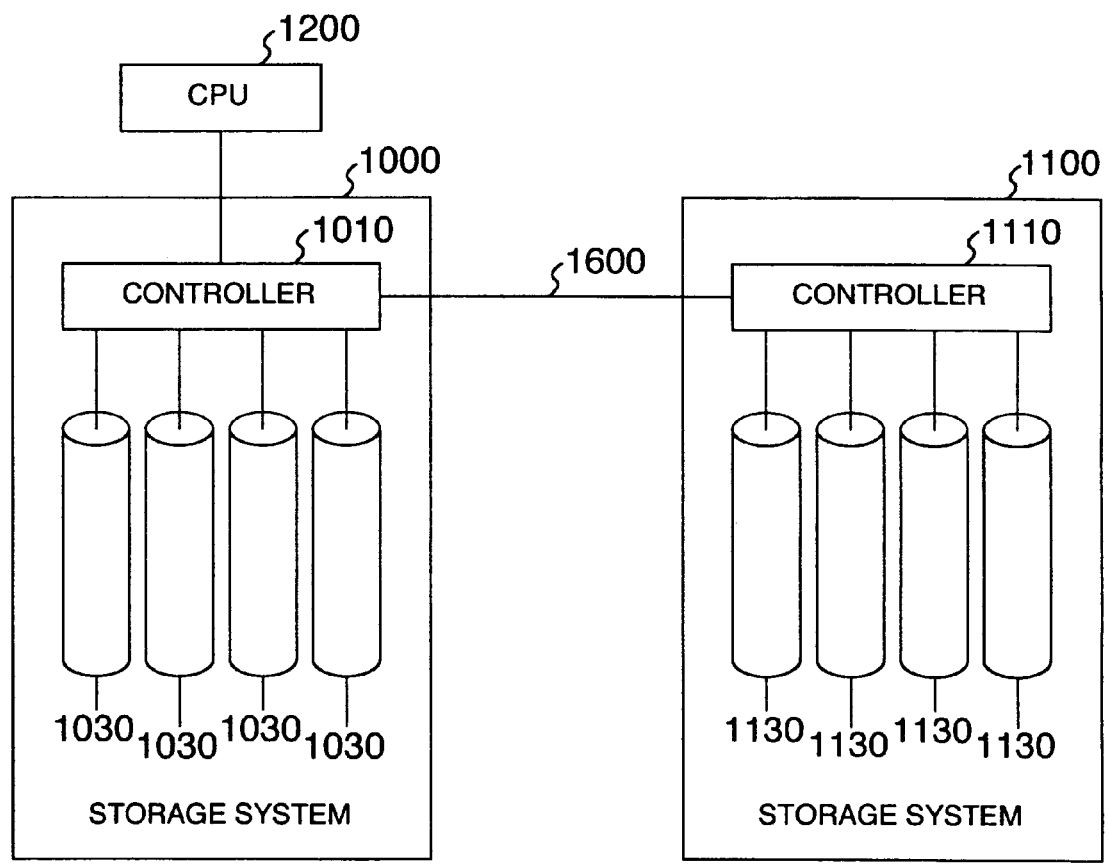
FIG. 7 is a block diagram showing the construction of storage systems in a second embodiment of the present invention.

The description will now be made assuming that the migratory copying from a storage system 1100 to a storage system 1000 is performed, as shown in FIG. 7. The storage system 1000 serving as a copy destination has a controller 1010 and storage devices 1030, and the storage system 1100 serving as a copy source has a controller 1110 and storage devices 1130.

In the following, the storage system 1100 serving as the copy source and the constituent elements thereof will be denoted with (S) and the storage system 1000 serving as the copy destination and the constituent elements thereof will be denoted with (T).

At an initial stage in the case where the migratory copying is to be performed, a CPU 1200 is placed in a state connected to the storage system (S) 1100, that is, the storage system which serves as the data migrating copy source. The new storage system (T) 1000 is carried therein and the connection path from the CPU 1200 to the storage system (S) 1100 is changed so that the connection to the storage system (T) 1000 is effected. And, the controller (T) 1010 and the controller (S) 1110 are connected by an inter-controller path 1600. This state is shown in FIG. 7. Like the storage system 100 shown in conjunction with the first embodiment mentioned above, the storage system (T) 1000 is a storage system in which the controller (T) 1010 manages a logical volume (T) 104 by means of logical storage devices 200 described and shown in conjunction with the first embodiment and holds logical volume information tables 300 and logical storage device information tables 310 (see FIG. 3) therein. On the other hand, the controller (S) 1110 of the storage system (S) 1100 is not required to hold those tables. Accordingly, the storage system serving as the copy source may be the conventional storage system.

Figure 8:
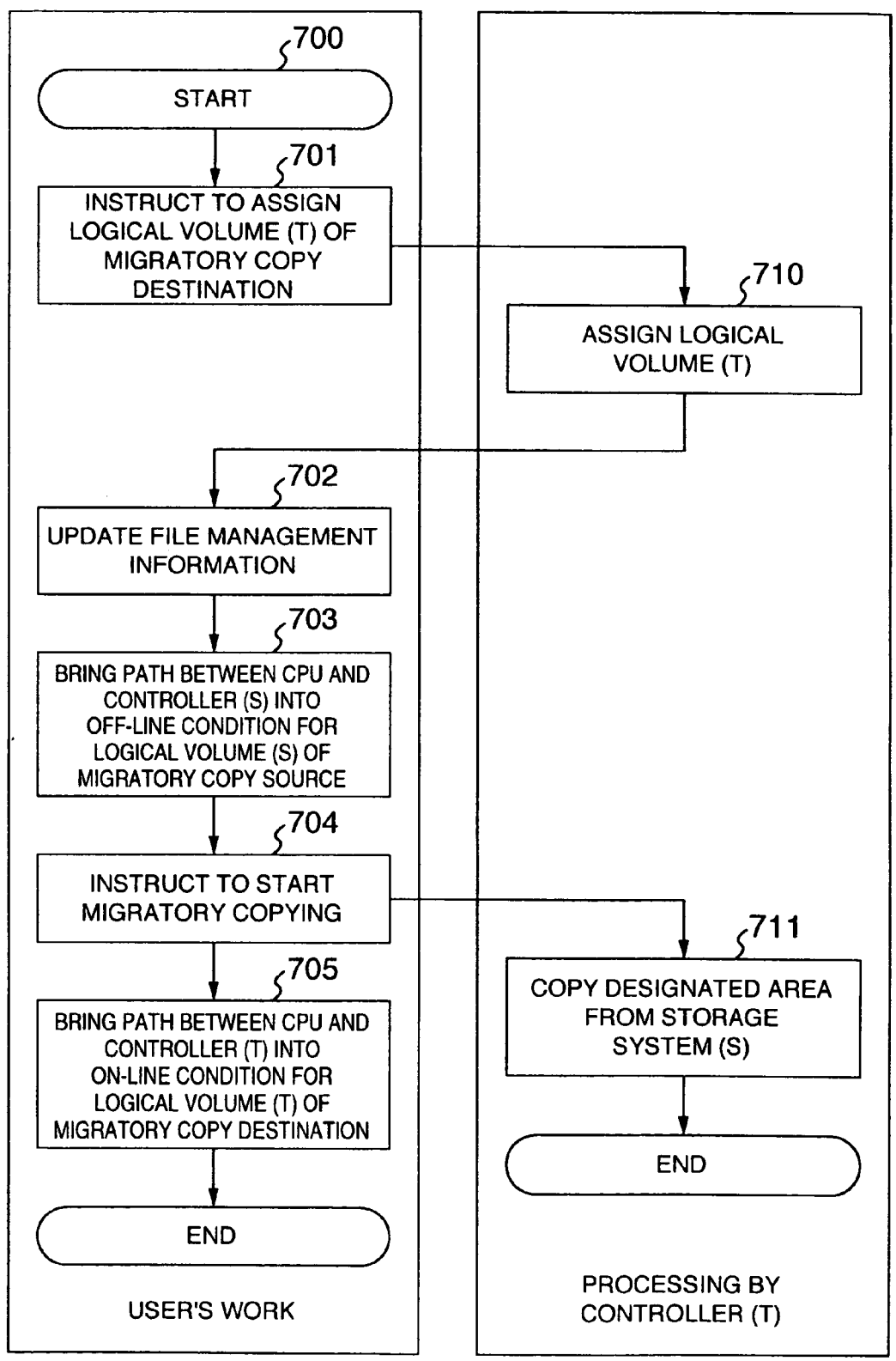
FIG. 8 is a chart showing the flow of a processing for migratory copying in the second embodiment of the present invention.

FIG. 8 shows the flow of a processing for migratory copying.

At the beginning, data made an object of access by the CPU 1200 does not exist in the storage system (T) 1000 but exists in the storage system (S) 1100. Invalid data is stored in the storage system (T) 1000. First in such a state, a user designates parameters such as the logical volume number, the emulation type and the capacity of a logical volume 104 to the controller (T) 1000 and instructs the controller (T) 1010 to assign the logical volume (T) 104 (step 701). In step 710, the controller (T) 1010 assigns the logical volume (T) 104 in accordance with the user's instruction. More particularly, logical storage devices 200 in unused states are assigned to provide a capacity equal to or larger than the designated logical volume capacity and the storage device numbers thereof are stored into the logical storage device numbers 301 of the logical volume information table 300 in accordance with the order of assignment. Finally, the designated emulation type and capacity are stored into the emulation information 303, thereby completing the assignment of the logical volume (T) 104. At this time, it is assumed that the user can designate the capacity of the logical volume (T) 104. Accordingly, it is possible to form a logical volume (T) 104 of any capacity which includes an area made an object of copying.

When the assignment of the logical volume (T) 104 is completed, the user changes file management information of a logical volume (S) 114 of the copy source (step 702). More particularly, the file management information is searched for datasets and files included in an area other than the area made the object of migratory copying so that management information of the searched-out datasets and files is erased.

Subsequently or in step 703, the logical volume (S) 114 of the copy source is brought into an off-line condition disconnected from the CPU 1200 so that it cannot be accessed. Thereafter or in step 704, the controller (T) 1010 is instructed to perform migratory copying with at least a controller number and a logical volume number of the copy source, a logical volume number of the destination of migratory copying and an area of the object of migratory copying taken as parameters.

When receiving the instruction for the start of migratory copying, the controller (T) 1010 starts the migratory copying from the designated area of the designated logical volume (S) 114 of the storage system (S) 1100 (step 711). Prior to the migratory copying, the copy pointer 306 of the logical volume information table 300 is first initialized, that is, a leading address of the area made the object of migratory copying is stored into the copy pointer 306. "MIGRATORY COPY PRESENT" is stored into the copy presence/absence information 302 for a logical storage device 200 including a part of the area made the object of migratory copying. Also, the copy address range 305 is stored with those logical addresses of the area of the object of migratory copying which are included in a logical address range mapped on the corresponding logical storage device 200. For example, provided that logical addresses m (0<m<k–1) to n (k–1<n) are designated for the area made the object of migratory copying, the logical addresses m to k–1 are stored into the copy address range 305 of a logical storage device (T) 200 on which the logical addresses 0 to k–1 are mapped. Subsequently, the pair state 307 of the logical volume information table 300 is turned into an under-migratory-copying state. And, the designated controller number and logical volume number are stored into the pair controller number 314 and the pair logical volume number 315 of the logical storage device information table 310.

When the above processing is completed, the controller (T) 1010 starts the copying of the area made the object of migratory copying. The controller (T) 1010 reads data from a predetermined region of the logical volume (S) 114 in an order from the lead of the designated area in accordance with the value of the copy pointer and writes the data into a storage device (T) 1030 which forms a logical storage device (T) 200 corresponding to the read logical address. The copy presence/absence information 302 in the logical volume information table 300 corresponding to the copy-completed logical storage device (T) 200 is turned into "COPY ABSENT". When the copy of the entire area is ultimately completed, the pair state is turned into a simplex state, thereby completing the migratory copying.

After the instruction for migratory copying, the user brings the data migratory copy destination logical volume (T) 104 of the storage system (T) 1000 into an on-line condition for the CPU 1200 to restart the service (step 705). After the restart of the service, the CPU 1200 is enabled to issue an input/output request to the storage system (T) 1000.

In the case where a request for input/output for an area having not yet been subjected to copying is made from the CPU 1200 to the storage system (T) 1000, the following processing is performed.

Namely, the controller (T) 1010 uses the copy presence/absence information 302, the copy address range 302, the pair state 307 and the copy pointer 306 to examine whether or not an access address from the CPU 1200 falls in an area having not yet been subjected to copying. If the case is so, the controller (T) 1010 reads the corresponding data from the storage system (S) 1100 to store it into a cache memory of the controller (T) 1010 and copes with the access from the CPU 1200 by use of the stored data.

In the foregoing, the second embodiment of the present invention has been described.

In the second embodiment too, the description has been made assuming that the capacities of logical storage devices in each storage system are equal to each other. In each storage system, however, the capacities of logical storage devices may be made different from each other. In this case, it is required that the above processing should be performed taking the capacities of the individual logical storage devices into consideration.

Next, a third embodiment of the present invention will be described.

III. Third Embodiment

In the third embodiment, a logical volume is distributively arranged/rearranged on a plurality of RAID groups.

Figure 9:
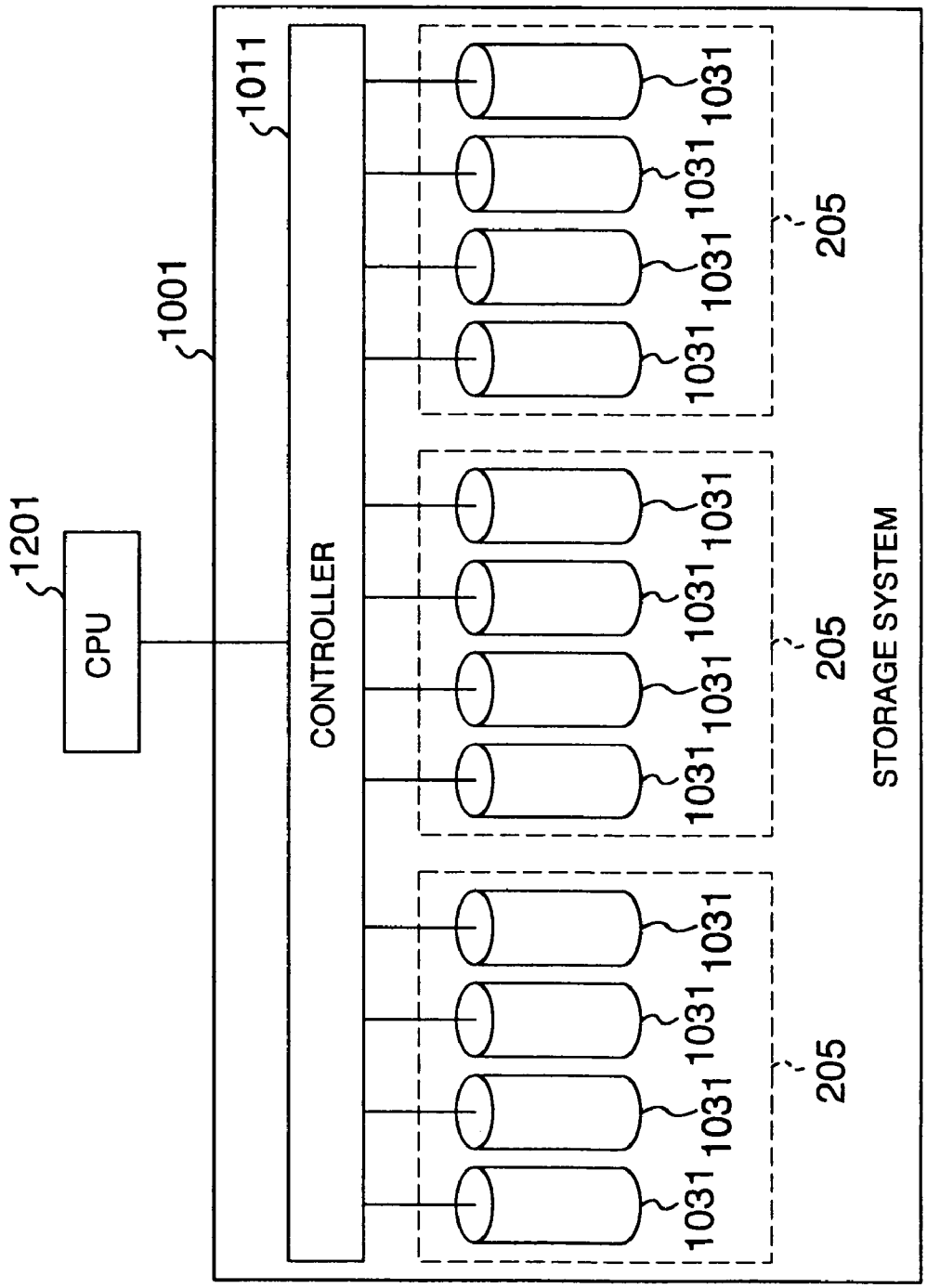
FIG. 9 is a block diagram showing the construction of a storage system according to a third embodiment of the present invention.

FIG. 9 shows the construction of a storage system according to the third embodiment.

As shown, a storage system 1001 according to the present embodiment has a controller 1011 and a plurality of storage devices 1031 which form a plurality of RAID groups 205. The storage system 1001 is connected to a CPU 1201.

Like the storage system 100 shown in conjunction with the first embodiment mentioned above, the storage system 1001 is a storage system in which the controller 1011 manages a logical volume 104 by means of logical storage devices 200 described and shown in conjunction with the first embodiment and holds logical volume information tables 300 and logical storage device information tables 310 (see FIG. 3) therein.

As mentioned above, the logical storage devices 200 are obtained by dividing, for each of the RAID groups 205, the address space of that RAID group by every fixed length. Accordingly, one logical storage device 200 is sure to be a part of the address space of one RAID group 205 and never extends over the address spaces of plural RAID groups 205. In the present embodiment, a logical storage device 200 forming a logical volume 104 is selected from any RAID group 205, thereby making it possible to arrange a logical volume on any RAID group by every any area of the volume. The details will now be described.

In forming a certain logical volume 104, a user designates at least a logical volume number, an area of the logical volume 104 and a number of a RAID group 205 in which that area is to be stored. The user's designation is given to the controller 1011. Receiving the designation, the controller 1011 assigns unused logical storage devices 200 from the designated RAID group 205 to provide a capacity equal to or larger than the capacity of the designated area and maps a logical address range inclusive of the designated area onto the assigned logical storage devices 200. If the unused logical storage devices 200 do not exist, the controller 1011 informs the user that the assignment is impossible.

Numbers of the assigned logical storage devices 200 are stored into the logical storage device numbers 301 of the logical volume information table 300 in accordance with the order of assignment. Thereafter, the controller 1011 informs the user of the logical address range mapped on the assigned logical storage devices 200. Thereby, the user is enabled to designate the next area in reference to the notified logical address range so that the overlapping of areas is not generated.

If the logical volume 104 has already been operating so that valid data is stored in the designated area, it is necessary to rearrange logical storage devices 200 in which the valid data is stored. For this rearrangement, it is necessary that not only the mapping of logical addresses of logical storage devices 200 is changed but also data from logical storage devices having valid data therein is copied into newly assigned logical storage devices 200. Namely, in the case where the logical volume 104 has already hold valid data, there exists the corresponding logical volume table 300. So, after the assignment of copy destination logical storage devices 200 from the designated RAID group 205, the controller 1011 stores a number of the copy destination logical storage device 200 into the pair logical volume number 315 of a logical storage device information table 310 of a copy source logical storage device 200 and records "COPY PRESENT" into the copy presence/absence information 302 for the copy source logical storage device 200 in the logical volume information table 300. This operation is performed for all of the copy destination logical storage devices 200. Finally, the copy pointer 306 is initialized or set to address 0 so as to start the copying from the leading address of a leading copy source logical storage device 200 and the pair state 307 is turned into an under-copying state to start the copying. When the copying is completed with respect to a certain logical storage device 200, the copy source logical storage device number 301 registered in the logical volume information table 300 is rewritten to a copy destination logical storage device number stored in the pair logical volume number 315 of the logical storage device information table 310 of the copy source logical storage device 200 and the copy presence/absence information 302 in an entry having this logical storage device number is turned into "COPY ABSENT". Now, for write data sent from the CPU 1201, there is the case where "COPY PRESENT" is set as the copy presence/absence information 302 in a logical volume information table 300 for a logical storage device 200 on which a write area is mapped in the logical volume information table 300. In this case, it is necessary to write the write data into a copy destination logical storage device 200 as follows.

Namely, the examination based on the logical volume information table 300, more especially, the copy presence/absence information 302 for the logical storage device 200 having the write area mapped thereon and the copy pointer 306 is made as to whether the write area is an area having already been subjected to copying, an area having not yet been subjected to copying or an area other than an area made an object of copying. If the write area is an area having already been subjected to copying, the data is written into a copy destination logical storage device 200 indicated by a copy destination logical storage device number stored in the pair logical volume number 315 of a logical storage device information table 310 for the logical storage device 200 on which the write area is mapped. If the write area is an area having not yet been subjected to copying or an area other than an area made an object of copying, the write data is written into the logical storage device 200 on which the write area is mapped.

On the other hand, in the case where there is a read access from the CPU 1201, data is read from a copy destination logical storage device 200 if a read area or an area to be subjected to reading is an area having already been subjected to copying and from a copy source logical storage device 200 if the read area is an area having not yet been subjected to copying or an area other than an area made an object of copying. While a input/output request from the CPU 1201 is thus processed, the copying is performed. When the copying is completed for the entire area, the pair state is turned into a simplex state (or a copy pair absent state), thereby completing the reconstruction of the logical volume 104.

In the foregoing, the third embodiment of the present invention has been described.

Next, a fourth embodiment of the present invention will be described.

IV. Fourth Embodiment

In the third embodiment mentioned above, a logical volume 104 has been rearranged in accordance with the user's designation of a logical volume number, an area of the logical volume 104 and a number of a RAID group 205 in which that area is to be stored. In the fourth embodiment proposed thereinstead, an access pattern and statistical information such as operation information are acquired for each logical storage device 200 so that a logical volume 104 is rearranged automatically or manually by virtue of the characteristic of the acquired information. The details will now be described.

In the fourth embodiment, the read rate and write rate of a random access, the read rate and write rate of a sequential access, the utilization rate of a logical storage device 200, and so forth are acquired for each logical storage device 200. Such statistical information is examined at a certain fixed period to calculate the optimum arrangement of logical storage devices 200. An example of a method for determining the optimum arrangement includes determining the utilization rate of each RAID group 205 from the sum of the utilization rates of logical storage devices 200 which form that RAID group 205. If the utilization rates of the respective RAID groups 205 have a large dispersion or difference, the logical storage devices 200 are rearranged on the RAID groups 205 so that the utilization rates are leveled.

At this time, the arrangement is determined taking an access pattern into consideration additionally. For example, in the case where a random access is frequently made, the shortening of a response time becomes important. Therefore, a logical storage device subjected to such access is arranged on a RAID group which is formed by high-speed, small-capacity storage devices and has a RAID level of RAID 1. In the case where a sequential access is frequently made, a throughput (or the number of I/O processings per unit time) becomes important. Therefore, a logical storage device subjected to such access is arranged on a RAID group which has a RAID level of RAID 5. With such arrangement, many storage devices are simultaneously operated to improve the throughput.

A processing for determination of the rearrangement mentioned above may be performed by a processor provided in the controller 101 or an external terminal connected to the controller 101.

Subsequently to the determination of the new arrangement of logical storage devices 200, the copying is performed in a manner similar to that in the third embodiment so that the arrangement of logical storage devices 200 are actually changed.

In the foregoing, the fourth embodiment of the present invention has been described.

Next, a fifth embodiment of the present invention will be described.

V. Fifth Embodiment

In the first embodiment mentioned above, since it is necessary to divide a logical volume 104 into a plurality of logical storage devices 200 beforehand, a memory area for ensuring logical storage device information tables 310 is required to be larger as the capacity of the logical storage device 200 is made smaller. This deteriorates the efficiency in the case where only a part of the logical volume 104 is made an object of remote copying.

Thus, in the fifth embodiment, there is realized remote copying in which the above problem is solved.

The construction of an information system according to the fifth embodiment is similar to that shown in FIG. 1. However, the fifth embodiment is different in that the controller (S) 101 and the controller (T) 111 are provided with tables shown in FIGS. 10 and 11 in lieu of the logical volume and logical storage device information tables 300 and 310 shown in FIG. 3. The details will now be described.

First, the description will be made of tables held by the controller (S) 101.

Figure 10:
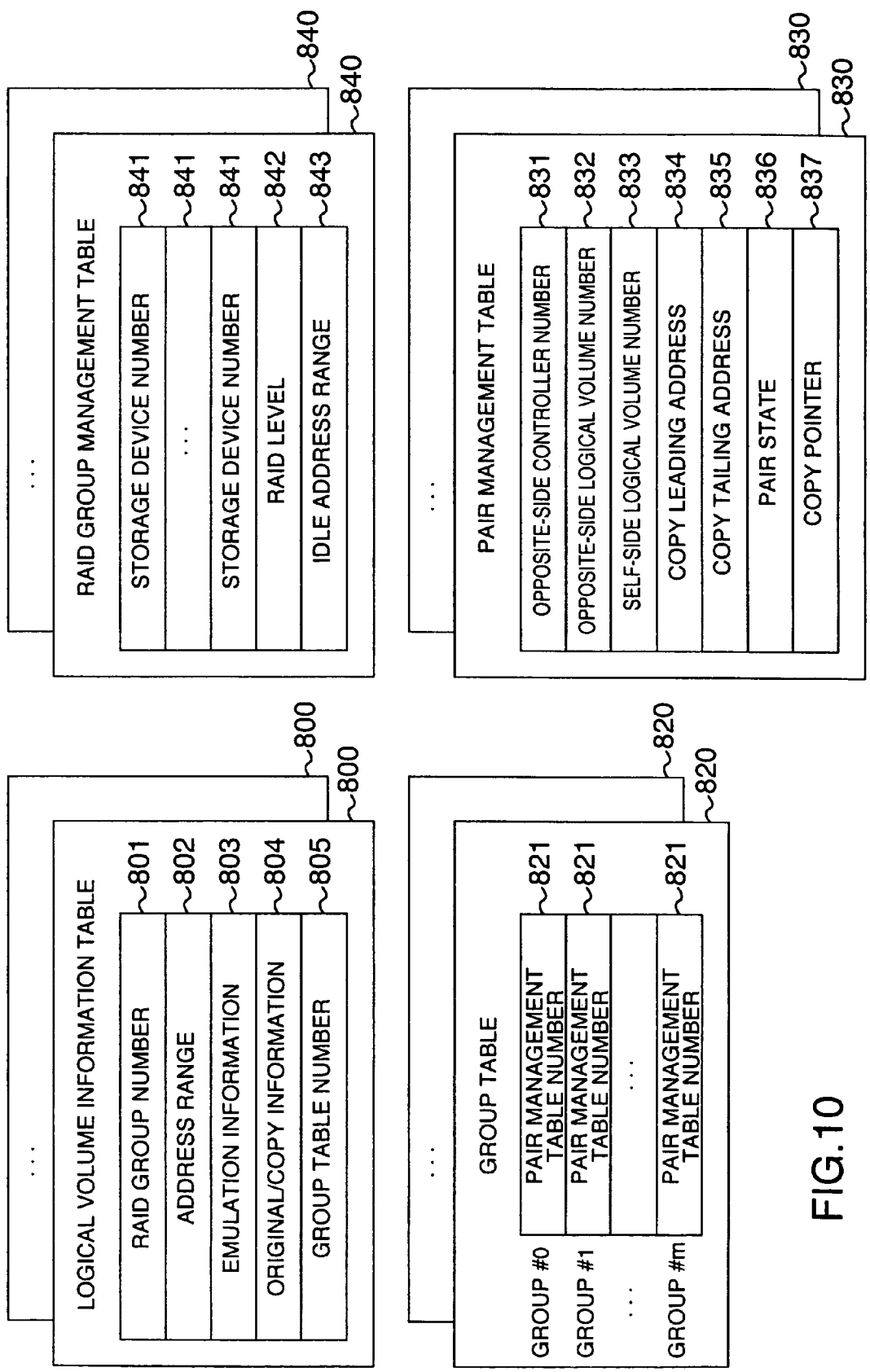
FIG. 10 is a diagram showing tables held by a copy source storage system in a fifth embodiment of the present invention.

The controller (S) 101 holds logical volume information tables 800, RAID group management tables 840, group tables 820 and pair management tables 830 as shown in FIG. 10.

The logical volume information table 800 and the group table 820 are provided for each logical volume. The RAID group management table 840 is provided for each RAID group. Now, in the fifth embodiment, the area of the logical volume 104 is divided into groups by every equal size and these groups are sequentially numbered. For example, the grouping is made in terms of the number of blocks in the case of an open system and in terms of the number of cylinders or the number of tracks in the case of a main frame, and the groups are numbered with 0, 1, —in a sequence from a group including a leading address.

The logical volume information table 800 is composed of a RAID group number 801 indicating a number of a RAID group 205 forming a logical volume 104, an address range 802 indicating an address range of the logical volume on the RAID group 205, emulation information 803, original/copy information 804, and a group table number 805.

The address range on the RAID group 205 is an address range on storage devices 103 forming the RAID group 205, that is, a leading address and the number of blocks. An area indicated by this address range forms a logical volume 104. In the fifth embodiment, since one logical volume 104 is defined by a common address range of storage devices 103 forming a RAID group, a leading address of this common address range and the number of blocks therein are stored into the address range 802.

The emulation information 803 and the original/copy information 804 are the same as the emulation information 303 and the original/copy information 304 (see FIG. 3) shown in conjunction with the first embodiment. If the corresponding logical volume 104 is made an object of copying, "COPY SOURCE" is stored into the original/copy information 804. On that particular case, the value of the group table number 805 becomes valid.

The group table number 805 is stored with a number of a group table 820 assigned to the logical volume.

The RAID group management table 840 is a table for associating a RAID group 205 with storage devices 103. The table 840 is composed of storage device numbers 841 stored with numbers of storage devices 103 forming a RAID group 205, a RAID level 842 stored with the RAID level of the RAID group, and an idle address range 843 representing an unused area of the RAID group 205.

The group table 820 is a table by which each of groups of a logical volume 104 assigned with that group table 820 is associated with a pair management table 830 managing a copy destination logical volume 114 of that group. The table 820 stores a pair management table number 821 associated with each group. By making access to the group table 820 with a group number taken as an index, it is possible to know a pair management table number of the corresponding group.

The pair management table 830 is a table for associating a copy source logical volume 104 with a copy destination logical volume 114. The table 830 is composed of an opposite-side controller number 831 stored with a number of a copy destination controller (T) 111, an opposite-side logical volume number 832 stored with a number of a logical volume (T) 114 of a copy destination storage system (T) 110, a self-side logical volume number 833 stored with a number of a copy source logical volume (S) 104, a copy source leading address 834 and a copy source tailing address 835 stored with leading and tailing addresses of the logical volume (S) 104 which are made an object of copying, a pair state 836 indicating the state of a copy pair, and a copy pointer 837 representing the progression of the copying.

The group tables 820 and the pair management tables 830 are held by a number defined in the system beforehand, and the number is determined a memory capacity of the controller (S) 101 and the maximum number of pairs. Also, these tables are dynamically assigned and opened, as required. Namely, when a pair is generated, an unused table is assigned. When the pair is released, the table is opened or turned into an unused condition again. Accordingly, there is no fear that a large-capacity storage resource is consumed for storing the group tables 820 and the pair management tables 830.

Next, the description will be made of the tables held by the controller (T) 111.

Figure 11:
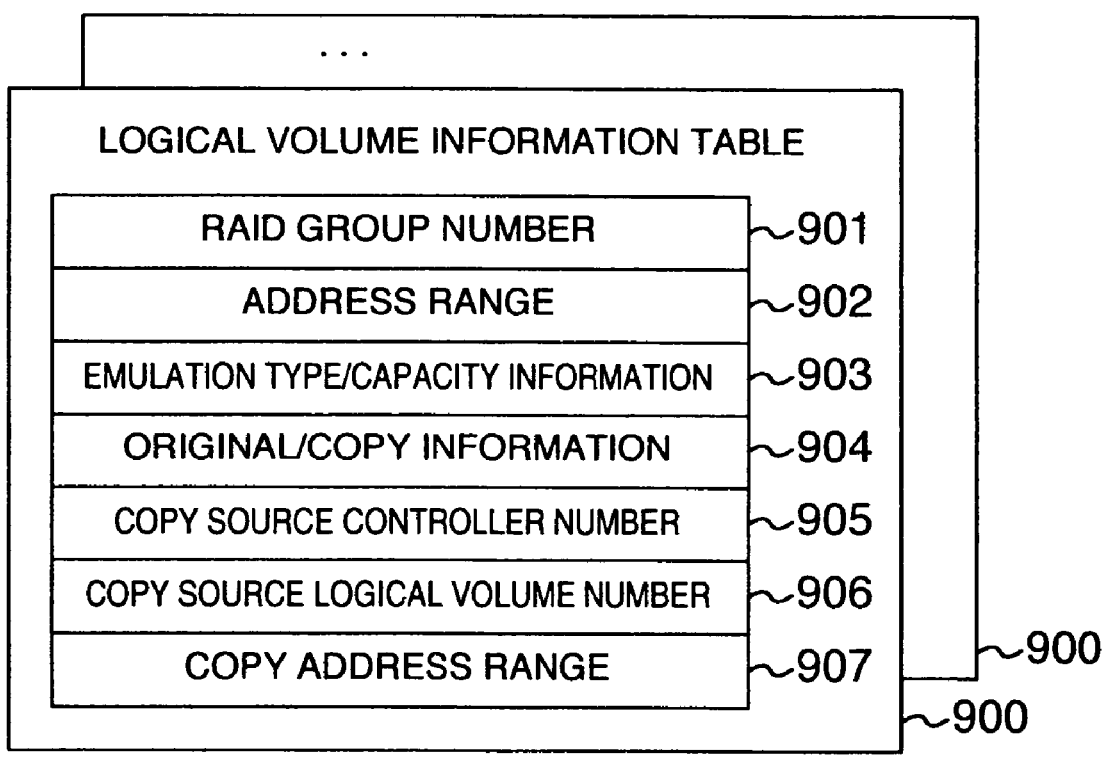
FIG. 11 is a diagram showing tables held by a copy destination storage system in the fifth embodiment of the present invention.

The controller (T) 111 holds logical volume information tables 900 shown in FIG. 11 and the RAID group management tables 840 shown in FIG. 10.

The logical volume information table 900 is provided for each logical volume (T) 114. The table 900 is composed of a copy source controller number 905 stored with a number of a controller (S) 110 as a copy source of the logical volume (T) 114, a copy source logical volume number 906 stored with a number of a logical volume (S) 104 of a copy source storage system (S) 100, and a copy address range 907 stored with an address range of the copy source logical volume (S) 104 made an object of copying. Though the table 900 further holds a RAID group number 901, an address range 902, emulation information 903, and original/copy information 904, the contents thereof are similar to those shown in FIG. 10.

Next, the details of an operation of performing the remote copying will be described. As in the first embodiment, this operation includes three processings, that is, a processing for generation of a remote copy pair, a processing at the time of writing from the CPU 120 to the storage system (S) 100, and a processing for operation switching from the storage system (S) 100 to the storage system (T) 110. In the following, each of these processings will be described.

(i) Remote Copy Pair Generation Processing

The remote copy pair generation processing will be described by use of FIG. 4 used in the description of the first embodiment.

In step 400 of FIG. 4, a user gives an instruction for remote copy pair generation to the controller (S) 101 together with information similar to that in the first embodiment.

When receiving the instruction for remote copy pair generation in step 400, the controller (S) 101 assigns one unused pair management table 830. If there is no unused pair management table 830, it is impossible to newly generate a copy pair and hence the controller (S) 101 informs the user of that effect, thereby completing the processing. In this case, it is necessary for the user to release a copy pair having already been generated, thereby opening a pair management table 830.

Next or when a pair management table 830 is ensured, a number of a copy destination controller (T) 111 given from the user is stored into the opposite-side controller number 831 of the pair management table 830 and a number of a copy source logical volume (S) 104 is stored into the self-side logical volume number 833 thereof. Also, a copy leading (head) address and a copy tailing (end) address given from the user are stored into the copy source leading address 834 and the copy source tailing address 835 of the pair management table 830, respectively. Next, in the case where the logical volume 104 made the copy source by the present instruction for remote copy pair generation is first subjected to the generation of a remote copy pair, an unused group table 820 is assigned to this logical volume. And, a number of the now assigned pair management table 830 is stored into an entry corresponding to a group including a portion of an area made an object of remote copying and a null value is stored into an entry corresponding to a group in an area other than the area made the object of remote copying. Since each group has a fixed length, logical addresses corresponding to each group are uniquely defined by a group number.

Now, a method of determining group numbers in the area made the object of remote copying and outside of the area made the object of remote copying will be described. For example, in the case of a main frame, if it is assumed that one group is formed by n tracks and there exist n tracks per cylinder, a track addressed with a cylinder address a and a head address b belongs to a group a. In the case of an open system, on the other hand, if one group is formed by n blocks, a block m belongs to a group numbered by an integer portion of the quotient of m÷n. Thus, the logical address of the area made the object of remote copying is converted into a group number to determine group numbers in the area made the object of remote copying and outside of the area made the object of remote copying.

Next, a number of the now assigned group table 820 is stored into the group table number 805 of a logical volume information table 800 corresponding to the logical volume instructed for remote copy pair generation and "COPY SOURCE" is stored into the original/copy information 804 thereof.

In step 401, a request for remote copy pair generation is issued to the controller (T) 111. Parameters transferred to the controller (T) 111 together with the request for remote copy pair generation are similar to those in the first embodiment.

Now receiving the request for pair generation, the controller (T) 111 assigns an unused logical volume 114 as a logical volume (T) 114 (step 410). At this time, a capacity conformable to the area designated from the controller (S) 101 as the object of remote copying is assigned to the logical volume (T) 114, as follows. Namely, the controller (T) 111 refers to the idle address ranges 843 of RAID group management tables 840 to judge whether or not the required capacity can be ensured from a certain RAID group (T) 215. If the insurance is possible, the required capacity is ensured from an idle area and the idle address range is correspondingly updated. An unused logical volume information table 900 is assigned so that a number of the RAID group 215 and the address range as ensured are stored into the RAID group number 901 and the address range 902. If the idle address range 843 corresponding to the required capacity does not exist, a search is made for an assignable RAID group (T) 215 and the table 900 is assigned to the RAID group. Otherwise, the user may designate an assignable RAID group 215 beforehand.

When the copy destination logical volume (T) 114 is thus assigned, an emulation type and the capacity of the copy source logical volume (S) 104 received from the controller (S) 101 are stored into the emulation information 903 of the logical volume information table 900 corresponding to the assigned logical volume (T) 114, and "COPY DESTINATION" is stored into the original/copy information 904. Also, a number of the copy source controller (S) 101 and a number of the copy source logical volume (S) 104 are stored into the copy source controller number 905 and the copy source logical volume number 906 of the logical volume information table 900, respectively. Further, an address range of the area made the object of remote copying is stored into the copy address range 907. In step 411, the controller (T) 111 informs the controller (S) 101 of a number of the assigned logical volume (T) 114. In step 402, the controller (S) 101 stores the number of the logical volume (T) 114 received from the controller (T) 111 into the opposite-side logical volume number 832 of the pair management table 830, turns the pair state 836 into an under-copying state and stores the value of the copy leading address 834 into the copy pointer 837 to start a copy processing. The copy processing is performed in a manner similar to that in the first embodiment while updating the copy pointer 837.

Now, in the case where a partial area of a certain logical volume 104 has already been made an object of remote copying and the other area is to be newly made an object of remote copying, a group table 820 corresponding to the corresponding logical volume 104 has already been ensured and hence only a pair management table 830 is newly assigned to store information mentioned above. Also, a number of the newly assigned pair management table 830 is stored into an entry in the group table 820 corresponding to the group number of a group including the newly designated area portion of the object of remote copying. The subsequent processing is similar to that described until now.

(ii) Write Processing

Next, the description will be made of a processing in the case where a write request is issued from the CPU 120 to the storage system (S) 100.

The difference of the present embodiment from the first embodiment with respect to a write processing lies in a method of judging whether or not an area made an object of writing falls in a copy range. In the present embodiment, the original/copy information 804 of a logical volume information table 800 corresponding to a logical volume (S) 104 made an object of access is looked at to examine whether or not the logical volume (S) 104 forms a remote copy pair as "COPY SOURCE". If it forms a remote copy pair as "COPY SOURCE", the group table number 805 is looked at so that a group number including addresses to be accessed is used as an index to access a group table 820. Then, a number of a pair management table 830 is known. Hence, the pair management table 830 indicated by this number is accessed. The judgement of whether or not a pair state is an under-copying state is made from the pair state 836. In the case where the pair state is an under-copying state, the examination of whether or not the addresses to be accessed are included in an area having already been subjected to copying is made from the values of the copy leading address 834 and the copy pointer 837. If the addresses are included in that area, write data is transferred to the storage system (T) 110 and is then written. In the case where the pair state is a duplex state, the judgement based on the copy leading address 834 and the copy tailing address 835 is made as to whether or not the addresses to be accessed are included in this range. If the addresses are included in that range, the write data is transferred to the storage system (T) 110 and is then written.

(iii) Processing for Operation Switching from Storage System (S) 100 to Storage System (T) 110

When the storage system (S) 100 becomes impossible of use, it is necessary for the secondary site to take over the service. For this purpose, a CPU 140 is first connected to the storage system (T) 110.

At this time, only a partial area of a logical volume (S) 104 is held by a logical volume (T) 114. Therefore, if necessary, the logical volume (T) 114 is extended in terms of capacity so that it is conformable to the capacity of the logical volume (S) 104.

In the fifth embodiment, a logical volume satisfying a required capacity is newly assigned to the storage system (T) 110 and data of the remote copy destination logical storage volume (T) 114 is copied into the newly assigned logical volume. In the following, the remote copy destination logical storage volume (T) 114 will be denoted by a logical volume A 114 and the newly assigned logical volume 114 will be denoted by a logical volume B 114.

Figure 12:
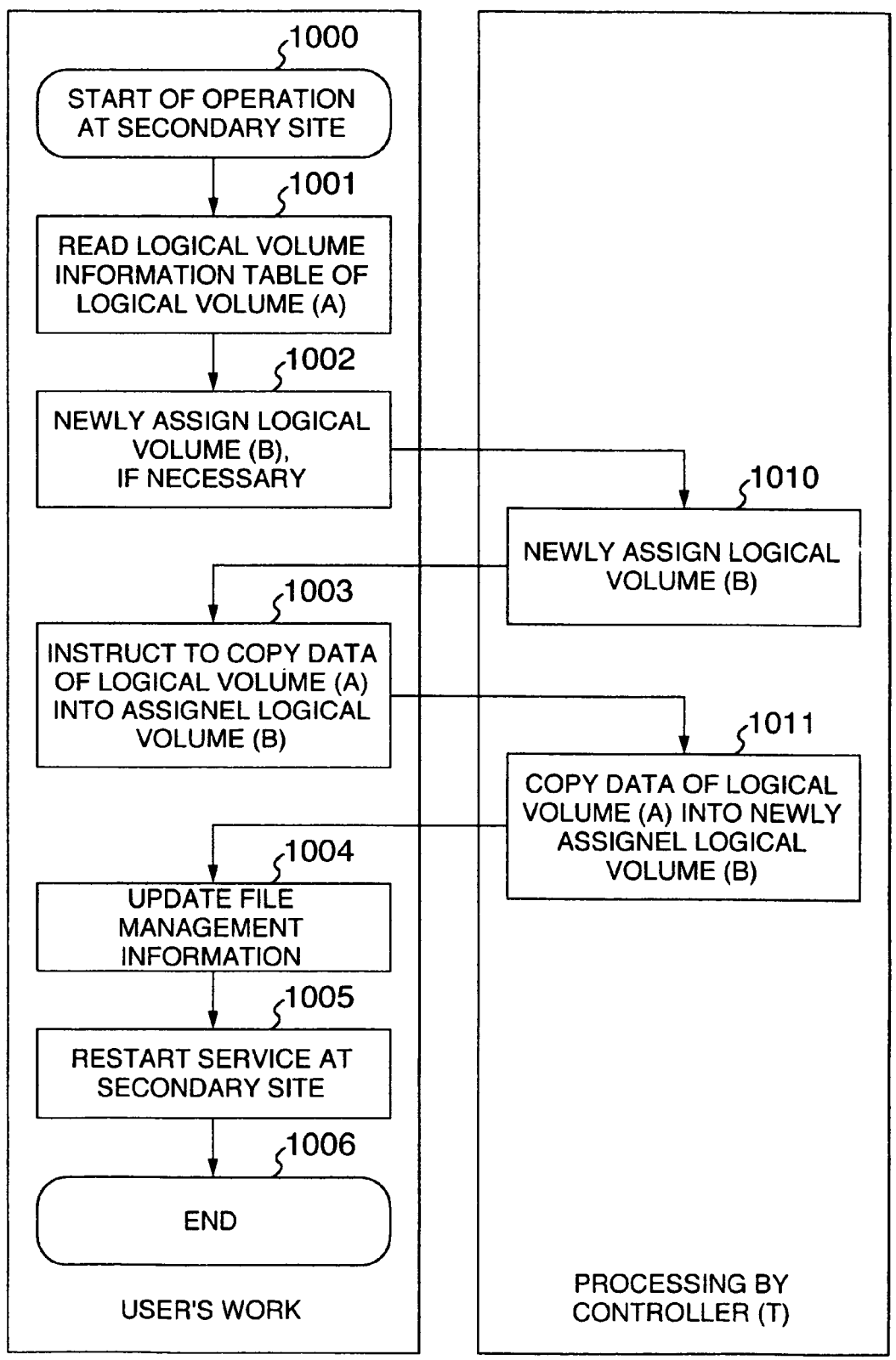
FIG. 12 is a chart showing the flow of a processing for operation switching in the fifth embodiment of the present invention.

The flow of the present processing for operation switching will now be described using FIG. 12.

As shown, a user first reads capacity information of the logical volume A 114 from the CPU 140 or an external terminal connected to the controller (T) 111 (step 1001). Next, the judgement is made of whether the logical volume A 114 should be used as it is or the logical volume A 114 should be used in a form extended in terms of capacity so that it corresponds to the logical volume (S) 104.

In the case where the extension is needed, the emulation information 903 of a logical volume information table 900 corresponding to the logical volume A 114 is read to acquire the emulation type and capacity of the logical volume (S) 104 and the user instructs the controller (T) 111 on the basis of the acquired information to newly assign a logical volume B 114. At this time, the user designates at least the emulation type. Further, the user designates a logical volume number, as required.

In step 1010, the controller (T) 111 assigns the logical volume B 114 of the designated emulation type and capacity. However, the assignment of the new logical volume B 114 is not necessarily required. For example, a logical volume 114 defined on the storage system 110 of the secondary site may be used.

Subsequently or in step 1003, the user makes an instruction for the copying of data from the logical volume A 114 into the logical volume B 114. At this time, the user looks at the copy address range 907 of the read logical volume information table 900 to designate an area to be copied.

Receiving the instruction from the user, the controller (T) 111 copies data of the designated area from the logical volume A 114 into the logical volume B 114. Since addresses on the remote copy source logical volume (S) 104 are stored in the copy address range 907, the copying is performed for an area of the logical volume B 114 corresponding to these addresses. For example, provided that addresses m to n are stored in the copy address range 907, data of the logical volume A 114 is copied into an area of the logical volume B 114 corresponding to addresses m to n.

When the copying is completed, file management information is updated in a manner similar to that in the first embodiment (step 1004) and the operation at the secondary site is thereafter started (step 1005).

In the fifth embodiment, after the copying from the logical volume A 114 to the logical volume B 114 is completed, the file management information is updated and the operation at the secondary site is then started. However, the updating of the file management information and the subsequent start of the operation may be possible in the midst of copying. This can be realized by making access to the logical volume A 114 if the logical volume A 114 has already been subjected to copying and access to the logical volume B 114 if the logical volume A 114 has not yet been subjected to copying.

In the foregoing, the fifth embodiment of the present invention has been described.

Next, a sixth embodiment of the present invention will be described.

VI. Sixth Embodiment

In the sixth embodiment, there is performed migratory copying in which data migrates between new and old storage systems as in the second embodiment.

In the sixth embodiment, the storage system (T) 1000 shown in FIG. 7 is different from that in the second embodiment, that is, the controller (T) 1010 holds the logical volume information tables 800, the RAID group management tables 840, the group tables 820 and the pair management tables 830 (see FIG. 10) described in conjunction with the fifth embodiment and performs a processing by use of these tables.

In the following, the details of the migratory copying will be described referring to FIG. 8 used in the description of the second embodiment.

Since the difference of the processing in the sixth embodiment from that in the second embodiment lies in a method for assignment of a logical volume 104 in step 710 and the copying in FIG. 711, the following description will be made attaching importance to these points.

In the instruction for assignment of a migratory copy destination logical volume 104 in step 701, a user designates at least an emulation type and a capacity to be assigned. In step 710, the controller (T) 1010 instructed to assign the logical volume (T) 104 assigns the logical volume (T) 104 in a manner similar to the assignment of the logical volume B 114 in the fifth embodiment. As the migratory copy destination logical volume, the user may designate a logical volume 104 having already been defined on the storage system (T) 1000.

In step 711, the controller (T) 1010 receiving the instruction for the start of migratory copying assigns an unused pair management table 830, stores a number of the migratory copy source controller (S) 1110 and a number of a migratory copy source logical volume (S) 114 into the opposite-side controller number 831 and the opposite-side logical volume number 833 of the pair management table 830 respectively, stores a number of the migratory copy destination logical volume (T) 104 into the self-side logical volume number 833, a leading address and a tailing address of an area made an object of migratory copying into the copy leading address 834 and the copy tailing address 835 respectively, stores a leading address of the migratory copying into the copy pointer 837 of the pair management table 830, and turns the pair state 836 into "UNDER MIGRATORY COPYING".

Next, an unused group table 820 is assigned and a number of the above-assigned pair management table 830 is stored into the pair management table number 821 corresponding to a group including a portion of the area made the object of migratory copying. A number of the assigned group table is stored into the group table number 805 of a logical volume information table 800 corresponding to the logical volume (T) 104, and "COPY DESTINATION" is stored into the original/copy information 804.

When the above processing is completed, the controller (T) 1010 performs the copying by reading data from the logical volume (S) 114 in an order from an address indicated by the copy pointer 837 and storing the read data into the logical volume (T) 104.

When the migratory copying is completed, NULL is stored into the original/copy information 804 of the logical volume information table 800 corresponding to the logical volume (T) 104 to indicate that a pair is not generated. Also, NULL is stored into the group table number 805. The group table 820 and the pair management table 830 are opened so that they are turned into unused conditions.

In the case where there is access from the CPU 1200 to a logical volume 104 under migratory copying, the following processing is performed.

Namely, whether or not the logical volume 104 subjected to access is an object of migratory copying is examined from the original/copy information 804 of the corresponding logical volume information table 800. If the original/copy information 804 indicates "COPY DESTINATION", the group table number 805 is looked at to make access to the corresponding group table 820. A group number on which addresses to be accessed are mapped is used as an index to make access to the group table, thereby acquiring the corresponding pair management table number. Access to the corresponding pair management table 830 is made to look at the copy pointer 837. If the address to be accessed is anterior to the copy pointer 837, there has already been copied and hence the logical volume (T) 104 is accessed. If it is posterior to the copy pointer, there has not yet been copied and hence the coping with the access from the CPU 1200 is made by reading intended data from the logical volume (S) 114. In reading the data from the logical volume (S) 114, a read request for the logical volume (S) of the storage system 1100 is issued on the basis of the opposite-side controller number 831 and the opposite-side logical volume number 832 of the pair management table 830 to read the intended data.

In the foregoing, the sixth embodiment of the present invention has been described.

According to the first and fifth embodiments described above, only any partial area of a logical volume (or an area thereof made an object of remote copying) can be subjected to remote copying. Therefore, it is possible to eliminate unnecessary overhead hitherto caused due to the copying of data the copy of which is not required. Also, in this remote copying, a copy destination storage system uses only a capacity corresponding to that partial area, that is, the copy destination storage system is not required to use a capacity corresponding to a copy source logical volume though such requirement has been made in the prior art.

According to the second and sixth embodiments described above, only any partial area of a logical volume (or an area thereof made an object of migratory copying) can be subjected to migratory copying. Therefore, it is possible to eliminate unnecessary overhead hitherto caused due to the copying of data the copy of which is not required. Also, in this migratory copying, a copy destination storage system uses only a capacity corresponding to that partial area, that is, the copy destination storage system is not required to use a capacity corresponding to a copy source logical volume though such requirement has been made in the prior art.

According to the third and fourth embodiments described above, the arrangement/rearrangement not in units of one logical volume but for every partial area of a logical volume is enabled, that is, each partial area of a logical volume can be arranged/rearranged on a desired RAID group or a RAID group suitable for the access characteristic of that partial area.

In each of the foregoing embodiments, each processing is performed in such a manner that a logical address range of a logical volume made an object of remote copying, migratory copying or arrangement on RAID groups is divided into logical storage devices or blocks in order to make it possible to perform the processing easily and at a high speed. However, each processing may be performed in such a manner that the logical address range of the logical volume made the object of remote copying, migratory copying or arrangement on RAID groups is rather directly managed than divided into logical storage devices or blocks.

VII. Seventh Embodiment

Figure 13:
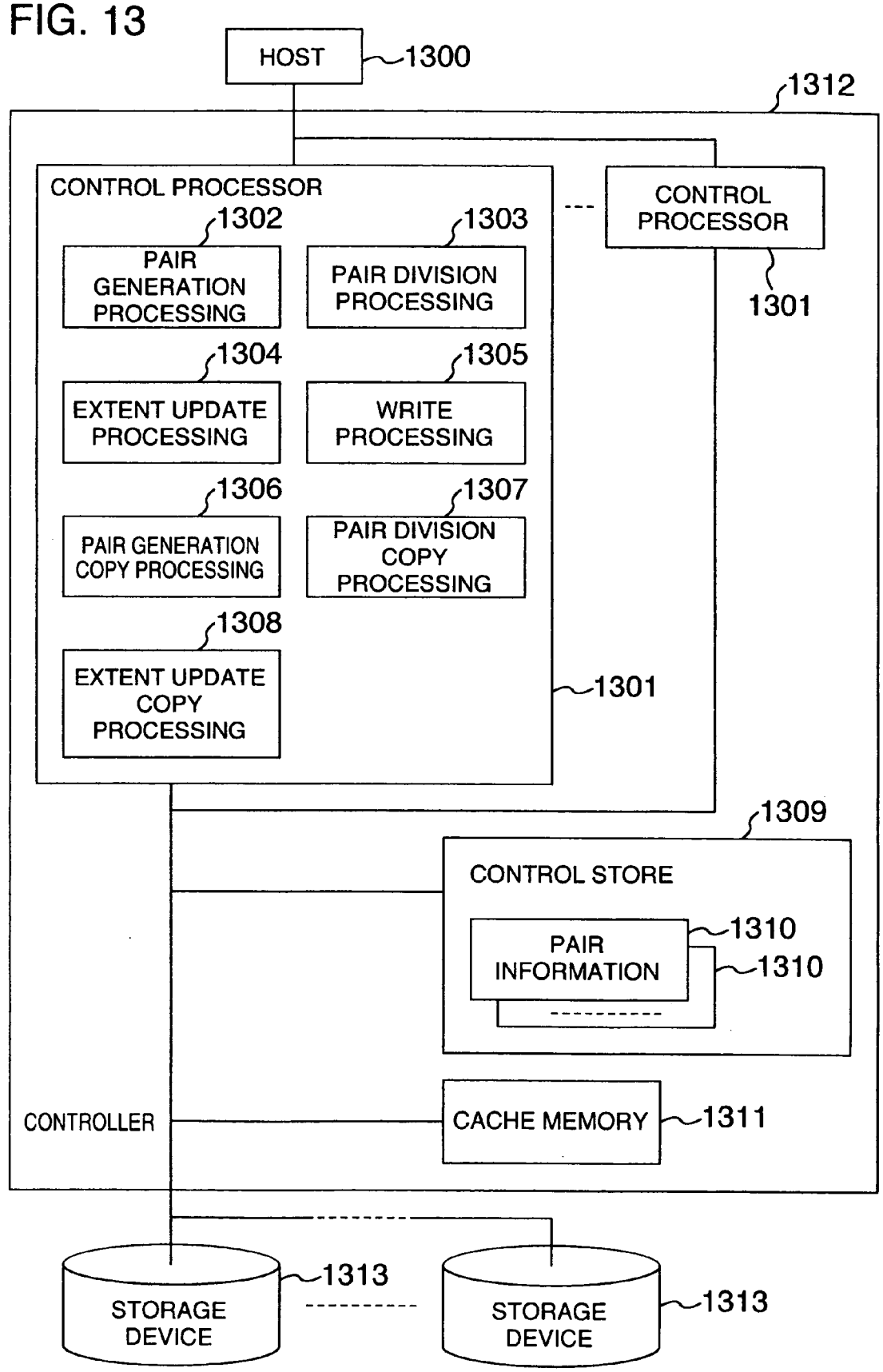
FIG. 13 is a block diagram showing the construction of a system according to a seventh embodiment of the present invention.

FIG. 13 is a block diagram of a system according to a seventh embodiment of the present invention. The system includes a host 1300, a controller 1312 and storage devices 1313. The host 1300 issues various requests to the controller 1312 in accordance with a user's instruction or a user program. The storage device 1313 stores data therein. The controller 1312 performs the reading of data from the storage device 1313 or the writing of data into the storage device 1313 in accordance with a request from the host 1300.

The controller 1312 is composed of control processors 1301, a control store 1309 and a cache memory 1311.

The control processor 1301 controls the controller 1312. A pair generation processing 1302, a pair division processing 1303, an extent update processing 1304, a write processing 1305, a pair generation copy processing 1306, a pair division copy processing 1307 and an extent update copy processing 1308 operate in the control processor 1301. The control store 1309 stores control information such as pair information 1310 which is needed by the control processor 1301 to control the controller 1312. The cache memory 1311 temporarily stores data received from the host 1300 and data read from the storage device 1313.

Figure 14:
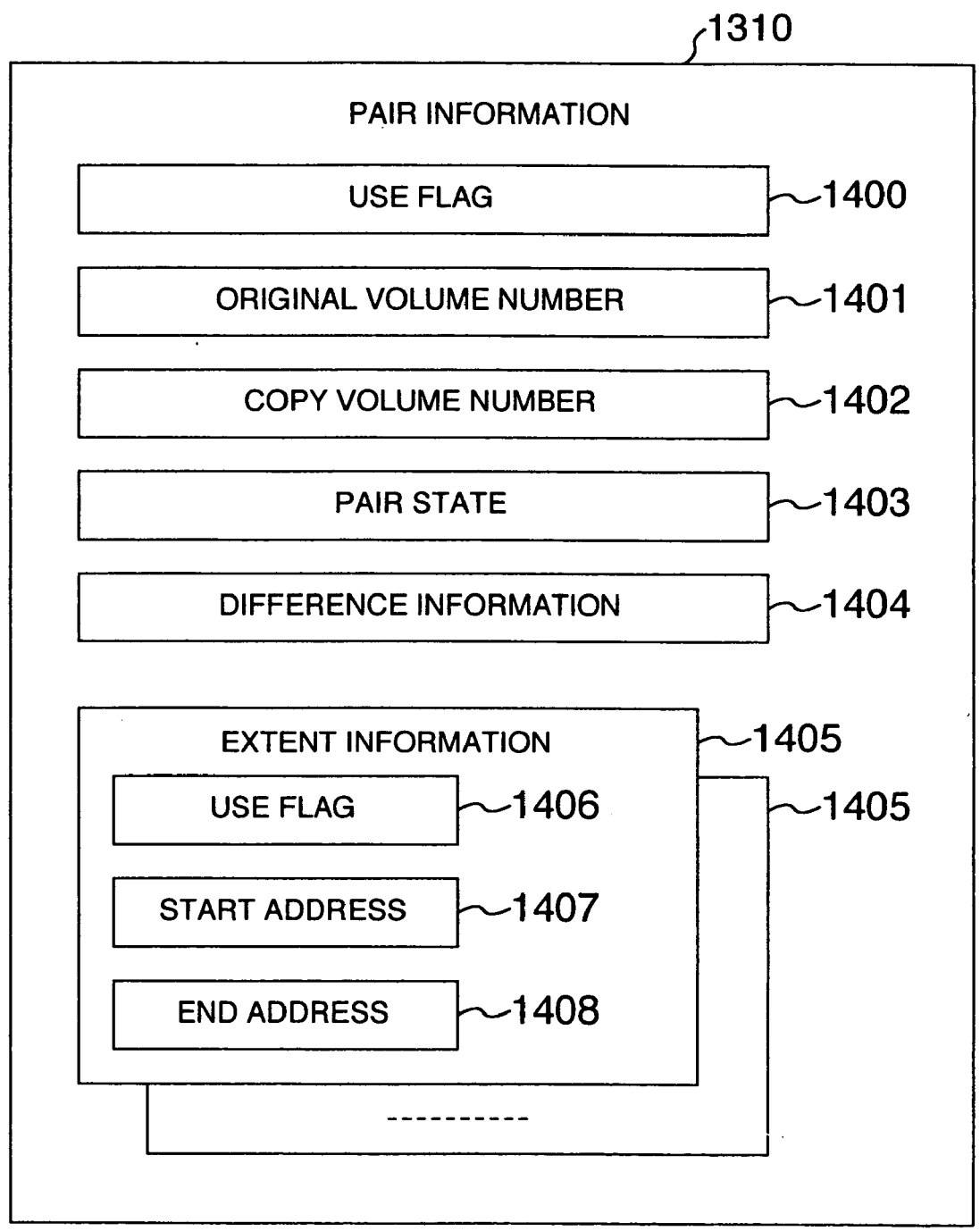
FIG. 14 is a diagram showing control information which a control processor requires when the present invention is embodied.

FIG. 14 shows the data structure of the pair information 1310. The pair information 1310 is composed of a use flag 1400, an original volume number 1401, a copy volume number 1402, a pair state 1403, difference information 1404 and extent information 1405. The use flag 1400 is a flag indicating whether or not the corresponding pair information 1310 is being used, that is, whether or not information in the corresponding pair information 1310 is valid. When the use flag 1400 is "1", validness is indicated. When it is "0", invalidness is indicated. The original volume number 1401 indicates a number of a volume which serves as an original when a copy of the volume is to be generated in accordance with a request from the host 1300. The copy volume number 1402 indicates a number of a volume which is stored with a copy of data of a volume serving as an original when a copy of the volume is to be generated in accordance with a request from the host 1300. The pair state 1403 indicates where is a volume copy generating process advancing up to. The pair state 1403 has four values of "UNDER GENERATION", "GENERATION COMPLETED", "UNDER DIVISION" and "DIVISION COMPLETED". The difference information 1404 is information representing locations at which data is different between a volume indicated by the original volume number 1401 and a volume indicated by the copy volume number 1402. The extent information 1405 is information indicating a location in a volume in which an area such as dataset or file is stored. The extent information 1405 is composed of a use flag 1406, a start address 1407 and an end address 1408. The use flag 1406 is a flag indicating whether or not the corresponding extent information 1405 is valid. When the use flag 1406 is "1", validness is indicated. When it is "0", invalidness is indicated. The start address 1407 is an address indicating a starting extreme of an area such as dataset or file, and the end address 1408 is an address indicating a trailing extreme of the area such as dataset or file.

Figure 15:
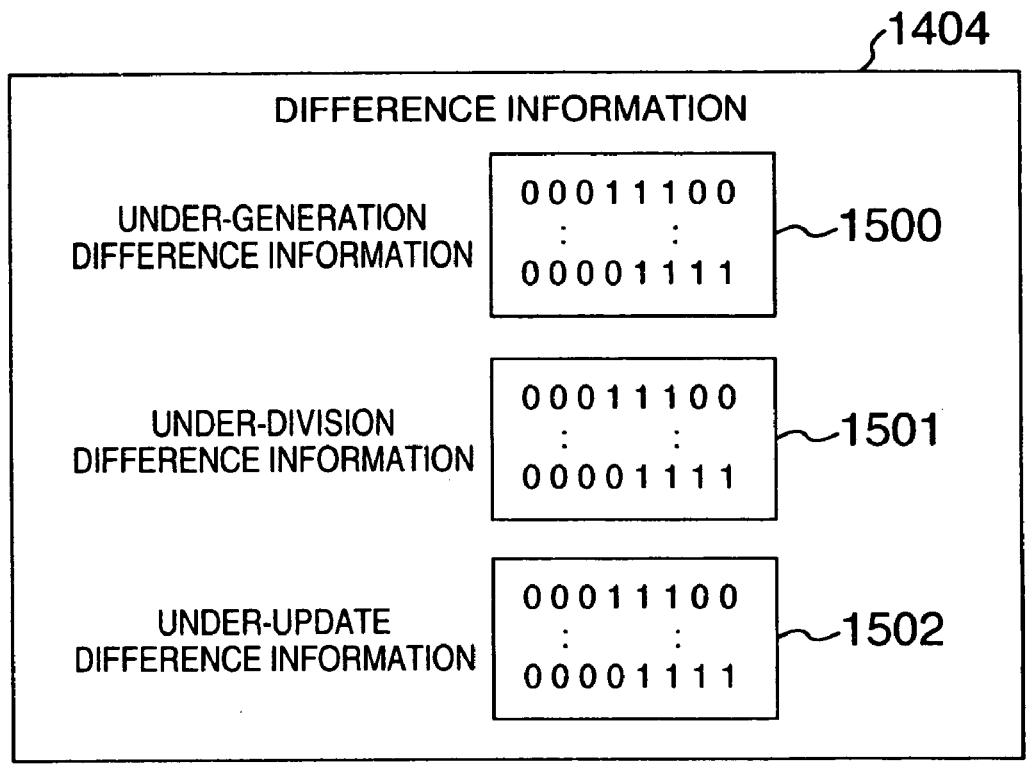
FIG. 15 is a diagram showing the structure of difference information in the control information.

FIG. 15 shows the structure of the difference information 1404. The difference information 1404 is composed of three kinds of bit maps which include under-generation difference information 1500, under-division difference information 1501 and under-update difference information 1502. One bit corresponds to one track. When the bit value is "0", it is indicated that data of the corresponding track is coincident between a volume indicated by the original volume number 1401 and a volume indicated by the copy volume number 1402. When the bit value is "1", it is indicated that data of the corresponding track is not coincident. Of course, one bit may be applied to (or caused to correspond to) another unit.

Figure 16:
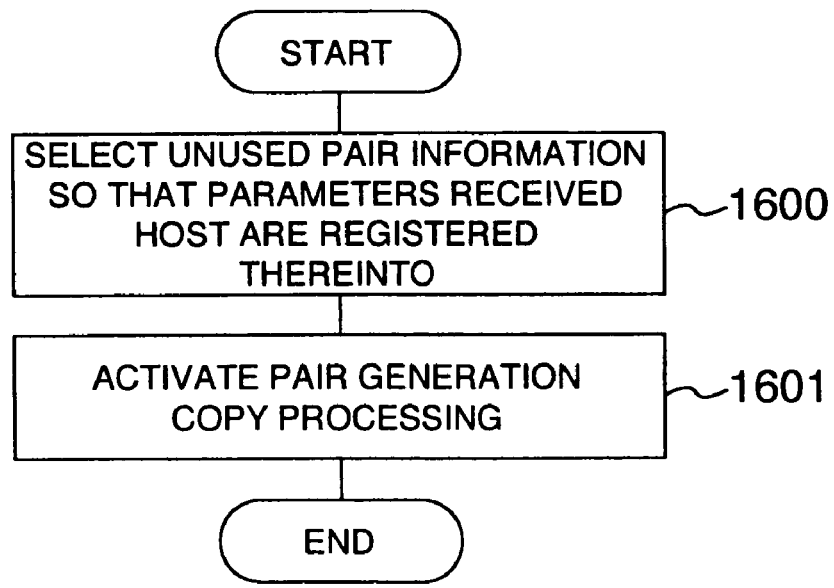
FIG. 16 is a chart showing the flow of a processing when a pair generation request is received from a host.

FIG. 16 shows the flow of the pair generation processing 1302. The host 1300 issues a pair generation request to the controller 1312 when the controller 1312 is caused to generate the copy of a certain volume. When receiving the pair generation request from the host 1300, the control processor 1301 starts a pair generation processing 1302. The pair generation request has two parameters, that is, a volume number of a volume the copy of which is to be generated (referred to as an original volume) and a volume number of a volume in which copied data is to be stored (referred to as a copy volume).

In step 1600, unused pair information 1310 having the use flag 1400 of "0 is selected. In the selected pair information 1310, the use flag 1400 is set to be "1", a volume number of an original volume received from the host 1300 is set into the original volume number 1401, a volume number of a copy volume received from the host 1300 is set into the copy volume number 1402, "UNDER GENERATION" is set into the pair state 1403, all bits of the under-generation information 1500 in the difference information 1404 are set to "1", all bits of the under-division information 1501 are set to "0", all bits of the under-update information 1502 are set to "0", and the use flag 1406 in the extent information 1405 is set to "0". In step 1601, a pair generation copy processing 1306 is activated, thereby completing the present pair generation processing.

Figure 17:
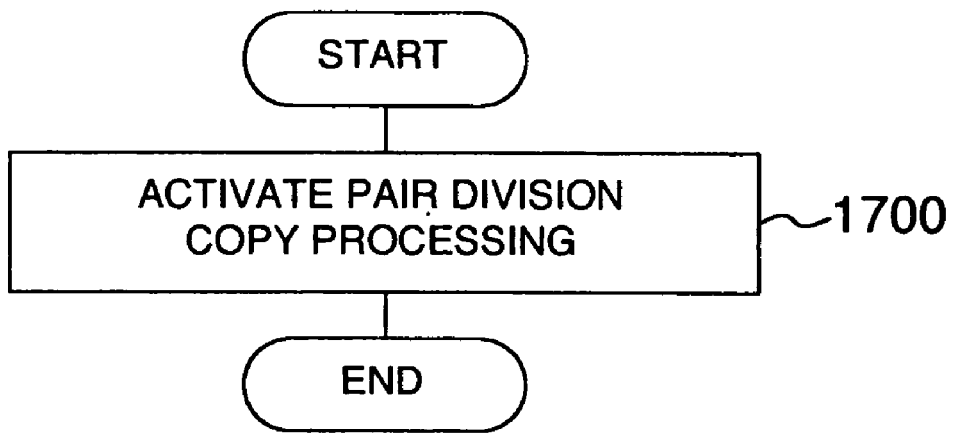
FIG. 17 is a chart showing the flow of a processing when a pair division request is received from the host.

FIG. 17 shows the flow of the pair division processing 1303. The host 1300 issues a pair division request to the controller 1312 when data stored in a copy volume is settled to enable the use of the data stored in the copy volume. When receiving the pair division request from the host 1300, the control processor 1301 starts a pair division processing. The pair division request has two parameters, that is, a volume number of an original volume and a volume number of a copy volume.

In step 1700, pair information 1310 having the volume number of the original volume in the original volume number 1401 and the volume number of the copy volume in the copy volume number 1402 is first selected and "UNDER DIVISION" is set into the pair state 1403 of the selected pair information 1310. Next, a pair division copy processing 1307 is activated, thereby completing the present pair division processing.

Figure 18:
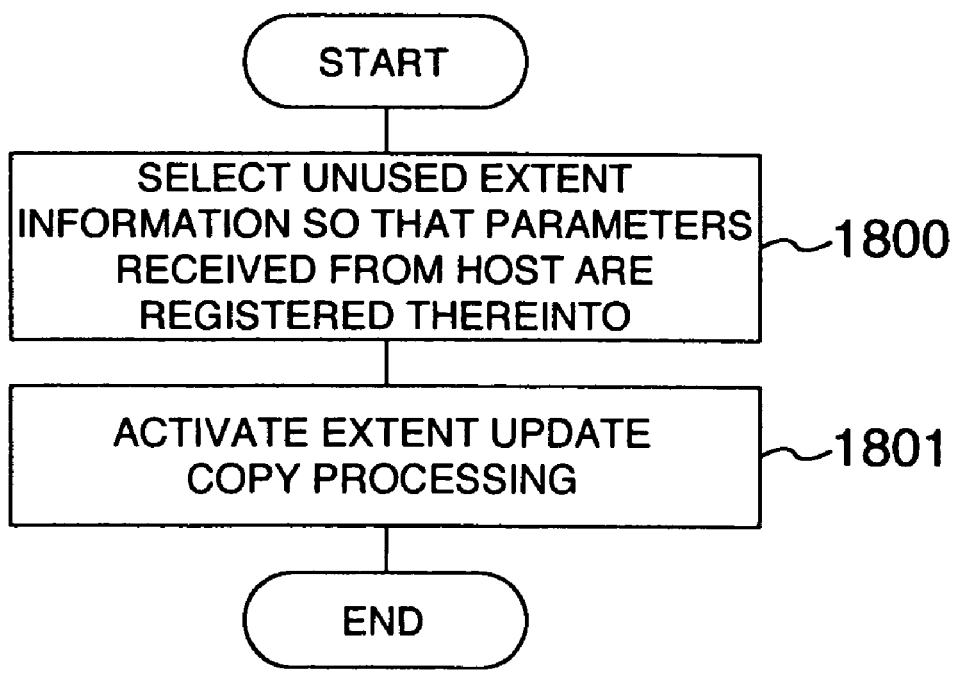
FIG. 18 is a chart showing the flow of a processing when an extent update request is received from the host.

FIG. 18 shows the flow of the extent update processing 1304. In the case a pair division request is issued and a processing based on thereon is completed, data thereafter written in an original volume is not reflected by a copy volume. Accordingly, data stored in the copy volume becomes gradually old so that it differs from the latest data stored in the original volume. When it is desired to make data of a copy volume and data of an original data coincident to each other with respect to a specified area such as dataset or file, the host 1300 issues an extent update request to the controller 1312. The extent update request has four parameters, that is, a volume number of an original volume, a volume number of a copy volume, and a start address and an end address of an area such as dataset or file with respect to which the coincidence of data between the original volume and the copy volume is desired. The start address and the end address may exist in a plurality of sets. When receiving the extent update request, the control processor 1301 starts an extent update processing 1304. In step 1800, pair information 1310 having the volume number of the original volume received as the parameter in the original volume number 1401 and the volume number of the copy volume received as the parameter in the copy volume number 1402 is first selected. Next, extent information 1405 having the use flag 1406 of "0" is selected. Next, the use flag 1406 of the selected extent information 1405 is set to "1", the start address of an area such as dataset or file received as the parameter is set into the start address 1407, and the end address received as the parameter is set into the start address 1408. In step 1801, an extent update copy processing 1308 is activated, thereby completing the present extent update processing.

Figure 19:
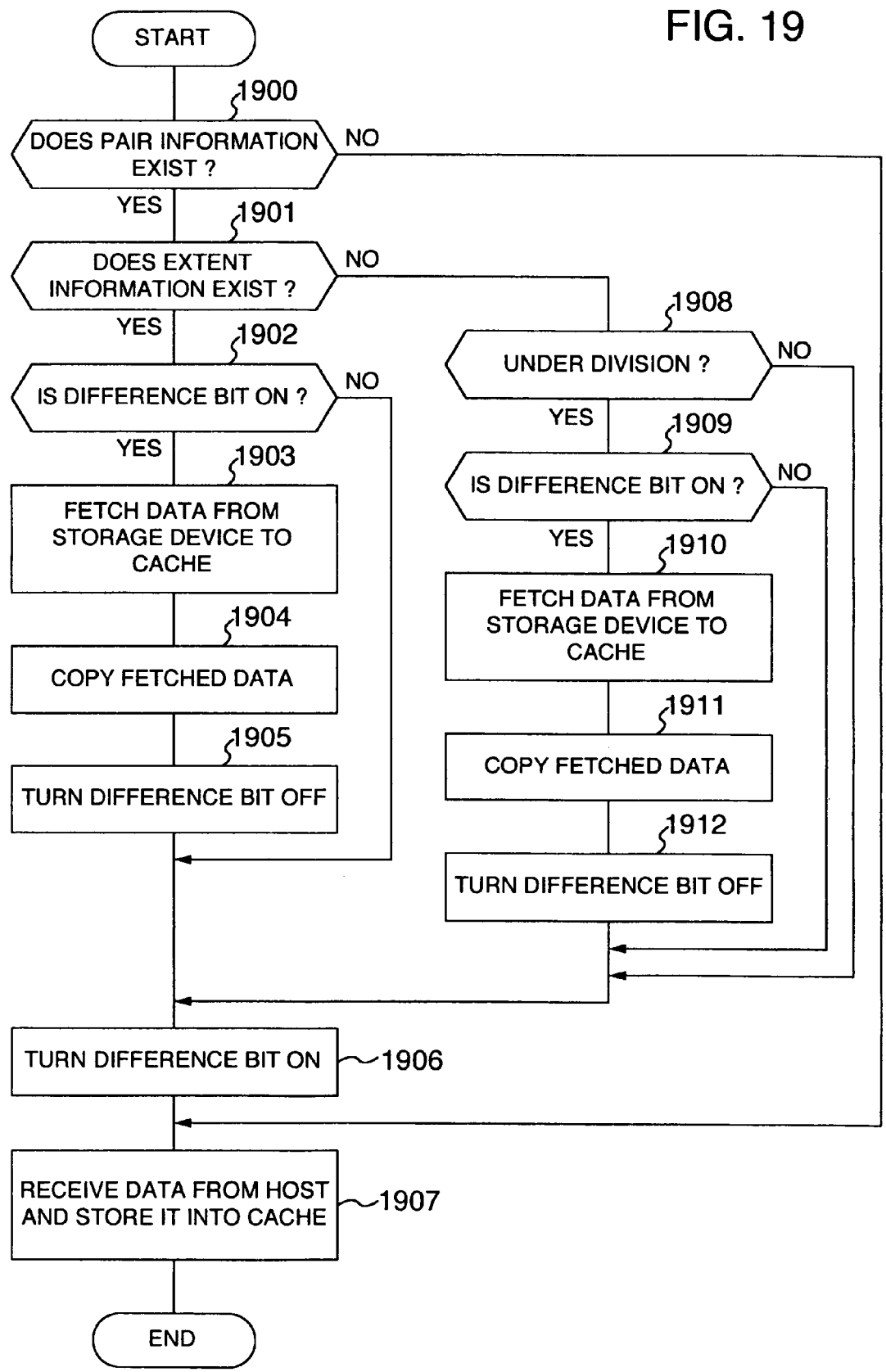
FIG. 19 is a chart showing the flow of a processing when a write request is received from the host.

FIG. 19 shows the flow of the write processing 1305. When receiving a write request from the host 1300, the control processor 1301 starts a write processing 1305. The write request has three parameters, that is, write data, a volume number of a volume in which the write data is to be stored, and an address in the volume in which the write data is stored.

In step 1900, pair information 1310 having the original volume number 1401 corresponding to the volume number received as the parameter is selected from among pair information 1310 having the use flag 1400 of "1". In the case where pair information 1310 satisfying the above condition does not exist, the flow proceeds to step 1907. In the case where pair information 1310 satisfying the above condition exists, the flow proceeds to step 1901.

In step 1901, with respect to the pair information 1310 selected in step 1900, the examination is made of whether or not extent information 1405 having the start address 1407 and the end address 1408 between which the address received as the parameter is included exists among extent information 1405 which has the use flag 1406 of "1". In the case where extent information 1405 satisfying the above condition does not exist, the flow proceeds to step 1908. In the case where extent information 1405 satisfying the above condition exists, the flow proceeds to step 1902.

In step 1902, the reference to the under-division difference information 1501 in the difference information 1404 of the pair information 1310 selected in step 1900 is made to examine whether a bit corresponding to a track corresponding to the address received as the parameter is "0" or "1". In the case where the bit is "1", the flow proceeds to step 1903. In the case where the bit is "0", the flow proceeds to step 1906.

In step 1903, data stored in the track corresponding to the address received as the parameter is fetched from the storage device 1313 into the cache memory 1311.

In step 1904, a copy of the data fetched in step 1903 is generated in the cache memory 1311. Though the generated copy is data of a copy volume indicated by the copy volume number 1402 in the pair information 1310 selected in step 1900, the time of writing of this data into the storage device 1313 may be arbitrary.

In step 1905, "0" is set into the bit examined in step 1902.

In step 1906, the difference bit of the difference information 1404 in the pair information 1310 selected in step 1900 is turned into "1". In the case where the pair state 1403 is "UNDER GENERATION" or "GENERATION COMPLETED", "1" is set into that bit in the under-generation difference information 1500 which corresponds to a track corresponding to the address received as the parameter. In the case where the pair state 1403 is "UNDER DIVISION", "1" is set into that bit in the under-division difference information 1501 which corresponds to a track corresponding to the address received as the parameter. In the case where the pair state 1403 is "DIVISION COMPLETED" and it is determined in step 1901 that the extent information 1405 exists, "1" is set into that bit in the under-update difference information 1502 which corresponds to a track corresponding to the address received as the parameter. In the case where the pair state 1403 is "DIVISION COMPLETED" and it is determined in step 1901 that the extent information 1405 does not exist, "1" is set into that bit in the under-division difference information 1501 which corresponds to a track corresponding to the address received as the parameter.

In step 1907, the write data received as the parameter is stored into the cache memory 1311, thereby completing the present processing.

In step 1908, the pair state 1403 is examined. In the case where the pair state 1403 is "UNDER DIVISION", the flow proceeds to step 1909. In the case where the pair state 1403 is not "UNDER DIVISION", the flow proceeds to step 1906.

In step 1909, the reference to the under-generation difference information 1500 in the difference information 1404 of the pair information 1310 selected in step 1900 is made to examine whether a bit corresponding to a track corresponding to the address received as the parameter is "1" or "0". In the case where the bit is "1", the flow proceeds to step 1910. In the case where the bit is "0", the flow proceeds to step 1906.

In step 1910, data stored in the track corresponding to the address received as the parameter is fetched from the storage device 1313 into the cache memory 1311.

In step 1911, a copy of the data fetched in step 1910 is generated in the cache memory 1311. Though the generated copy is data of a copy volume indicated by the copy volume number 1402 in the pair information 1310 selected in step 1900, the time of writing of this data into the storage device 1313 may be arbitrary.

In step 1912, "0" is set into the bit examined in step 1909.

Figure 20:
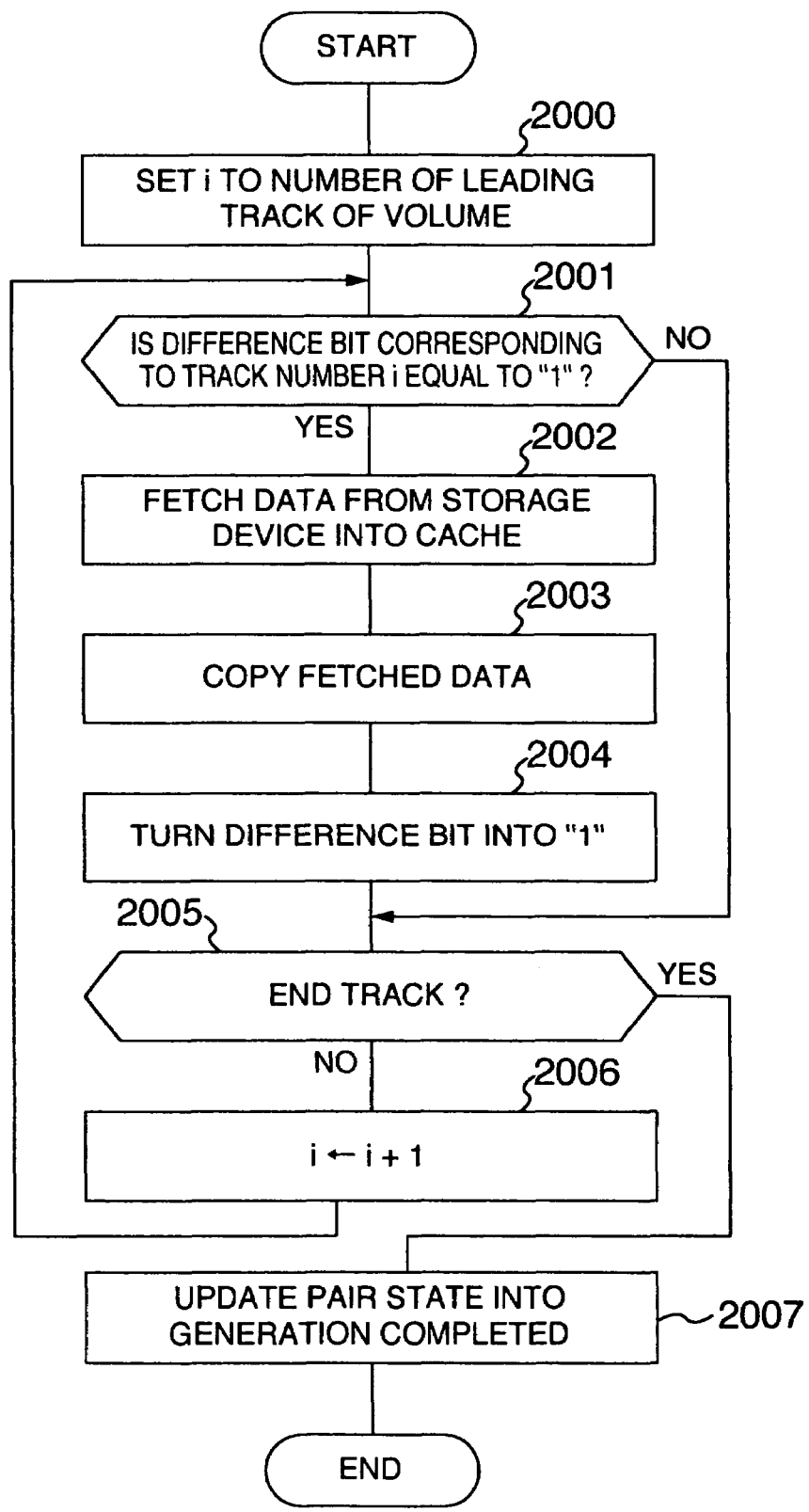
FIG. 20 is a chart showing the flow of a pair generation copy processing.

FIG. 20 shows the flow of the pair generation copy processing 1306. The pair generation copy processing 1306 is activated from the pair generation processing 1302. A volume number of an original volume and a volume number of a copy volume are given as parameters.

In step 2000, a variable i is set to a track number of a leading track of the original volume.

In step 2001, pair information 1310 having the volume number of the original volume given as the parameter in the original volume number 1401 and the volume number of the copy volume given as the parameter in the copy volume number 1402 is first selected. Next, the reference to the under-generation difference information 1500 in the difference information 1404 of the selected pair information 1310 is made to examine whether a bit corresponding to a track having a track number equal to the variable i is "0" or "1". In the case where the bit is "0", the flow proceeds to step 2005. In the case where the bit is "1", the flow proceeds to step 2002.

In step 2002, data of the track having a track number equal to the variable i is fetched from the storage device 1313 into the cache memory 1311.

In step 2003, a copy of the data fetched in step 2002 is generated in the cache memory 1311. Though the generated copy is data of a volume corresponding to the copy volume number given as the parameter, the time of writing of this data into the storage device 1313 may be arbitrary.

In step 2004, "0" is set into the bit examined in step 2001.

In step 2005, the examination is made of whether or not the track subjected to the generation of the copy is a track corresponding to a trailing extreme of the volume. In the case where it is the trailing track, the flow proceeds to step 2007. In the case where it is not the trailing track, the flow proceeds to step 2006.

In step 2006, 1 is added to the variable i. Then, the flow goes to step 2001 to perform a processing for the next track.

In step 2007, "GENERATION COMPLETED" is set into the pair state 1403, thereby completing the present processing.

Figure 21:
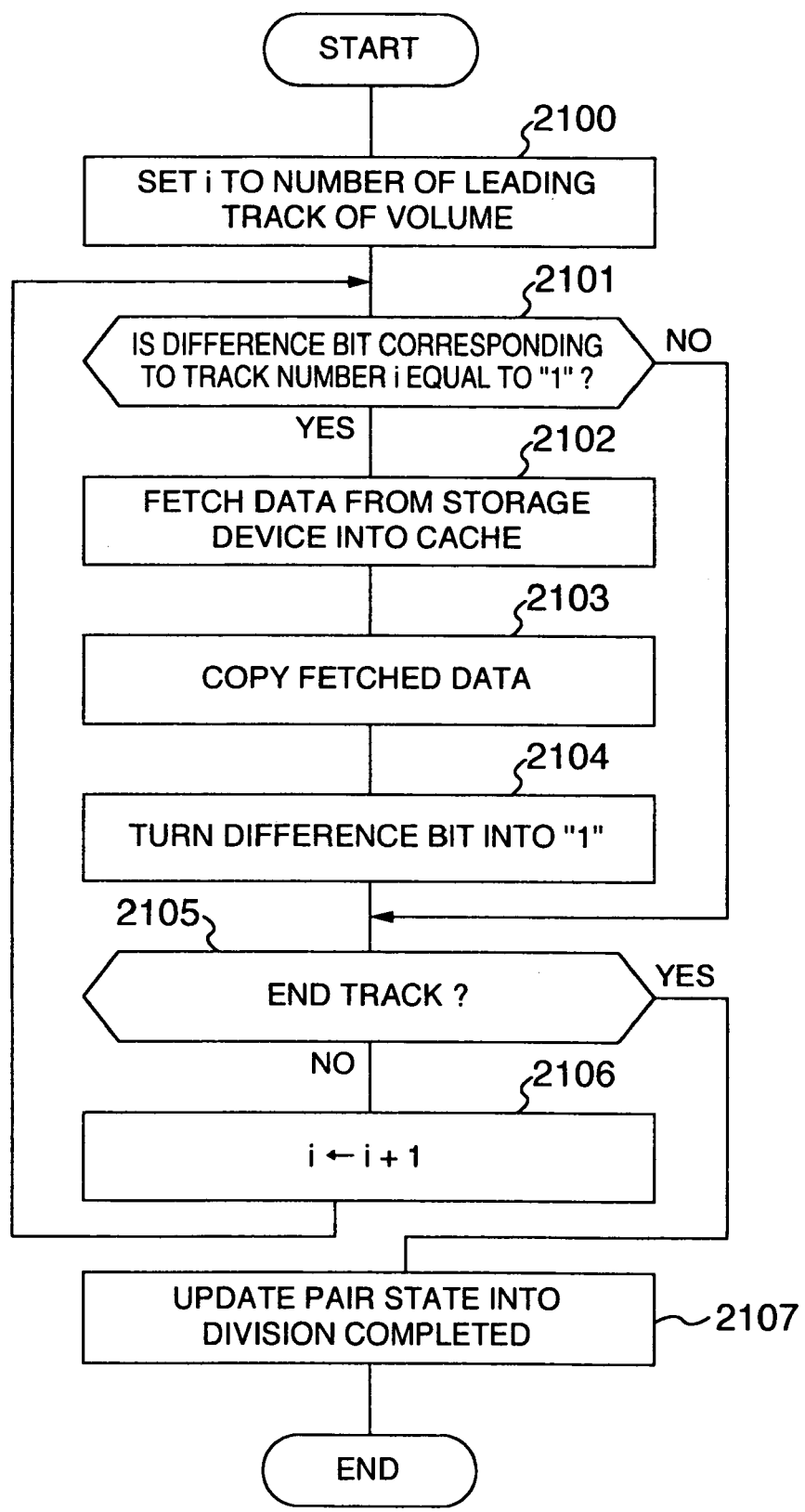
FIG. 21 is a chart showing the flow of a pair division copy processing.

FIG. 21 shows the flow of the pair division copy processing 1307. The pair division copy processing 1307 is activated from the pair division processing 1303. A volume number of an original volume and a volume number of a copy volume are given as parameters.

In step 2100, a variable i is set to a track number of a leading track of the original volume.

In step 2101, pair information 1310 having the volume number of the original volume given as the parameter in the original volume number 1401 and the volume number of the copy volume given as the parameter in the copy volume number 1402 is first selected. Next, the reference to the under-generation difference information 1500 in the difference information 1404 of the selected pair information 1310 is made to examine whether a bit corresponding to a track having a track number equal to the variable i is "0" or "1". In the case where the bit is "0", the flow proceeds to step 2105. In the case where the bit is "1", the flow proceeds to step 2102.

In step 2102, data of the track having a track number equal to the variable i is fetched from the storage device 1313 into the cache memory 1311.

In step 2103, a copy of the data fetched in step 2102 is generated in the cache memory 1311. Though the generated copy is data of a volume corresponding to the copy volume number given as the parameter, the time of writing of this data into the storage device 1313 may be arbitrary.

In step 2104, "0" is set into the bit examined in step 2101.

In step 2105, the examination is made of whether or not the track subjected to the generation of the copy is a track corresponding to a trailing extreme of the volume. In the case where it is the trailing track, the flow proceeds to step 2107. In the case where it is not the trailing track, the flow proceeds to step 2106.

In step 2106, 1 is added to the variable i. Then, the flow goes to step 2001 to perform a processing for the next track.

In step 2107, "DIVISION COMPLETED" is set into the pair state 1403, thereby completing the present processing.

Figure 22:
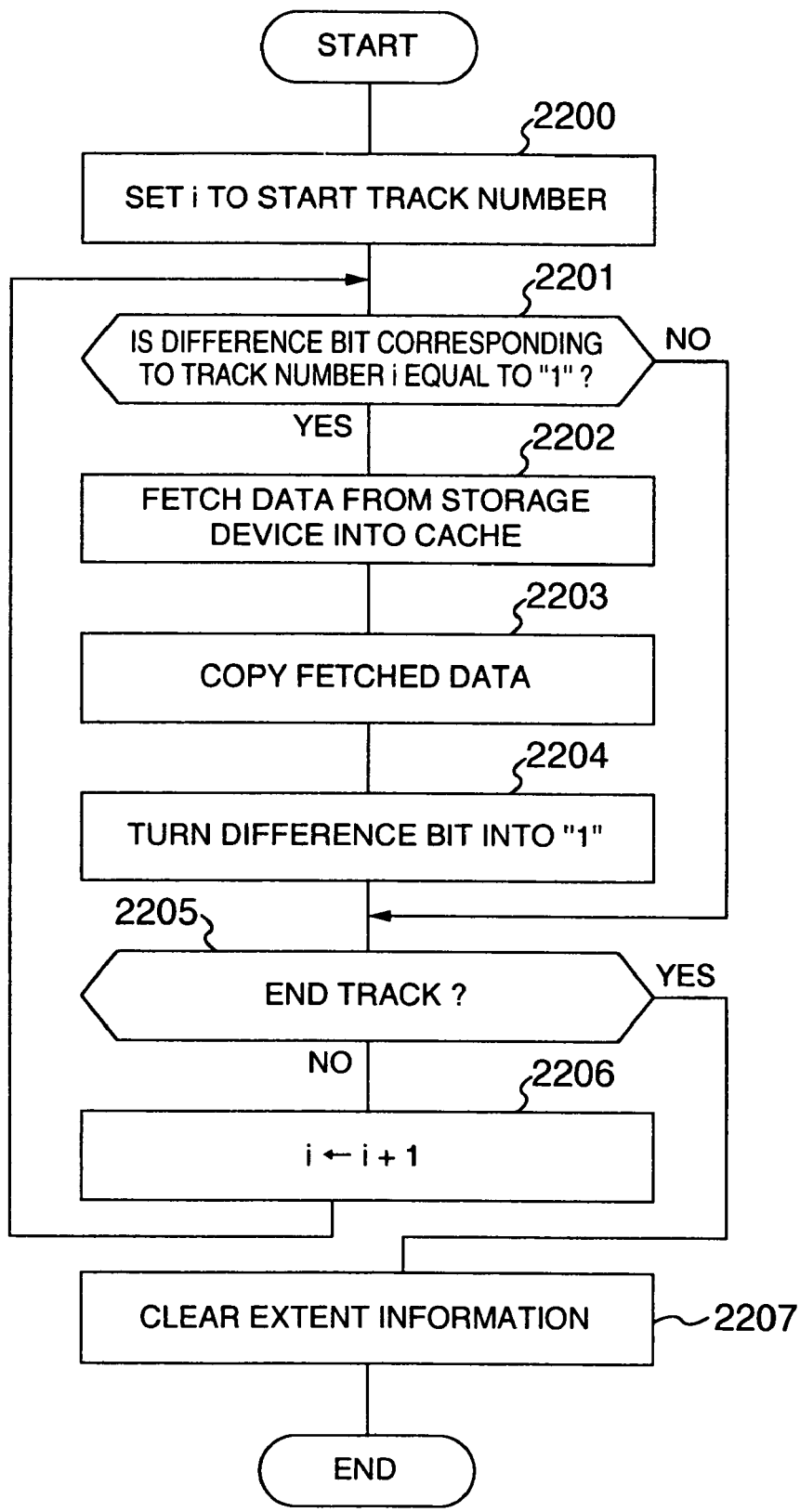
FIG. 22 is a chart showing the flow of an extent update copy processing.

FIG. 22 shows the flow of the extent update copy processing 1308. The extent update copy processing 1308 is activated from the extent update processing 1304. A volume number of an original volume, a volume number of a copy volume, a start address of an area such as dataset or file and an end address thereof are given as parameters.

In step 2200, a variable i is set to a track number of a track corresponding to the start address given as the parameter.

In step 2201, pair information 1310 having the volume number of the original volume given as the parameter in the original volume number 1401 and the volume number of the copy volume given as the parameter in the copy volume number 1402 is first selected. Next, the reference to the under-division difference information 1501 in the difference information 1404 of the selected pair information 1310 is made to examine whether a bit corresponding to a track having a track number equal to the variable i is "0" or "1". In the case where the bit is "0", the flow proceeds to step 2205. In the case where the bit is "1", the flow proceeds to step 2202.

In step 2202, data of the track having a track number equal to the variable i is fetched from the storage device 1313 into the cache memory 1311.

In step 2203, a copy of the data fetched in step 2202 is generated in the cache memory 1311. Though the generated copy is data of a volume corresponding to the copy volume number given as the parameter, the time of writing of this data into the storage device 1313 may be arbitrary.

In step 2204, "0" is set into the bit examined in step 2201.

In step 2205, the examination is made of whether or not the track subjected to the generation of the copy is a track corresponding to the end address given as the parameter. In the case where it is the corresponding track, the flow proceeds to step 2207. In the case where it is not the corresponding track, the flow proceeds to step 2206.

In step 2206, 1 is added to the variable i. Then, the flow goes to step 2201 to perform a processing for the next track.

In step 2207, bits of the under-update difference information 1502 in a range between the start address and the end address given as the parameters are first fetched and the fetched values are written into the under-division information 1501. Next, "0" is set into the use flag 1406 of the extent information 1405 to invalidate the extent information 1405, thereby completing the present processing.

VIII. Eighth Embodiment

Figure 23:
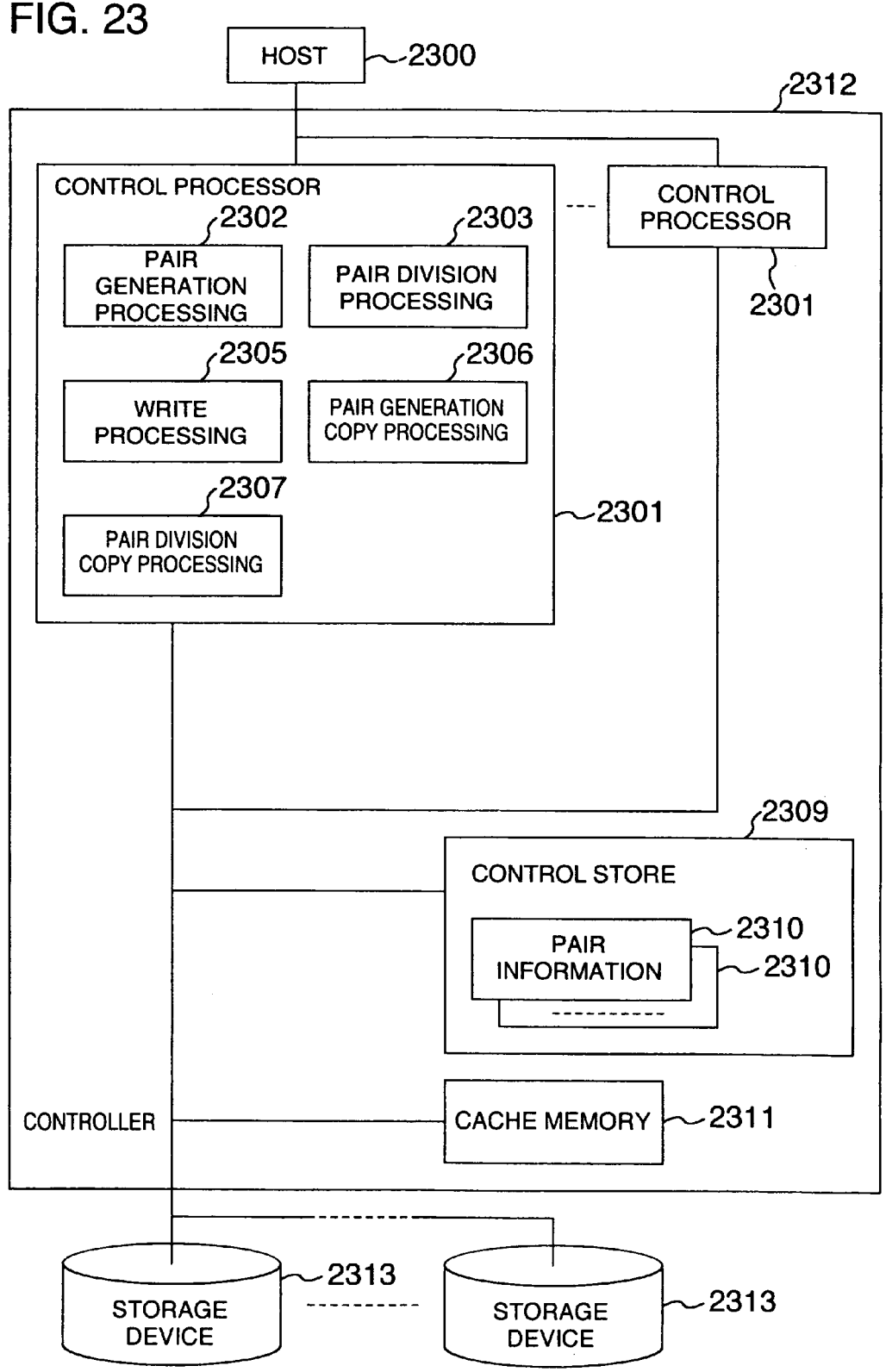
FIG. 23 is a block diagram showing the construction of a system according to an eighth embodiment of the present invention.

FIG. 23 is a block diagram of a system according to an eighth embodiment of the present invention. The system includes a host 2300, a controller 2312 and storage devices 2313. The host 2300 issues various requests to the controller 2312 in accordance with a user's instruction or a user program. The storage device 2313 stores data therein. The controller 2312 performs the reading of data from the storage device 2313 or the writing of data into the storage device 2313 in accordance with a request from the host 2300.

The controller 2312 is composed of control processors 2301, a control store 2309 and a cache memory 2311.

The control processor 2301 controls the controller 2312. A pair generation processing 2302, a pair division processing 2303, a write processing 2305, a pair generation copy processing 2306 and a pair division copy processing 2307 operate in the control processor 2301.

The control store 2309 stores control information such as pair information 2310 which is needed by the control processor 2301 to control the controller 2312. The cache memory 2311 temporarily stores data received from the host 2300 and data read from the storage device 2313.

Figure 24:
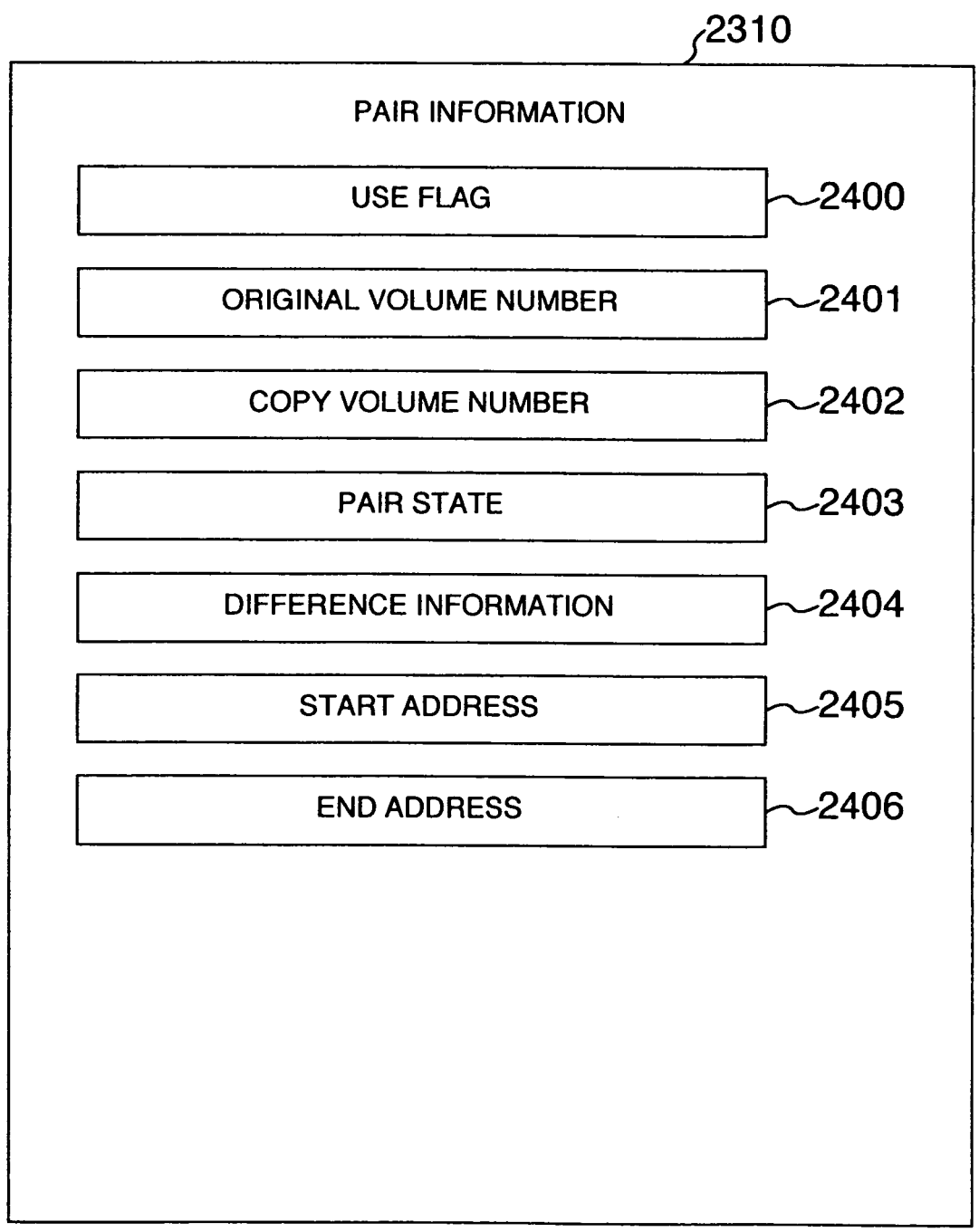
FIG. 24 is a diagram showing control information which a control processor requires when the present invention is embodied.

FIG. 24 shows the data structure of the pair information 2310. The pair information 2310 is composed of a use flag 2400, an original volume number 2401, a copy volume number 2402, a pair state 2403, difference information 2404, a start address 2405 and an end address 2406. The use flag 2400 is a flag indicating whether or not the corresponding pair information 2310 is being used, that is, whether or not information in the corresponding pair information 2310 is valid. When the use flag 2400 is "1", validness is indicated. When it is "0", invalidness is indicated. The original volume number 2401 indicates a number of a volume which serves as an original when a copy of the volume is to be generated in accordance with a request from the host 2300. The copy volume number 2402 indicates a number of a volume which is stored with a copy of data of a volume serving as an original when a copy of the volume is to be generated in accordance with a request from the host 2300. The pair state 2403 indicates where is a volume copy generating process advancing up to. The pair state 2403 has four values of "UNDER GENERATION", "GENERATION COMPLETED", "UNDER DIVISION" and "DIVISION COMPLETED". The difference information 2404 is information representing locations at which data is different between a volume indicated by the original volume number 2401 and a volume indicated by the copy volume number 2402. The start address 2405 is an address indicating a starting extreme of an area such as dataset or file, and the end address 2406 is an address indicating a trailing extreme of the area such as dataset or file.

Figure 25:
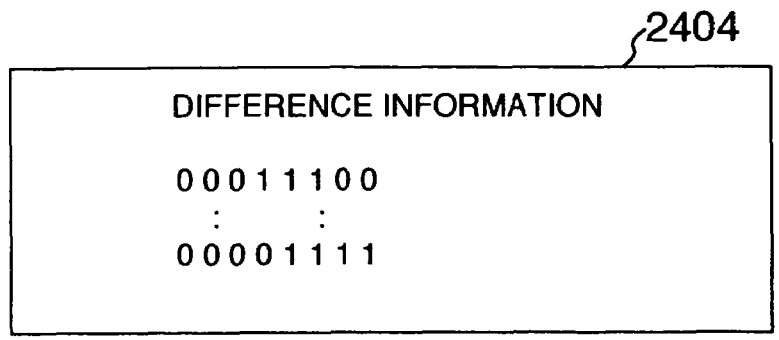
FIG. 25 is a diagram showing the structure of difference information in the control information.

FIG. 25 shows the structure of the difference information 2404. The difference information 2404 is composed of a plurality of bits. One bit corresponds to one track. When the bit value is "0", it is indicated that data of the corresponding track is coincident between a volume indicated by the original volume number 2401 and a volume indicated by the copy volume number 2402. When the bit value is "1", it is indicated that data of the corresponding track is not coincident. Of course, one bit may be caused to correspond to another unit.

Figure 26:
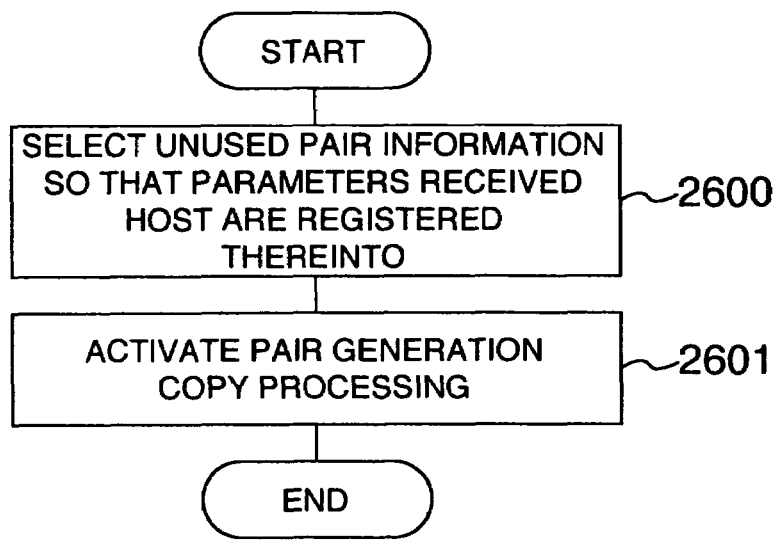
FIG. 26 is a chart showing the flow of a processing when a pair generation request is received from a host.

FIG. 26 shows the flow of the pair generation processing 2302. The host 2300 issues a pair generation request to the controller 2312 when the controller 2312 is caused to generate the copy of a certain area such as dataset or file. When receiving the pair generation request from the host 2300, the control processor 2301 starts a pair generation processing 2302. The pair generation request has four parameters, that is, a volume number of a volume inclusive of an area such as dataset or file the copy of which is to be generated (referred to as a copy source volume), a volume number of a volume in which copied data is to be stored (referred to as a copy destination volume), an address indicating a starting extreme of the area such as dataset or file the copy of which is to be generated, and an address indicating a trailing extreme of the area such as dataset or file the copy of which is to be generated. When a dataset, file or the like is formed by a plurality of areas in a volume, the host 2300 delivers a plurality of sets of starting and trailing addresses as parameters to the controller 2312.

In step 2600, unused pair information 2310 having the use flag 2400 of "0" is selected. In the selected pair information 2310, the use flag 2400 is set to be "1", a volume number of a copy source volume received from the host 2300 is set into the original volume number 2401, a volume number of a copy destination volume received from the host 2300 is set into the copy volume number 2402, "UNDER GENERATION" is set into the pair state 2403, all bits in the difference information 2404 are set to "1", the address indicative of the starting extreme the area such as dataset or file received from the host 2300 is set into the start address 2405, and the address indicative of the trailing extreme the area such as dataset or file received from the host 2300 is set into the end address 2406. When a plurality of sets of starting and trailing addresses are given as parameters, the present step is repeated so that the parameters are stored into the control store 2309. In step 2601, a pair generation copy processing 2306 is activated, thereby completing the present pair generation processing.

Figure 27:
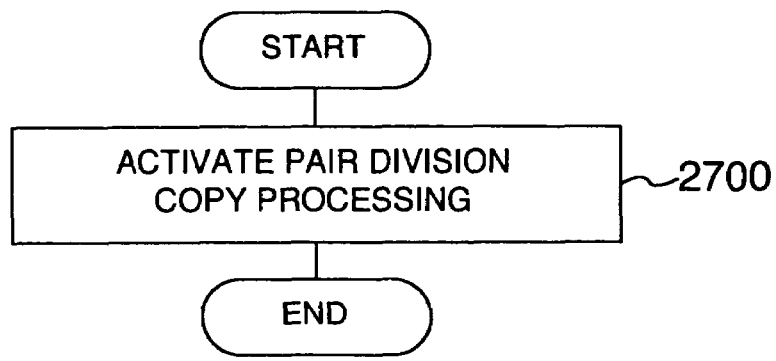
FIG. 27 is a chart showing the flow of a processing when a pair division request is received from the host.

FIG. 27 shows the flow of the pair division processing 2303. The host 2300 issues a pair division request to the controller 2312 when an area such as dataset or file included in a copy source volume is to be settled. When receiving the pair division request from the host 2300, the control processor 2301 starts a pair division processing 2303. The pair division request has four parameters, that is, a volume number of a copy source volume, a volume number of a copy destination volume, an address indicating a starting extreme of the area such as dataset or file which is to be settled, and an address indicating a trailing extreme of the area such as dataset or file which is to be settled.

In step 2700, pair information 2310 having the original volume number 2401 corresponding to the volume number of the copy source volume and the copy volume number 2402 corresponding to the volume number of the copy destination volume is first selected and "UNDER DIVISION" is set into the pair state 2403 of the selected pair information 2310. Next, a pair division copy processing 2307 is activated, thereby completing the present pair division processing.

Figure 28:
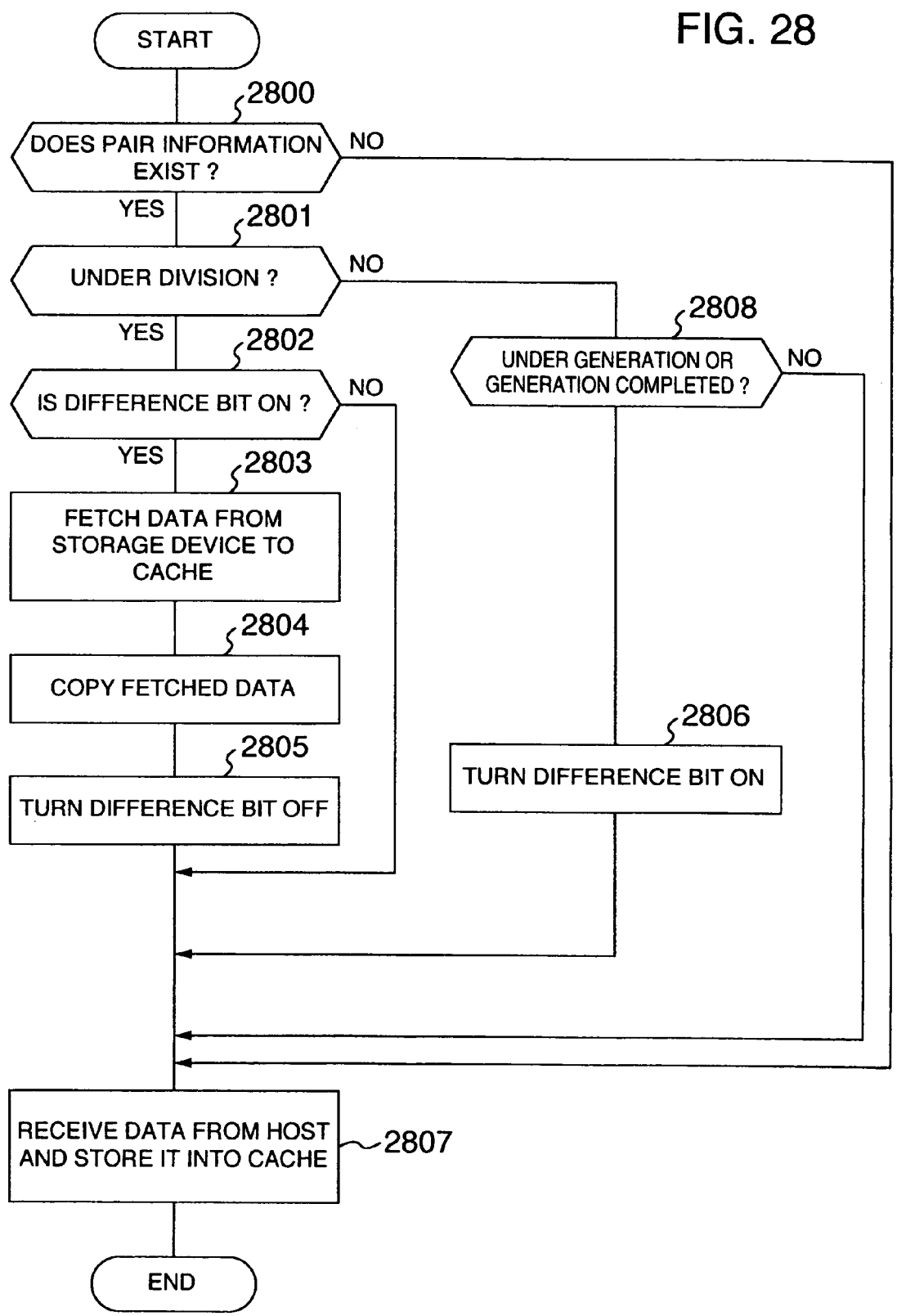
FIG. 28 is a chart showing the flow of a processing when a write request is received from the host.

FIG. 28 shows the flow of the write processing 2305. When receiving a write request from the host 2300, the control processor 2301 starts a write processing 2305. The write request has three parameters, that is, write data, a volume number of a volume in which the write data is to be stored, and an address in the volume in which the write data is stored.

In step 2800, from among pair information 2310 having the use flag 2400 of "1" or being used is selected pair information 2310 having the original volume number 2401 which corresponds to the volume number received as the parameter and having the start address 2405 and the end address 2406 between which the address received as the parameter is included. In the case where pair information 2310 satisfying the above condition does not exist, the flow proceeds to step 2807. In the case where pair information 2310 satisfying the above condition exists, the flow proceeds to step 2801.

In step 2801, the reference is made to the pair state 2403 in the pair information 2310 selected in step 2800. In the case where the pair state 2403 is "UNDER DIVISION", the flow proceeds to step 2802. In the case where the pair state 2403 is not "UNDER DIVISION", the flow proceeds to step 2808.

In step 2802, the reference is made to the difference information 2404 of the pair information 2310 selected in step 2800. The examination is made of whether or not a bit corresponding to a track corresponding to the address received as the parameter is "1". In the case where the bit is "1", the flow proceeds to step 2803. In the case where the bit is "0", the flow proceeds to step 2807.

In step 2803, data of the track corresponding to the address received as the parameter is fetched from the storage device 2313 into the cache memory 2311.

In step 2804, a copy of the data fetched in step 2803 is generated in the cache memory 2311. Though the generated copy is data of a volume indicated by the copy volume number 2402, the time of writing of this data into the storage device 2313 may be arbitrary.

In step 2805, "0" is set into the bit examined in step 2802.

In step 2807, the write data received as the parameter is stored into the cache memory 2311, thereby completing the present processing.

In step 2808, the reference is made to the pair state 2403 of the pair information 2810 selected in step 2800. In the case where the pair state 2403 is "UNDER GENERATION" or "GENERATION COMPLETED", the flow proceeds to step 2806. In the case where the pair state 2403 is neither "UNDER GENERATION" nor "GENERATION COMPLETED", the flow proceeds to step 2807.

In step 2806, "1" is set into a bit of the difference information 2404 corresponding to the track corresponding to the address received as the parameter.

Figure 29:
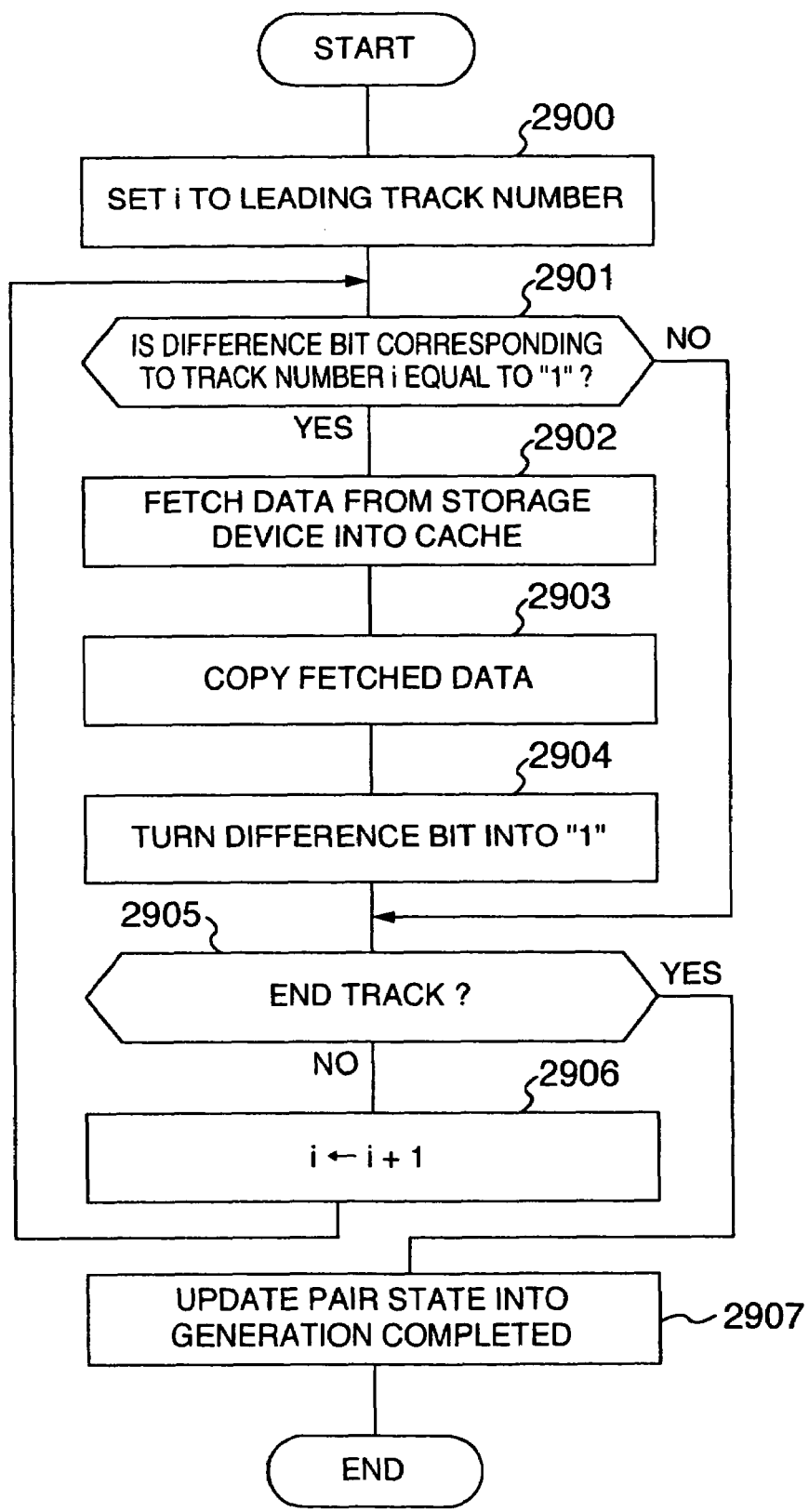
FIG. 29 is a chart showing the flow of a pair generation copy processing.

FIG. 29 shows the flow of the pair generation copy processing 2306. The pair generation copy processing 2306 is activated from the pair generation processing 2302. A volume number of a copy source volume, a volume number of a copy destination volume, an address indicating a starting extreme of the area such as dataset or file, and an address indicating a trailing extreme of the area such as dataset or file are given as parameters.

In step 2900, from among pair information 2310 having the use flag 2400 of "1" or being used is first selected pair information 2310 which has the original volume number 2401 corresponding to the copy source volume number given as the parameter, the copy volume number 2402 corresponding to the copy destination volume number given as the parameter, the start address 2405 corresponding to the starting extreme indicating address given as the parameter, and the end address 2406 corresponding to the trailing extreme indicating address given as the parameter. Next, a variable i is set to a track number of a track corresponding to the start address 2405 of the selected pair information 2310.

In step 2901, the reference to the difference information 2404 of the pair information 2310 selected in step 2900 is made to examine whether a bit corresponding to a track having a track number equal to the variable i is "0" or "1". In the case where the bit is "0", the flow proceeds to step 2905. In the case where the bit is "1", the flow proceeds to step 2902.

In step 2902, data of the track having a track number equal to the variable i is fetched from the storage device 2313 into the cache memory 2311.

In step 2903, a copy of the data fetched in step 2902 is generated in the cache memory 2311. Though the generated copy is data of a volume corresponding to the copy destination volume number given as the parameter, the time of writing of this data into the storage device 2313 may be arbitrary.

In step 2904, "0" is set into the bit examined in step 2901.

In step 2905, the examination is made of whether or not the track subjected to the generation of the copy is a track corresponding to the end address 2406. In the case where it is the end track, the flow proceeds to step 2907. In the case where it is not the end track, the flow proceeds to step 2906.

In step 2906, 1 is added to the variable i. Then, the flow goes to step 2901 to perform a processing for the next track.

In step 2907, "GENERATION COMPLETED" is set into the pair state 2403, thereby completing the present processing.

Figure 30:
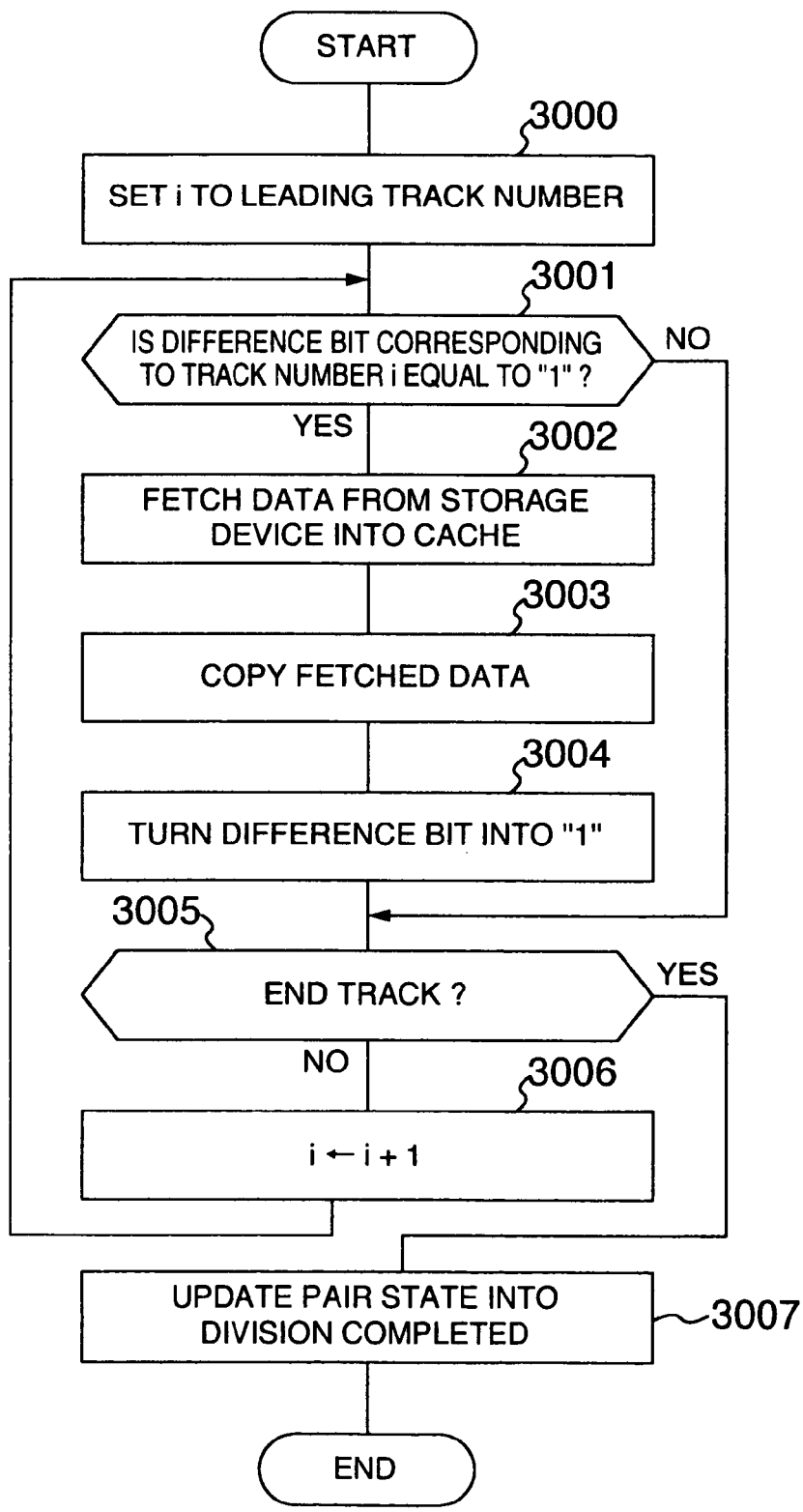
FIG. 30 is a chart showing the flow of a pair division copy processing.

FIG. 30 shows the flow of the pair division copy processing 2307. The pair division copy processing 2307 is activated from the pair division processing 2303. A volume number of an original volume and a volume number of a copy volume are given as parameters.

In step 3000, from among pair information 2310 having the use flag 2400 of "1" or being used is first selected pair information 2310 which has the original volume number 2401 corresponding to the copy source volume number given as the parameter, the copy volume number 2402 corresponding to the copy destination volume number given as the parameter, the start address 2405 corresponding to the starting extreme indicating address given as the parameter, and the end address 2406 corresponding to the trailing extreme indicating address given as the parameter. Next, a variable i is set to a track number of a track corresponding to the start address 2405 of the selected pair information 2310.

In step 3001, the reference to the difference information 2404 of the pair information 2310 selected in step 2900 is made to examine whether a bit corresponding to a track having a track number equal to the variable i is "0" or "1". In the case where the bit is "0", the flow proceeds to step 3005. In the case where the bit is "1", the flow proceeds to step 3002.

In step 3002, data of the track having a track number equal to the variable i is fetched from the storage device 2313 into the cache memory 2311.

In step 3003, a copy of the data fetched in step 3002 is generated in the cache memory 2311. Though the generated copy is data of a volume corresponding to the copy destination volume number given as the parameter, the time of writing of this data into the storage device 2313 may be arbitrary.

In step 3004, "0" is set into the bit examined in step 3001.

In step 3005, the examination is made of whether or not the track subjected to the generation of the copy is a track corresponding to the end address 2406. In the case where it is the end track, the flow proceeds to step 3007. In the case where it is not the end track, the flow proceeds to step 3006.

In step 3006, 1 is added to the variable i. Then, the flow goes to step 3001 to perform a processing for the next track.

In step 3007, "DIVISION COMPLETED" is set into the pair state 2403, thereby completing the present processing.

IX. Ninth Embodiment

Figure 31:
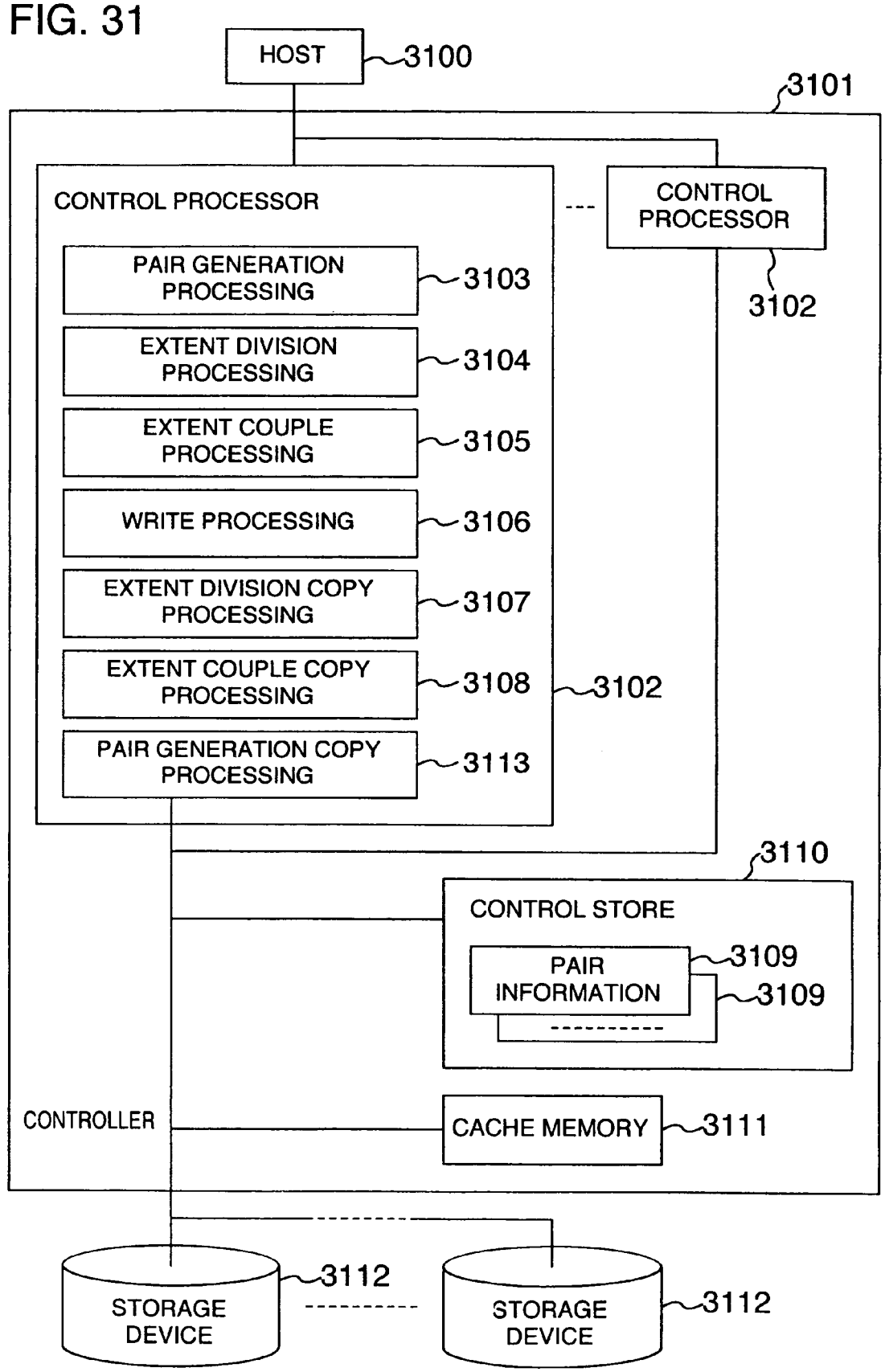
FIG. 31 is a block diagram showing the construction of a system according to a ninth embodiment of the present invention.

FIG. 31 is a block diagram of a system according to a ninth embodiment of the present invention. The system includes a host 3100, a controller 3101 and storage devices 3112. The host 3100 issues various requests to the controller 3101 in accordance with a user's instruction or a user program. The storage device 3112 stores data therein. The controller 3112 performs the reading of data from the storage device 3112 or the writing of data into the storage device 3112 in accordance with a request from the host 3112.

The controller 3101 is composed of control processors 3102, a control store 3110 and a cache memory 3111.

The control processor 3102 controls the controller 3101. A pair generation processing 3103, an extent division processing 3104, an extent couple processing 3105, a write processing 3106, an extent division copy processing 3107, an extent couple copy processing 3108 and a pair generation copy processing 3113 operate in the control processor 3102. The control store 3110 stores control information such as pair information 3109 which is needed by the control processor 3102 to control the controller 3101. The cache memory 3111 temporarily stores data received from the host 3100 and data read from the storage device 3112.

Figure 32:
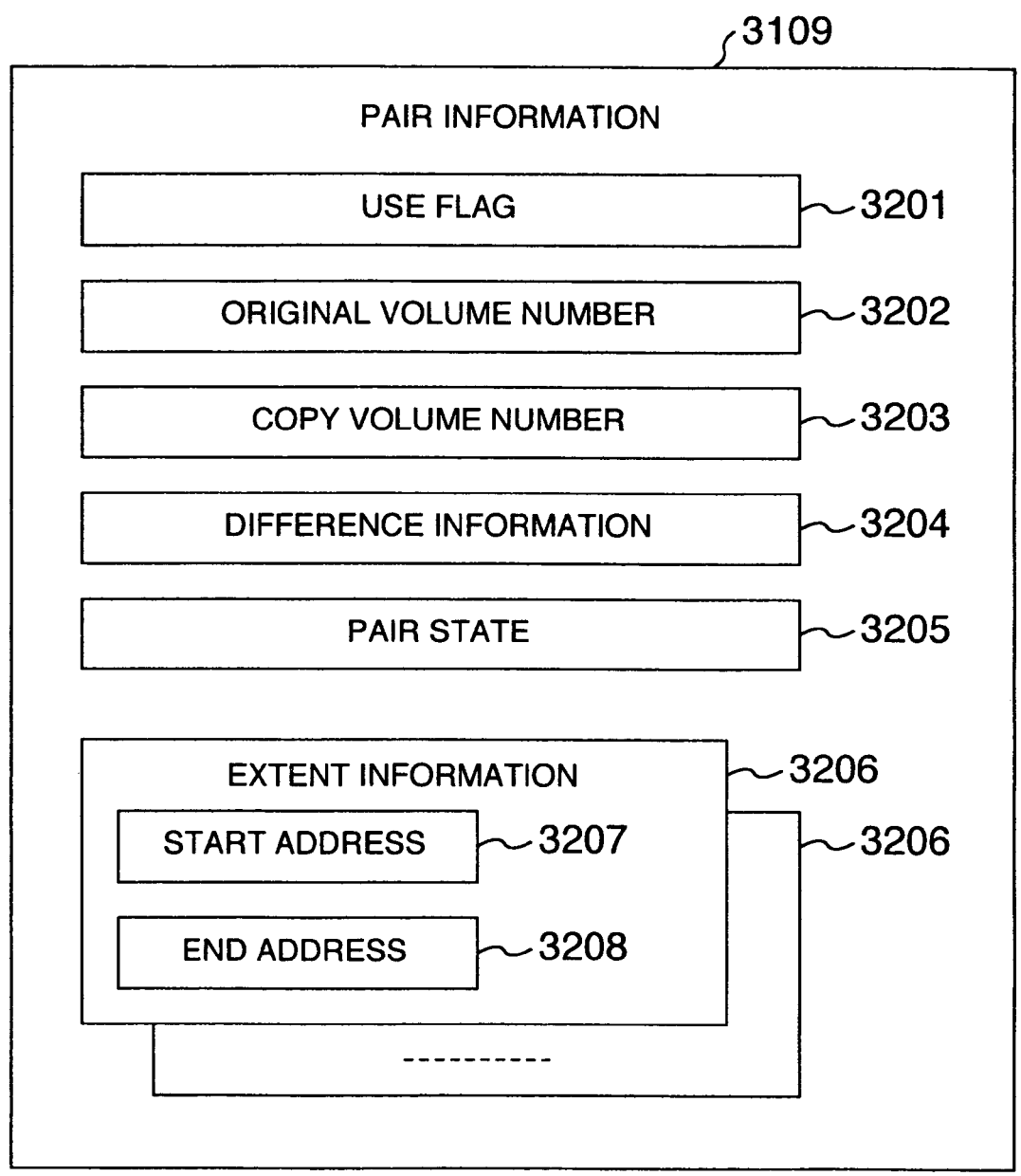
FIG. 32 is a diagram showing control information which a control processor requires when the present invention is embodied.

FIG. 32 shows the data structure of the pair information 3109. The pair information 3109 is composed of a use flag 3201, an original volume number 3202, a copy volume number 3203, difference information 3204, a pair state 3205 and extent information 3206. The use flag 3201 is a flag indicating whether or not the corresponding pair information 3109 is being used, that is, whether or not information in the corresponding pair information 3109 is valid. When the use flag 3201 is "1", validness is indicated. When it is "0", invalidness is indicated. The original volume number 3202 indicates a number of a volume which serves as an original when a copy of the volume is to be generated in accordance with a request from the host 3100. The copy volume number 3203 indicates a number of a volume which is stored with a copy of data of a volume serving as an original when a copy of the volume is to be generated in accordance with a request from the host 3100. The difference information 3204 is information representing locations at which data is different between a volume indicated by the original volume number 3202 and a volume indicated by the copy volume number 3203. The pair state 3205 indicates where is a volume copy generating process advancing up to. The pair state 3205 has five values of "UNDER GENERATION", "GENERATION COMPLETED", "UNDER EXTENT DIVISION", "EXTENT DIVISION COMPLETED" and "UNDER EXTENT COUPLE". The extent information 3206 is information indicating a location in a volume in which an area such as dateset or file is stored. The extent information 3206 is composed of a start address 3207 and an end address 3208. The start address 3207 is an address indicating a starting extreme of an area such as dataset or file, and the start address 3208 is an address indicating a trailing extreme of the area such as dataset or file.

Figure 33:
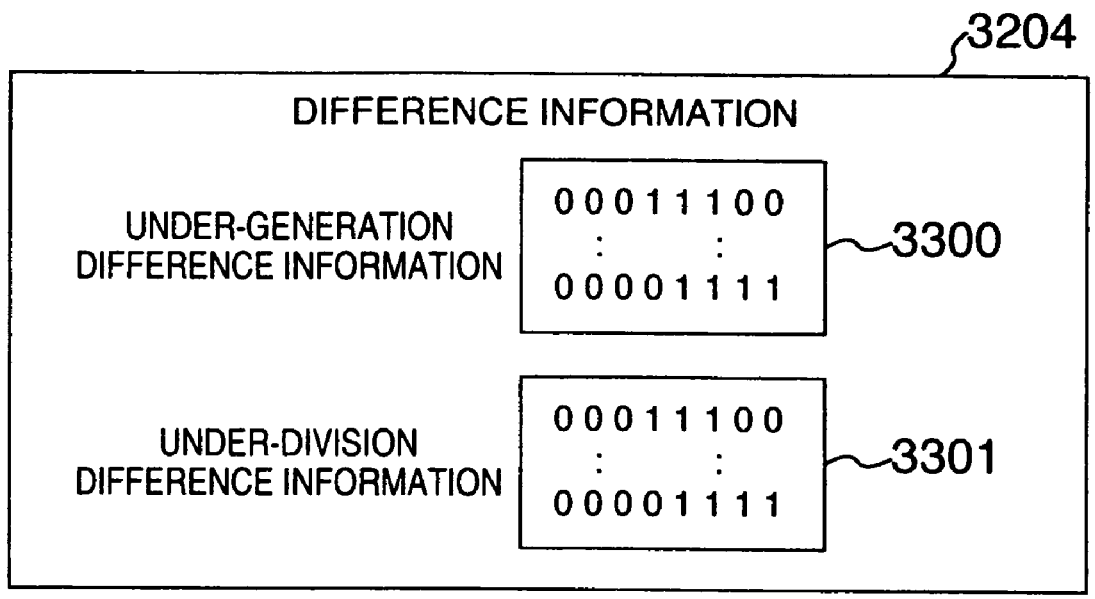
FIG. 33 is a diagram showing the structure of difference information in the control information.

FIG. 33 shows the structure of the difference information 3204. The difference information 3204 is composed of two kinds of bit maps which include under-generation difference information 3300 and under-division difference information 3301. One bit corresponds to one track. When the bit value is "0", it is indicated that data of the corresponding track is coincident between a volume indicated by the original volume number 3202 and a volume indicated by the copy volume number 3203. When the bit value is "1", it is indicated that data of the corresponding track is not coincident. Of course, one bit may be caused to correspond to another unit.

Figure 34:
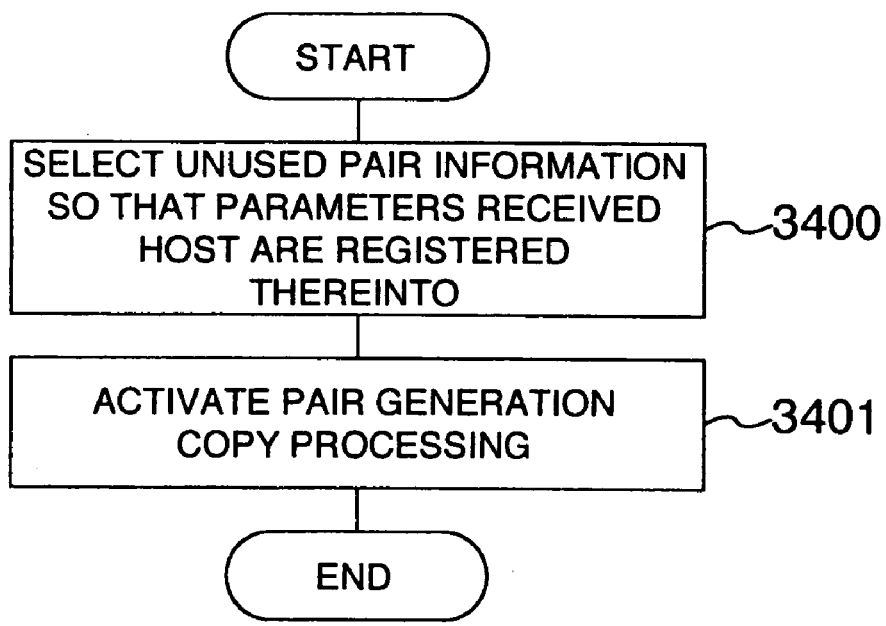
FIG. 34 is a chart showing the flow of a processing when a pair generation request is received from a host.

FIG. 34 shows the flow of the pair generation processing 3103. The host 3100 issues a pair generation request to the controller 3101 when the controller 3101 is caused to generate the copy of a certain volume. When receiving the pair generation request from the host 3100, the control processor 3102 starts a pair generation processing 3103. The pair generation request has two parameters, that is, a volume number of a volume the copy of which is to be generated (referred to as an original volume) and a volume number of a volume in which copied data is to be stored (referred to as a copy volume).

In step 3400, unused pair information 3109 which has the use flag 3201 of "0 is selected. In the selected pair information 3109, the use flag 3201 is set to be "1", a volume number of an original volume received from the host 3100 is set into the original volume number 3202, a volume number of a copy volume received from the host 3100 is set into the copy volume number 3203, "UNDER GENERATION" is set into the pair state 3205, all bits of the under-generation information 3300 in the difference information 3204 are set to "1", and all bits of the under-division information 3301 are set to "0".

In step 3401, a pair generation copy processing 3113 is activated, thereby completing the present pair generation processing.

Figure 35:
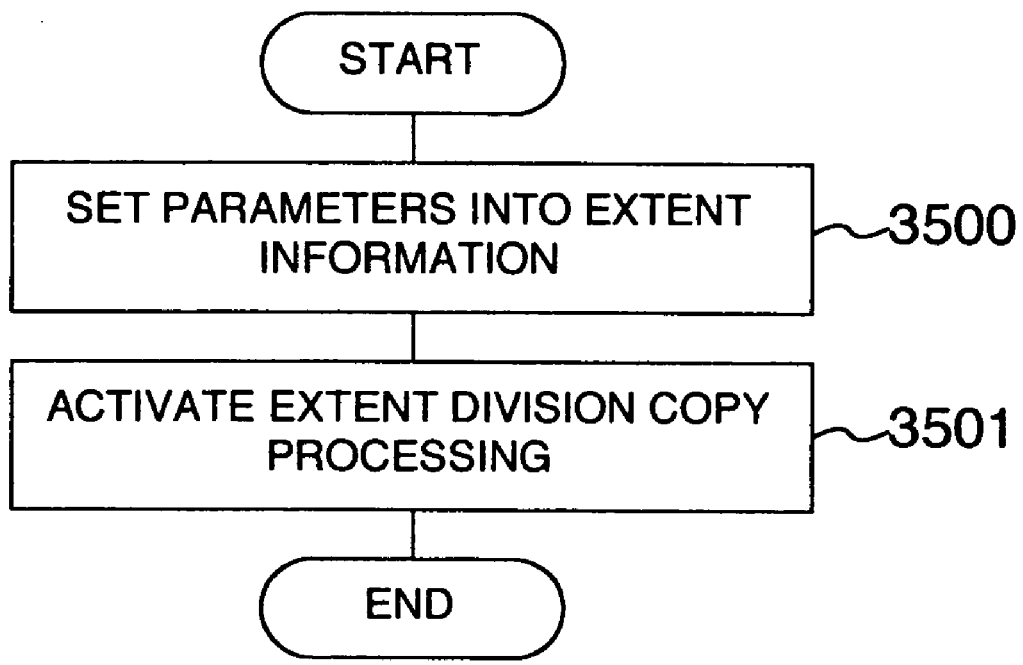
FIG. 35 is a chart showing the flow of a processing when an extent division request is received from the host.

FIG. 35 shows the flow of the extent division processing 3104. The host 3100 issues an extent division request when data to be stored in a copy volume is to be settled with respect to a specified area of a volume. When receiving the extent division request issued by the host 3100, the control processor 3102 starts an extent division processing. The extent division request has parameters composed of a volume number of one original volume, a volume number of one copy volume, a start address indicating a starting extreme of one or more areas for which data is to be settled, and an end address indicating a trailing extreme of the one or more areas for which data is to be settled.

In step 3500, there is first selected pair information 3109 which has the original volume number 3202 corresponding to the volume number of the original volume received as the parameter and the copy volume number 3203 corresponding to the volume number of the copy volume received as the parameter. Next, "UNDER EXTENT DIVISION" is set into the pair state 3205 of the selected pair information 3109. Next, the start address received as the parameter is set into the start address 3207 of the extent information 3206 of the selected pair information 3109 and the end address received as the parameter is set into the end address 3208 thereof.

In step 3501, an extent division copy processing is activated, thereby completing the present extent division processing.

Figure 36:
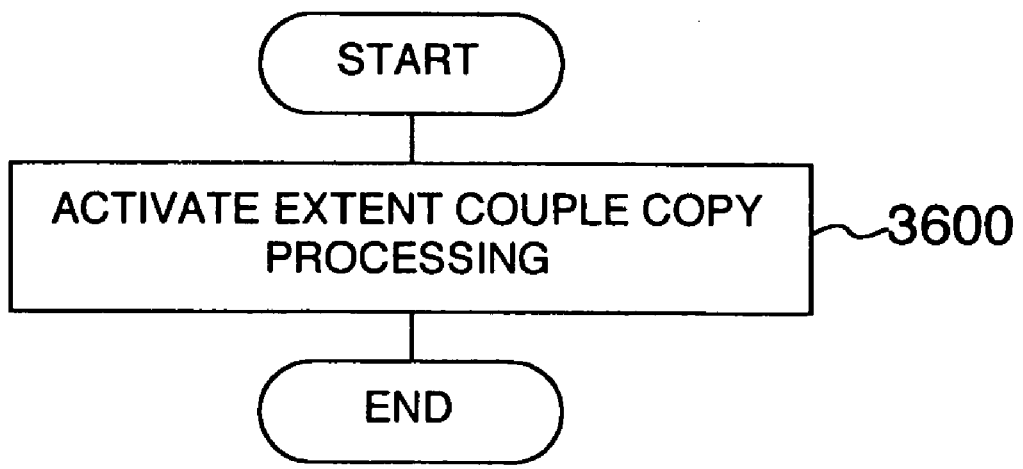
FIG. 36 is a chart showing the flow of a processing when an extent couple request is received from the host.

FIG. 36 shows the flow of the extent couple processing 3105. When receiving an extent couple request issued by the host 3100, the control processor 3102 starts an extent couple processing 3105. The extent couple request has parameters composed of a volume number of an original volume and a volume number of a copy volume.

In step 3600, there is first selected pair information 3109 which has the original volume number 3202 corresponding to the volume number of the original volume received as the parameter and the copy volume number 3203 corresponding to the volume number of the copy volume received as the parameter. Next, "UNDER EXTENT COUPLE" is set into the pair state 3205 of the selected pair information 3109. Next, an extent couple copy processing 3108 is activated, thereby completing the present extent couple processing.

Figure 37:
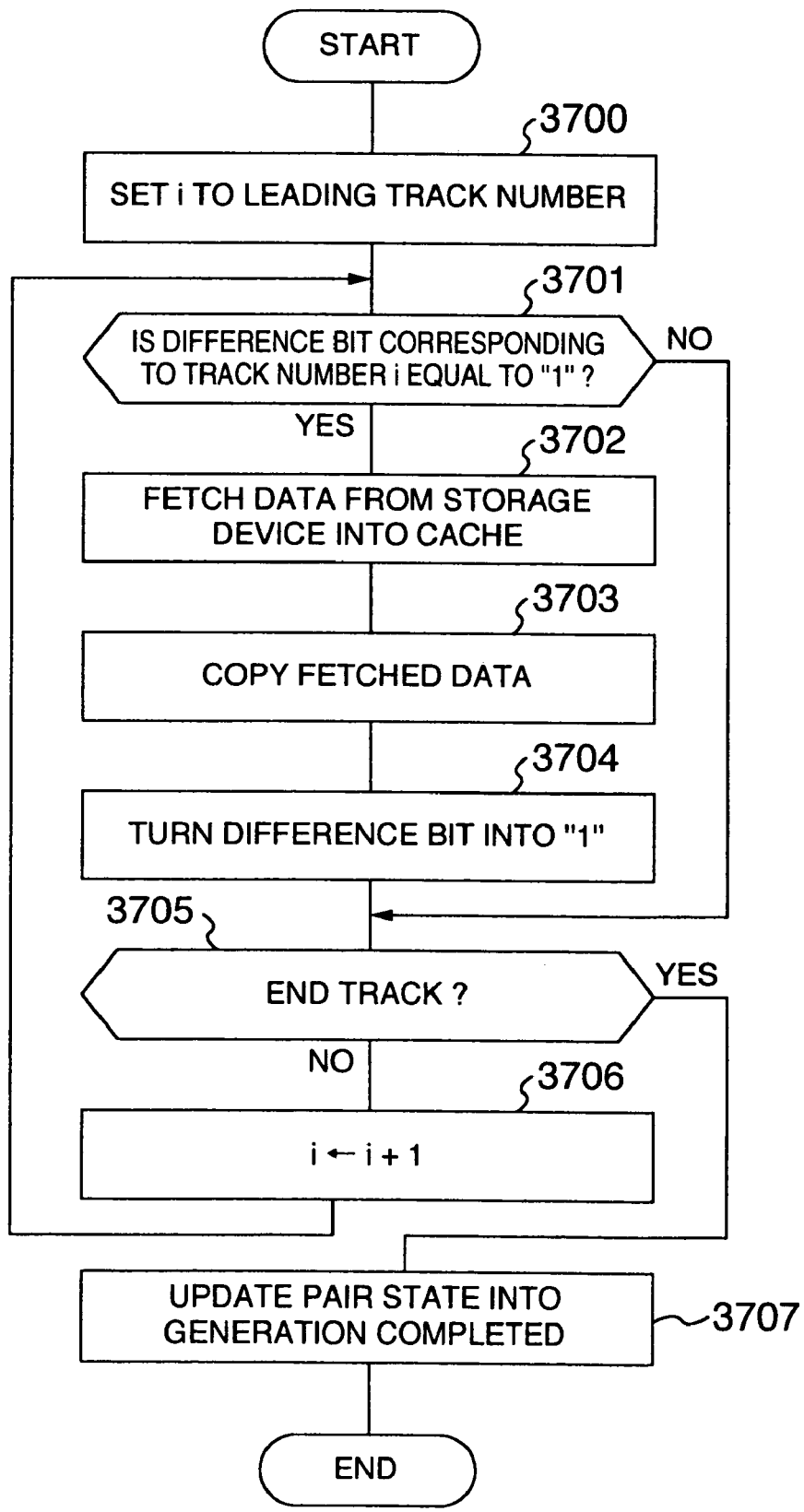
FIG. 37 is a chart showing the flow of a pair generation copy processing.

FIG. 37 shows the flow of the pair generation copy processing 3113. The pair generation copy processing 3113 is activated from the pair generation processing 3103. A volume number of an original volume and a volume number of a copy volume are given as parameters.

In step 3700, a variable i is set to a track number of a leading track of the original volume given as the parameter.

In step 3701, there is first selected pair information 1310 which has the original volume number 3202 corresponding to the volume number of the original volume given as the parameter and the copy volume number 3203 corresponding to the volume number of the copy volume given as the parameter. Next, the reference to the under-generation difference information 3300 in the difference information 3204 of the selected pair information 3109 is made to examine whether a bit corresponding to a track having a track number equal to the variable i is "0" or "1". In the case where the bit is "0", the flow proceeds to step 3705. In the case where the bit is "1", the flow proceeds to step 3702.

In step 3702, data of the track having a track number equal to the variable i is fetched from the storage device 3112 into the cache memory 3111.

In step 3703, a copy of the data fetched in step 3702 is generated in the cache memory 3111. Though the generated copy is data of a volume corresponding to the copy volume number given as the parameter, the time of writing of this data into the storage device 3112 may be arbitrary.

In step 3704, "0" is set into the bit examined in step 3701.

In step 3705, the examination is made of whether or not the track having a track number equal to the variable i is a track corresponding to a trailing extreme of a volume corresponding to the volume number of the original volume given as the parameter. In the case where it is the trailing track, the flow proceeds to step 3707. In the case where it is not the trailing track, the flow proceeds to step 3706.

In step 3706, the variable i is updated. Then, the flow goes to step 3701 to perform a processing for the next track.

In step 3707, "GENERATION COMPLETED" is set into the pair state 3205 of the pair information 3109 selected in step 3701, thereby completing the present processing.

Figure 38:
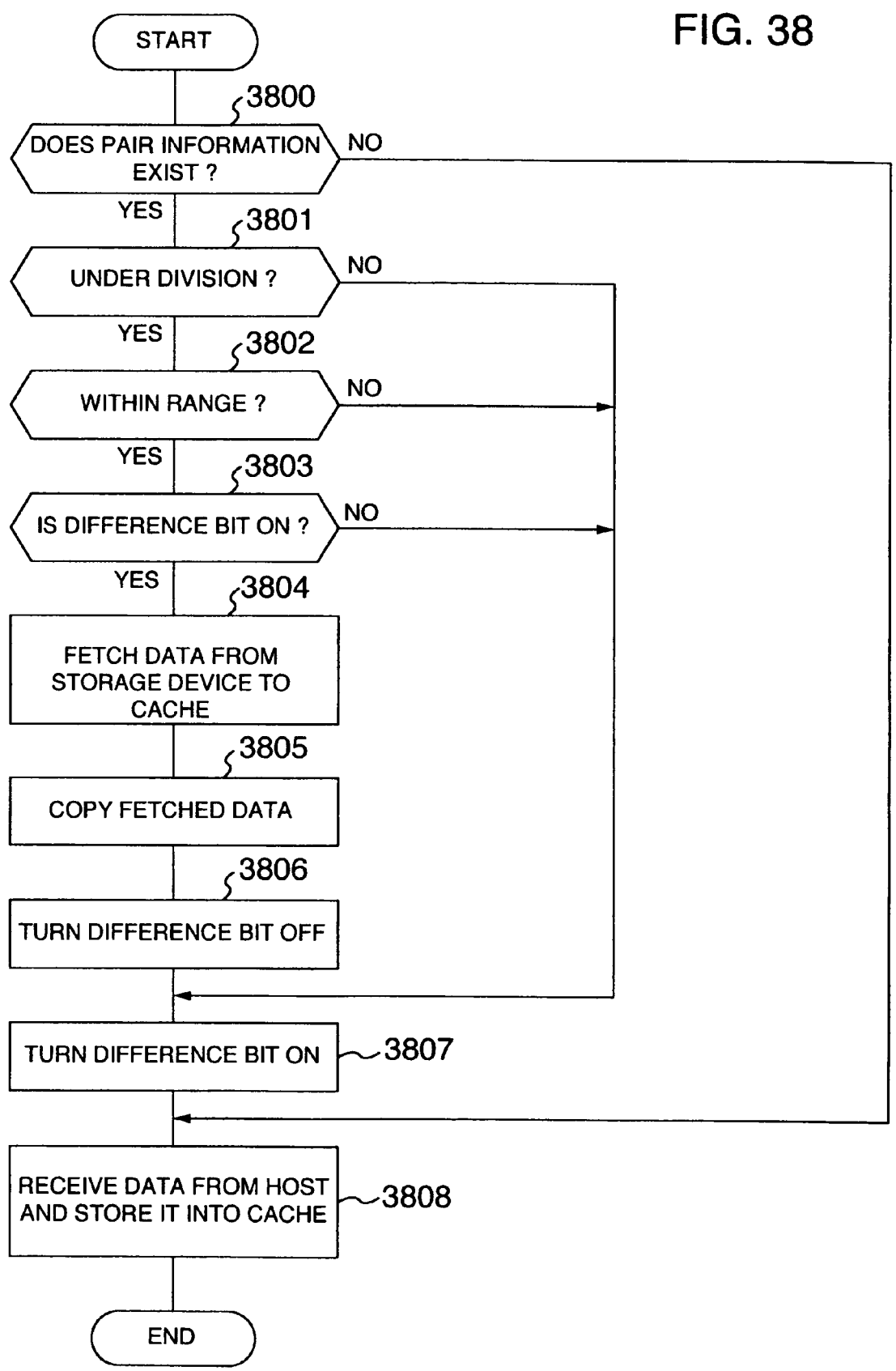
FIG. 38 is a chart showing the flow of a processing when a write request is received from the host.

FIG. 38 shows the flow of the write processing 3106. When receiving a write request from the host 3100, the control processor 3102 starts a write processing 3106. The write request has three parameters, that is, write data, a volume number of a volume in which the write data is to be stored, and an address in the volume in which the write data is stored.

In step 3800, pair information 3109 having the original volume number 3202 corresponding to the volume number received as the parameter is selected from among pair information 3109 having the use flag 3201 of "1". In the case where pair information 3109 satisfying the above condition does not exist, the flow proceeds to step 3808. In the case where pair information 3109 satisfying the above condition exists, the flow proceeds to step 3801.

In step 3801, the pair state 3205 of the pair information selected in step 3800 is examined. In the case where the pair state 3205 is "UNDER EXTENT DIVISION", the flow proceeds to step 3802. In the other case, the flow proceeds to step 3807.

In step 3802, the reference to the extent information 3206 in the pair information 3109 selected in step 3800 is made to examine whether or not the in-volume address received as the parameter is included between the start address 3207 and the end address 3208 of the extent information. In the case where the address is included, the flow proceeds to step 3803. In the case where the address is not included, the flow proceeds to step 3807.

In step 3803, the reference to the under-generation difference information 3300 in the difference information 3204 of the pair information 3109 selected in step 3800 is made to examine whether a bit corresponding to a track corresponding to the in-volume address received as the parameter is "0" or "1". In the case where the bit is "0", the flow proceeds to step 3807. In the case where the bit is "1", the flow proceeds to step 3804.

In step 3804, data of the track corresponding to the in-volume address received as the parameter is fetched from the storage device 3112 into the cache memory 3111.

In step 3805, a copy of the data fetched in step 3804 is generated in the cache memory 3111. Though the generated copy is data of a copy volume indicated by the copy volume number 3203 in the pair information 3109 selected in step 3800, the time of writing of this data into the storage device 3112 may be arbitrary.

In step 3806, "0" is set into the bit examined in step 3803.

In step 3807, the pair state 3205 of the pair information 3109 selected in step 3800 is first examined. In the case where the pair state 3205 is "UNDER GENERATION", "GENERATION COMPLETED" or "UNDER EXTENT COUPLE", "1" is set into that bit in the under-generation difference information 3300 of the difference information 3204 which corresponds to a track corresponding to the in-volume address received as the parameter. In the case where the pair state 3205 is "UNDER EXTENT DIVISION" or "EXTENT DIVISION COMPLETED", "1" is set into that bit in the under-division difference information 3301 of the difference information 3204 which corresponds to a track corresponding to the in-volume address received as the parameter.

In step 3808, the write data received as the parameter is stored into the cache memory 3111, thereby completing the present processing.

Figure 39:
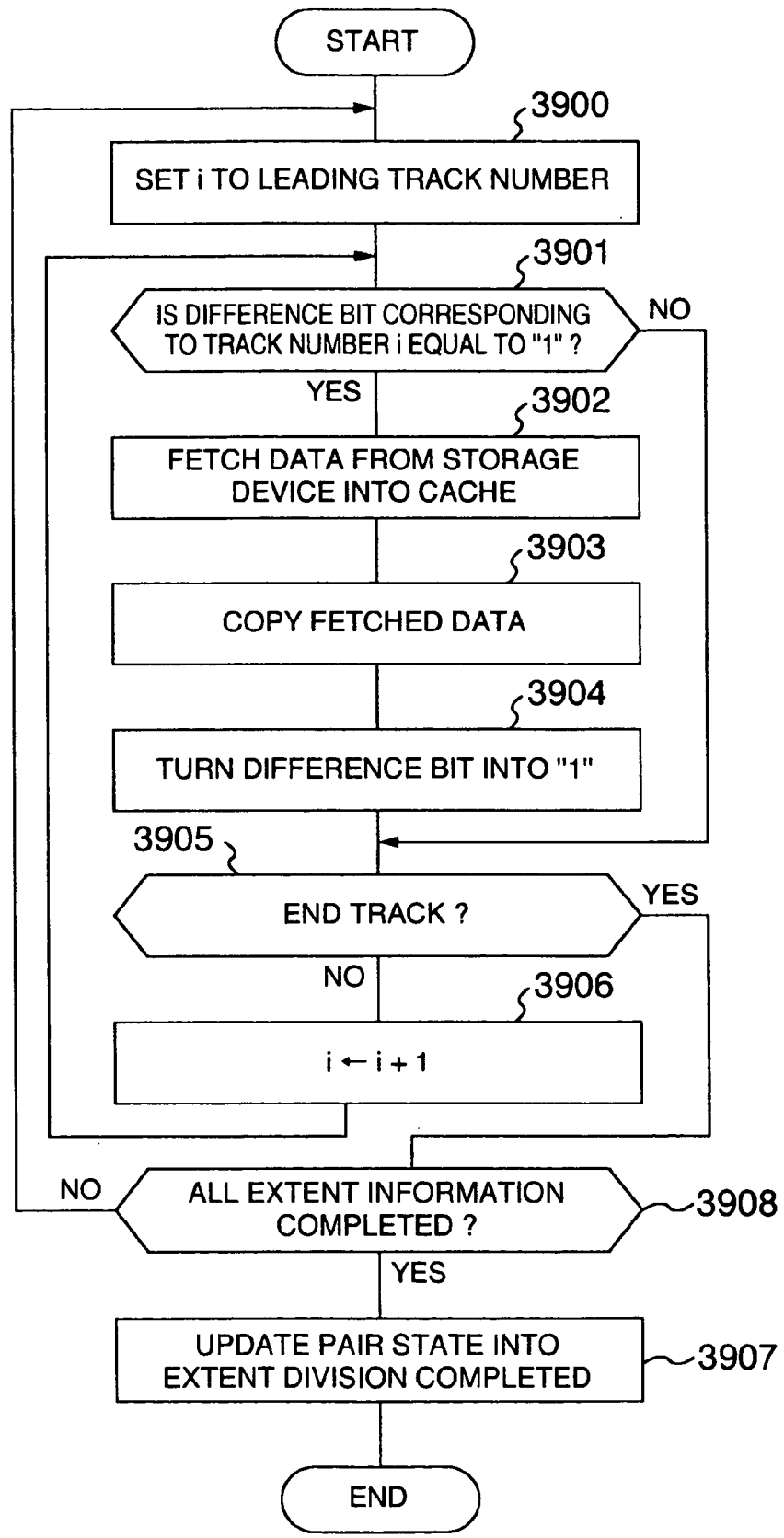
FIG. 39 is a chart showing the flow of an extent division copy processing.

FIG. 39 shows the flow of the extent division copy processing 3107. The extent division copy processing 3107 is activated from the extent division processing 3104. A volume number of an original volume and a volume number of a copy volume are given as parameters.

In step 3900, there is first selected pair information 3109 which has the original volume number 3202 corresponding to the volume number of the original volume given as the parameter and the copy volume number 3203 corresponding to the volume number of the copy volume given as the parameter. Next, one extent information 3206 of the selected pair information 3109 is selected and a variable i is set into the start address 3207.

In step 3901, the reference to the under-generation difference information 3300 in the difference information 3204 of the selected pair information 3109 is made to examine a bit which corresponds to a track having a track number equal to the variable i. In the case where the bit is "0", the flow proceeds to step 3905. In the case where the bit is "1", the flow proceeds to step 3902.

In step 3902, data of the track having a track number equal to the variable i is fetched from the storage device 3112 into the cache memory 3111.

In step 3903, a copy of the data fetched in step 3902 is generated in the cache memory 3111. Though the generated copy is data of a volume corresponding to the copy volume number given as the parameter, the time of writing of this data into the storage device 3112 may be arbitrary.

In step 3904, "0" is set into the bit examined in step 3901.

In step 3905, the examination is made of whether or not the track having a track number equal to the variable i is a track corresponding to the end address 3208. In the case where it is the corresponding track, the flow proceeds to step 3908. In the case where it is not the corresponding track, the flow proceeds to step 3906.

In step 3906, 1 is added to the variable i. Then, the flow goes to step 3901 to perform a processing for the next track.

In step 3908, the examination is made of whether or not the processings in steps 3900 to 3906 have already been performed for all extent information 3206 of the pair information 3109 selected in step 3900. In the case where the processings have already been performed, the flow proceeds to step 3907. In the case where there is extent information 3206 which has not yet been processed, the flow goes to step 3900 to perform a processing for a range defined by the next extent information 3206.

In step 3907, "EXTENT DIVISION COMPLETED" is set into the pair state 3205 of the pair information 3109 selected in step 3900, thereby completing the present processing. Thereby, that data of a specified area of the original volume given as the parameter of the extent division request which is data at a point of time of issuance of the extent division request is generated into the copy volume.

Figure 40:
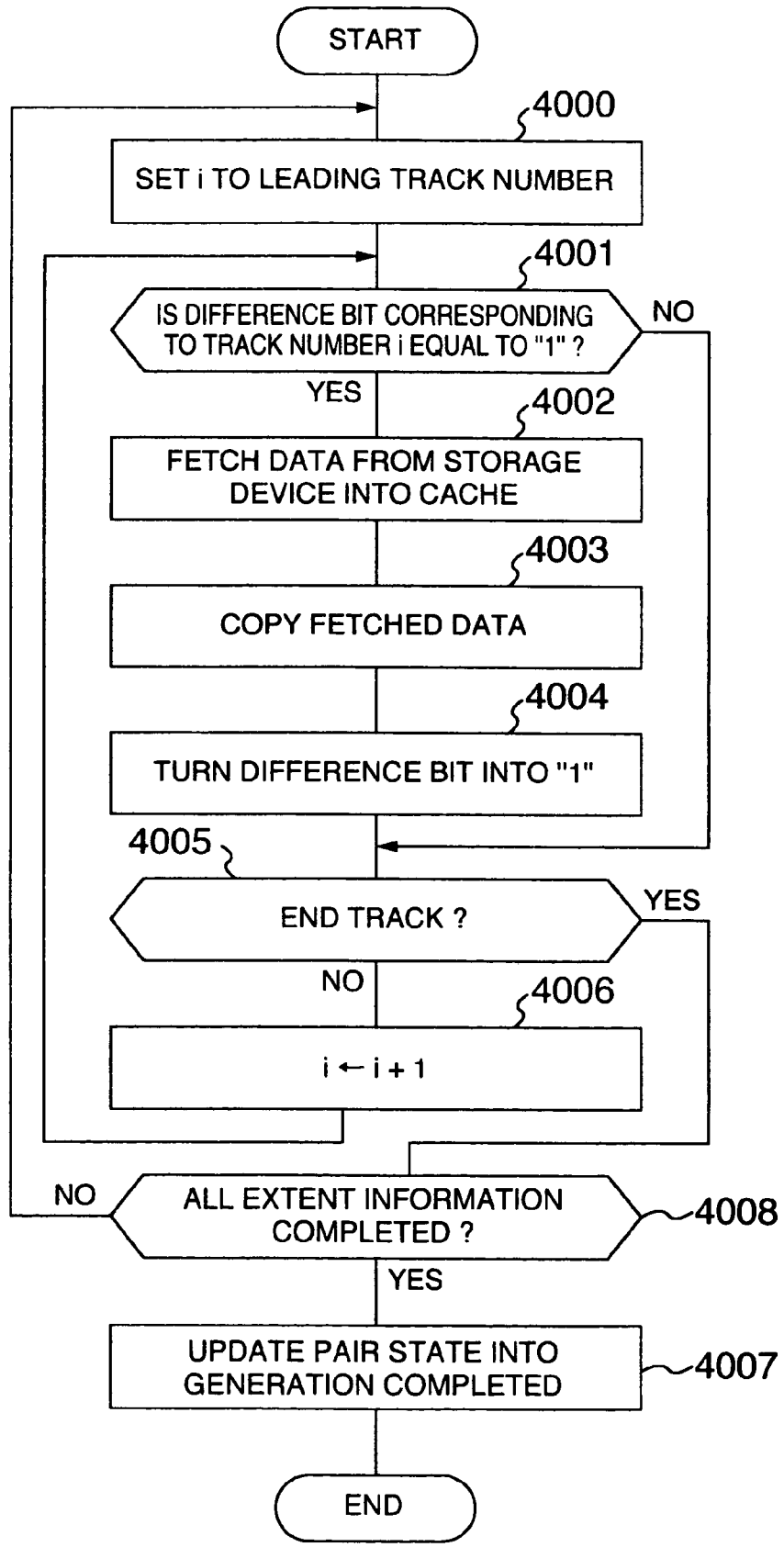
FIG. 40 is a chart showing the flow of an extent couple copy processing.

FIG. 40 shows the flow of the extent couple copy processing 3108. The extent couple copy processing 3108 is activated from the extent couple processing 3105. A volume number of an original volume and a volume number of a copy volume are given as parameters.

In step 4000, there is first selected pair information 3109 which has the original volume number 3202 corresponding to the volume number of the original volume given as the parameter and the copy volume number 3203 corresponding to the volume number of the copy volume given as the parameter. Next, one extent information 3206 of the selected pair information 3109 is selected and a variable i is set into the start address 3207.

In step 4001, the reference to the under-division difference information 3301 in the difference information 3204 of the selected pair information 3109 is made to examine a bit which corresponds to a track having a track number equal to the variable i. In the case where the bit is "0", the flow proceeds to step 4005. In the case where the bit is "1", the flow proceeds to step 4002.

In step 4002, data of the track having a track number equal to the variable i is fetched from the storage device 3112 into the cache memory 3111.

In step 4003, a copy of the data fetched in step 4002 is generated in the cache memory 3111. Though the generated copy is data of a volume corresponding to the copy volume number given as the parameter, the time of writing of this data into the storage device 3112 may be arbitrary.

In step 4004, "0" is set into the bit examined in step 3901.

In step 4005, the examination is made of whether or not the track having a track number equal to the variable i is a track corresponding to the end address 3208. In the case where it is the corresponding track, the flow proceeds to step 4008. In the case where it is not the corresponding track, the flow proceeds to step 4006.

In step 4006, the variable i is updated. Then, the flow goes to step 4001 to perform a processing for the next track.

In step 4008, the examination is made of whether or not the processings in steps 4000 to 4006 have already been performed for all extent information 3206 of the pair information 3109 selected in step 4000. In the case where the processings have already been performed, the flow proceeds to step 4007. In the case where there is extent information 3206 which has not yet been processed, the flow goes to step 4000 to perform a processing for a range defined by the next extent information 3206.

In step 4007, "FORMATION COMPLETED" is set into the pair state 3205 of the pair information 3109 selected in step 4000, thereby completing the present processing.

As a technique of improving the performance of a disk device is known a disk array technique with which write data is written into a plurality of disks in parallel. The volume disclosed in the seventh, eighth and ninth embodiments may be formed through the application of the disk array technique. The volume disclosed in the first, second and third embodiments may be an area stored in a single disk with no application of the disk array technique. The original volume disclosed in the first, second and third embodiments may be formed through the application of the disk array technique whereas the copy volume may be an area stored in a single disk with no application of the disk array technique. The original volume disclosed in the first, second and third embodiments may be an area stored in a single disk with no application of the disk array technique whereas the copy volume may be formed through the application of the disk array technique.

Next, a tenth embodiment of the present invention will be described.

X. Tenth Embodiment

In a system according to the tenth embodiment, a remote terminal 4302 and a maintenance terminal 4303 (see FIG. 41) are added to the system according to the seventh, eighth or ninth embodiment. The remote terminal 4303 is a device which issues various requests to the controller 1312 from a place remote from a place where the controller 1312 is installed. The controller 1312 has a remote terminal I/F 4300 which is an interface for the remote terminal 4302. The remote terminal I/F 4300 has a function with which a request issued by the remote terminal 4302 is delivered to the control processor 1301. The maintenance terminal 4303 forms a storage subsystem 4307 together with the controller 1312 and the storage device 1313. The maintenance terminal 4303 is a device which issues various requests to the controller 1312. The controller 1312 has a maintenance terminal I/F 4301 which is an interface for the maintenance terminal 4303. The maintenance terminal I/F 4301 has a function with which a request issued by the maintenance terminal 4303 is delivered to the control processor 1301. Each of the remote terminal 4302 and the maintenance terminal 4303 has a function of issuing a request which the host 1300, the host 2300 or the host 3100 described in conjunction with the seventh, eighth or ninth embodiment issues.

Next, an eleventh embodiment of the present invention will be described.

XI. Eleventh Embodiment

In a system according to the eleventh embodiment, a LAN 4304, a host 4305 and a magnetic tape drive 4306 (see FIG. 41) are added to the system according to the seventh, eighth or ninth embodiment. The host 1300 (or 2300 or 3100) informs the host 4305 through the LAN 4304 of the formation of a copy volume. The host 4305 has a function of storing data of the copy volume into the magnetic tape drive 4306, thereby acquiring backup.

First, the description will be made of the case of a system in which the LAN 4304, the host 4305 and the magnetic tape drive 4306 are added to the system described in conjunction with the seventh embodiment.

The host 1300 issues a pair generation request first and a pair division request thereafter to the controller 1312 to generate a copy volume and informs the host 4305 through the LAN 4304 of a logical volume number of the copy volume. The host 4305 operates so that data of a logical volume corresponding to the received logical volume number is read from the storage device 1313 through the controller 1312 and the read data is written into the magnetic tape drive 4306 to acquire backup. Further, the host 1300 issues an extent update request to the controller 1312 to update data of a partial area of the copy volume. When the updating is completed, the host 1300 informs the host 4305 through the LAN 4304 of the logical volume number of the copy volume and an address indicating the updated area. The host 4305 operates so that data stored in that area of a logical volume corresponding to the received logical volume number which corresponds to the received address indicating the updated area is read from the storage device 1313 through the controller 1312 and the read data is written into the magnetic tape drive 4306 to acquire backup. The above flow in which the host 1300 issues an extent update request to update a partial area of the copy volume and the host 4305 acquires the backup of that area is repeatedly carried out, as required.

Next, the description will be made of the case of a system in which the LAN 4304, the host 4305 and the magnetic tape drive 4306 are added to the system described in conjunction with the eighth embodiment.

The host 2300 issues a pair generation request first and a pair division request thereafter to the controller 2312 to generate a copy volume and informs the host 4305 through the LAN 4304 of a logical volume number of the copy volume and an address indicating a partial area of the copy volume. The informed host 4305 reads data of the partial area of the copy volume from the storage device 2313 through the controller 2312 and writes the read data into the magnetic tape drive 4306 to acquire backup.

Next, the description will be made of the case of a system in which the LAN 4304, the host 4305 and the magnetic tape drive 4306 are added to the system described in conjunction with the ninth embodiment.

The host 3100 issues a pair generation request first and an extent division request thereafter to the controller 3101 to generate a partial area of a copy volume and informs the host 4305 through the LAN 4304 of a logical volume number of the copy volume and an address indicating the partial area of the copy volume. The informed host 4305 reads data of the partial area of the copy volume from the storage device 3112 through the controller 3101 and writes the read data into the magnetic tape drive 4306 to acquire backup.

With the method described in the above, the backup of the whole of a volume or a partial area such as file or dataset in a volume is acquired. In the above description, the host different from the host issuing a request for copy volume formation reads data from the storage device and writes the read data into the magnetic tape drive. However, it is of course that these hosts may be the same.

According to the present invention described above, it is possible to further improve the efficiency of copying such as remote copying or migratory copying between storage systems without the intervention of a CPU.

Also, it is possible to arrange/rearrange a logical volume on a plurality of RAID groups distributively so that datasets or files in one logical volume are arranged on RAID groups which are suitable for their access characteristics.

Since the copying in units of an area such as dataset or file is enabled, it is possible to reduce unnecessary copying. Thereby, it is possible to reduce a load on a storage device and a copy generation time.

What is claimed is:

1. A storage system being coupled with a computer comprising:
   a first logical volume for storing data used by said computer; and
   a storage control device for controlling access to said first logical volume;

wherein said storage control device receives identification of said first logical volume, start and end addresses of a part of data stored in said first logical volume, and identification of a second logical volume for storing a copy of said part of data stored in said first logical volume from said computer; and wherein said storage control device copies said part of data stored in said first logical volume designated by said identification of said first logical volume and said start and end addresses to said second logical volume designated by said identification of said second logical volume.

2. A storage system as claimed in claim 1, wherein said storage system further comprises said second logical volume; and wherein said second logical volume is coupled with said storage control device.

3. A storage system as claimed in claim 1, wherein said storage system is coupled with another storage system comprising said second logical volume and another storage control device for controlling access to said second logical volume;

wherein said storage control device is coupled with said another storage control device; and wherein said storage control device transfers said part of data stored in said first logical volume to said another storage control device, so that said part of data stored in said first logical volume is written in said second logical volume by said another storage control device.

4. A storage system as claimed in claim 2 further comprising:

an update bit map which shows if said storage control device updates said part of data;

wherein said storage control device updates said part of data stored in said first logical volume in response to an update request to said part of data from said computer; and said storage control device copies updated data stored in a part of an area of said first logical volume, said part of data is stored in said part of an area, to said second logical volume, if said storage control device receives a split instruction containing said identification of said first logical volume, said start and end addresses, and said identification of a second logical volume from said computer, said storage control device stops copying updated data stored in said part of an area of said first logical volume to said second logical volume after receiving said split instruction, if said storage control device updates said part of data stored in said first logical volume after receiving said split instruction, said storage control device updates said update bit map, and when said storage control device receives a re-synchronizing instruction containing said identification of said first logical volume, said start and end addresses, and said identification of a second logical volume from said computer, said storage control device copies updated data stored in said part of an area of said first logical volume, said updated data is updated after receiving said split instruction, to said second logical volume by using said update bit map.

5. A storage system as claimed in claim 2, wherein said storage control device receives two or more pairs of start and end addresses, each of the pairs designates a part of data stored in said first logical volume, from said computer, and wherein said storage control device has two or more update bit maps each of which is corresponding to one of said two or more pairs of start and end addresses.

6. A storage system as claimed in claim 2, when said storage control device receives a write request to a part of an area of said first logical volume, said part of data is stored in said part of an area, if said storage control device has not copied data updated according to said write request to said second logical volume, said storage control device writes data to said part of an area of said first logical volume after copying data updated according to said write request to said second logical volume, and if said storage control device has already copied data updated according to said write request to said second logical volume, said storage control device writes data to said part of an area of said first logical volume.

7. A storage system being coupled with a computer comprising:

a first logical volume for storing data used by said computer;

a second logical volume for storing a copy of data stored in said first logical volume;

a control device for controlling access to said first logical volume and said second logical volume; and an update bit map which shows if said control device updates data stored in said first logical volume;

wherein said storage control device receives identification of said first logical volume and identification of said second logical volume from said computer;

said storage control device copies data stored in said first logical volume designated by said identification of said first logical volume to said second logical volume designated by said identification of said second logical volume, wherein said storage control device updates data stored in said first logical volume in response to an update request from said computer and said storage control device copies updated data stored in said first logical volume to said second logical volume, if said storage control device receives split instruction containing said identification of said first logical volume and said identification of second logical volume from said computer, said storage control device stops copying updated data stored in said first logical volume to said second logical volume after receiving said split instruction, if said storage control device updates data stored in said first logical volume after receiving said split instruction, said storage control device updates said update bit map, and when said storage control device receives a re-synchronizing instruction containing said identification of said first logical volume, start and end addresses of a part of data stored in said first logical volume, and said identification of a second logical volume from said computer, said storage control device copies updated data stored in a part of an area of said first logical volume, said part of data is stored in said part of an area and said updated data is updated after receiving said split instruction, to said second logical volume by using said update bit map.

8. A storage system as claimed in claim 7,
wherein said split instruction further contains start and end addresses of a part of data stored in said first logical volume,
wherein said update bit map is a map about said part of data designated by said identification of said first logical volume and said start and end addresses, and if said part of data stored in said first logical volume is updated in response to said update request after receiving said split instruction,
said storage control device does not copy updated data stored in a part of area of said first logical volume, said part of data is stored in said part of an area, to said second logical volume and said storage control device updates said update bit map.

* * * * *